US012374515B2

(12) United States Patent
Okuda et al.

(10) Patent No.: US 12,374,515 B2
(45) Date of Patent: Jul. 29, 2025

(54) ELECTROMAGNETIC RELAY

(71) Applicant: Panasonic Intellectual Property Management Co., Ltd., Osaka (JP)

(72) Inventors: Akihiro Okuda, Mie (JP); Machiko Nishiyama, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 18/259,593

(22) PCT Filed: Dec. 9, 2021

(86) PCT No.: PCT/JP2021/045406
§ 371 (c)(1),
(2) Date: Jun. 28, 2023

(87) PCT Pub. No.: WO2022/149405
PCT Pub. Date: Jul. 14, 2022

(65) Prior Publication Data

US 2024/0062979 A1 Feb. 22, 2024

(30) Foreign Application Priority Data

Jan. 6, 2021 (JP) ................................. 2021-000831

(51) Int. Cl.
*H01H 50/54* (2006.01)
*H01H 50/14* (2006.01)
(Continued)

(52) U.S. Cl.
CPC .......... *H01H 50/541* (2013.01); *H01H 50/14* (2013.01); *H01H 50/443* (2013.01); *H01H 51/06* (2013.01)

(58) Field of Classification Search
CPC .... H01H 50/541; H01H 50/14; H01H 50/443; H01H 51/06; H01H 50/042;
(Continued)

(56) References Cited

U.S. PATENT DOCUMENTS

2016/0314920 A1 10/2016 Aratani
2016/0314921 A1 10/2016 Aratani

FOREIGN PATENT DOCUMENTS

CN 107039212 A 8/2017
DE 4406682 C2 * 8/1998 ............. H01F 41/10
(Continued)

OTHER PUBLICATIONS

International Search Report of PCT application No. PCT/JP2021/045406 dated Mar. 1, 2022.
(Continued)

*Primary Examiner* — Mohamad A Musleh
(74) *Attorney, Agent, or Firm* — Rimon P.C.

(57) ABSTRACT

A main fixed contact and a main moving contact are disposed on the front side of a coil, and an auxiliary fixed contact and an auxiliary moving contact are arranged above the coil in a housing. An auxiliary contact terminal includes an upper piece extending above the coil and provided with the auxiliary fixed contact or the auxiliary moving contact, a side piece connected to the upper piece and extending downward from the upper piece and disposed on a side of the coil, and a connecting piece connected to the side piece and provided so as to protrude outward from the housing. The side piece is press-fitted into a press-fitting portion formed in a coil bobbin, and the press-fitting portion includes an opening into which the side piece is press-fitted and a restriction wall formed around the opening so as to face the side piece.

13 Claims, 48 Drawing Sheets

(51) Int. Cl.
*H01H 50/44* (2006.01)
*H01H 51/06* (2006.01)

(58) Field of Classification Search
CPC ............ H01H 2050/446; H01H 50/26; H01H 50/546; H01H 50/60; H01H 1/5805
See application file for complete search history.

(56) References Cited

FOREIGN PATENT DOCUMENTS

| | | |
|---|---|---|
| JP | 59-224025 | 12/1984 |
| JP | 2015-115248 | 6/2015 |

OTHER PUBLICATIONS

The EPC Office Action dated May 7, 2024 for the related European Patent Application No. 21917626.0.

* cited by examiner

ELECTROMAGNETIC RELAY

CROSS-REFERENCE TO RELATED APPLICATIONS

This application is a U.S. national stage application of the PCT International Application No. PCT/JP2021/045406 filed on Dec. 9, 2021, which claims the benefit of foreign priority of Japanese patent application No. 2021-000831 filed on Jan. 6, 2021, the contents all of which are incorporated herein by reference.

TECHNICAL FIELD

The present disclosure relates generally to an electromagnetic relay.

BACKGROUND ART

Conventionally, as disclosed in the following PTL 1, as an electromagnetic relay, there is known an electromagnetic relay including a main fixed contact and a main moving contact that comes into contact with or separates from the main fixed contact, and a main contact portion disposed in an internal space formed in a housing, in which conduction and non-conduction between a main fixed contact portion and a main moving contact portion can be switched by bringing the main fixed contact and the main moving contact into contact with or separating from each other.

In PTL 1, the electromagnetic relay includes an auxiliary fixed contact and an auxiliary moving contact that comes into contact with or separates from the auxiliary fixed contact, and further includes an auxiliary contact portion disposed in an internal space formed in the housing. By bringing the auxiliary fixed contact and the auxiliary moving contact into and separating from each other, conduction and non-conduction between the auxiliary fixed contact portion and the auxiliary moving contact portion can be switched.

The auxiliary contact portion includes an auxiliary contact terminal having an auxiliary contact (auxiliary fixed contact or auxiliary moving contact), and the auxiliary contact terminal is fixed to the coil bobbin. At this time, for example, the auxiliary contact terminal is generally fixed to the coil bobbin by resin caulking (thermocompression bonding) or the like.

CITATION LIST

Patent Literature

PTL 1: Unexamined Japanese Patent Publication No. 2015-115248

SUMMARY OF THE INVENTION

In the electromagnetic relay including the auxiliary contact portion, it is preferable that the auxiliary contact terminal is prevented from coming off from the coil bobbin or rotating when an external impact is applied.

That is, it is preferable that the auxiliary fixed contact and the auxiliary moving contact can be more reliably brought into contact with each other by suppressing the separation of the auxiliary contact terminal from the coil bobbin and the occurrence of the rotation, whereby the contact reliability of the auxiliary contact portion can be secured.

An electromagnetic relay according to the present disclosure includes: a housing; a main fixed contact provided in the housing; a main moving contact that comes into contact with or separates from the main fixed contact and is provided in the housing; a first auxiliary contact terminal provided with an auxiliary fixed contact; a second auxiliary contact terminal which comes into contact with or separates from the auxiliary fixed contact and is provided with an auxiliary moving contact; a coil provided in the housing such that a central axis extends in a vertical direction; a coil bobbin around which the coil is wound; and a coil terminal to which the coil is connected. The main fixed contact and the main moving contact are disposed on a front side of the coil. The auxiliary fixed contact and the auxiliary moving contact are disposed above the coil in the housing. The first auxiliary contact terminal or the second auxiliary contact terminal includes: an upper piece extending above the coil and provided with the auxiliary fixed contact or the auxiliary moving contact; a side piece connected to the upper piece, extending downward from the upper piece, and disposed on a side of the coil; and a connecting piece connected to the side piece and provided so as to protrude outward from the housing. Side piece is press-fitted into a press-fitting portion formed in the coil bobbin. The press-fitting portion includes an opening into which the side piece is press-fitted, and a restriction wall formed around the opening so as to face the side piece.

According to the present disclosure, it is possible to suppress a decrease in contact reliability of the auxiliary contact (configured by the auxiliary fixed contact and the auxiliary moving contact).

DESCRIPTION OF EMBODIMENT

An exemplary embodiment of the present disclosure will now be described in detail with reference to the attached drawings. In the following description, the vertical direction in a state where a base is positioned below a case and coils are disposed such that the axial direction extends in the vertical direction is referred to as a Z direction (axial direction). Specifically, a description will be given assuming that the vertical direction in a state where the base is positioned below the case in a state where the base portion extends along a horizontal plane and the coil is disposed such that the axial direction extends in the vertical direction is a Z direction (axial direction).

In addition, a direction intersecting the Z direction (axial direction) will be described as an X direction (first direction: front-rear direction: a direction in which the main fixed contact and the main moving contact face each other). A direction intersecting the X direction and the Z direction will be described as a Y direction (second direction: width direction: longitudinal direction of moving contactor). Specifically, the Z direction is orthogonal to the X direction, and the Y direction is orthogonal to the X direction and the Z direction.

In addition, description will be given by defining an upper side and a lower side in a state where the base is positioned below the case, defining a side on which the main fixed contact is disposed as a front side in the front-rear direction, and defining a side on which the main moving contact is disposed as a rear side in the front-rear direction.

Substantially identical constitutional elements are included in the plurality of exemplary embodiments described hereinafter respectively. Accordingly, in the following description, common symbols are given to the substantially identical constitutional elements, and the repeated explanation of these constitutional elements is omitted.

Further, in the present disclosure, the description will be given by using terms indicating directions such as "upper", "lower", "left", "right", "front", and "rear". However, these terms merely indicate a relative positional relationship, and the present disclosure is not limited thereto. For example, when electromagnetic relay 1 of the present disclosure is installed in an inclined manner, the direction of electromagnetic relay 1 in an actual use state may be different from the direction described in the present disclosure.

First Exemplary Embodiment

Figure 1:
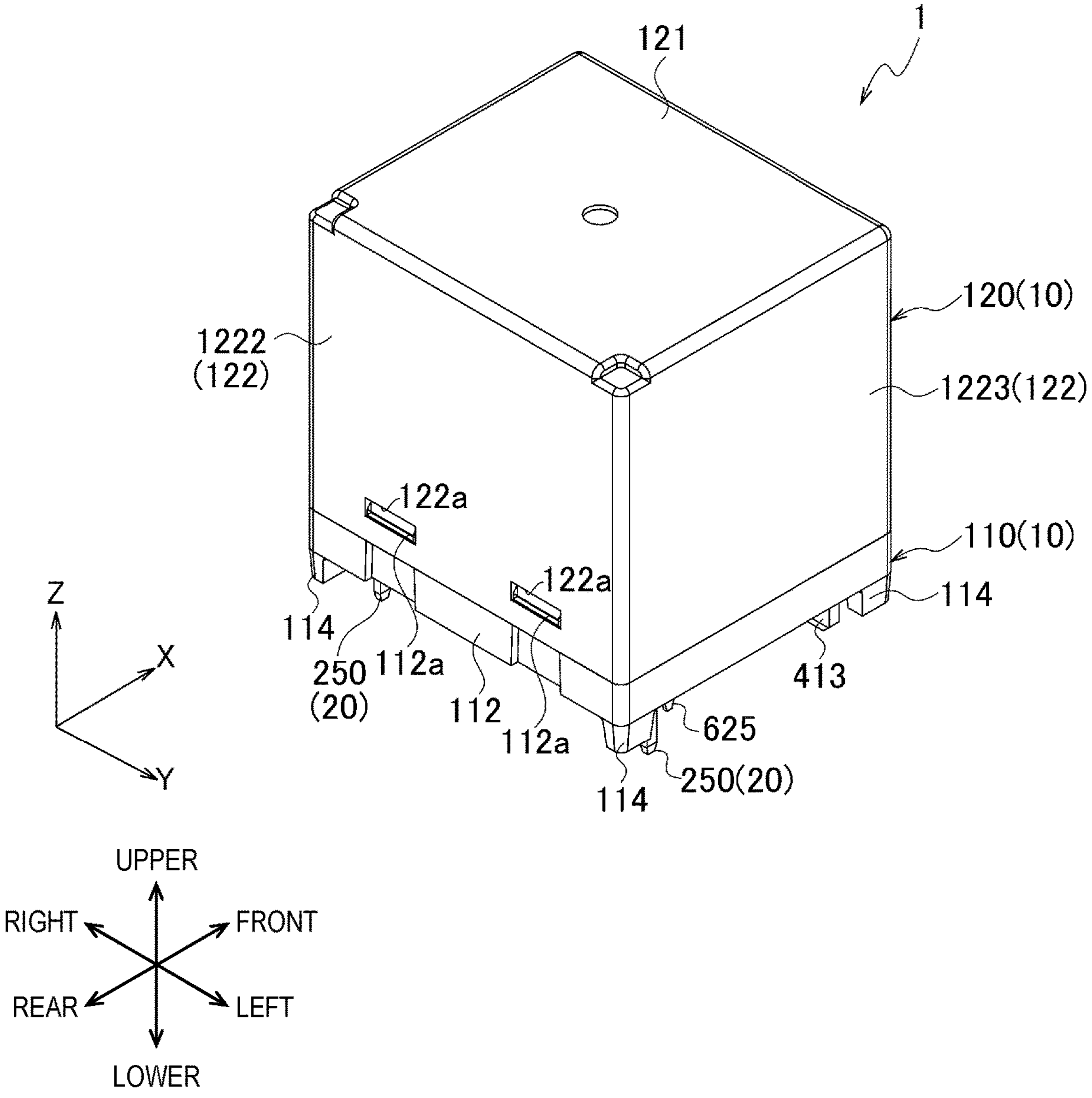
FIG. 1 is a perspective view of an electromagnetic relay according to a first exemplary embodiment as viewed from one direction.
Figure 2:
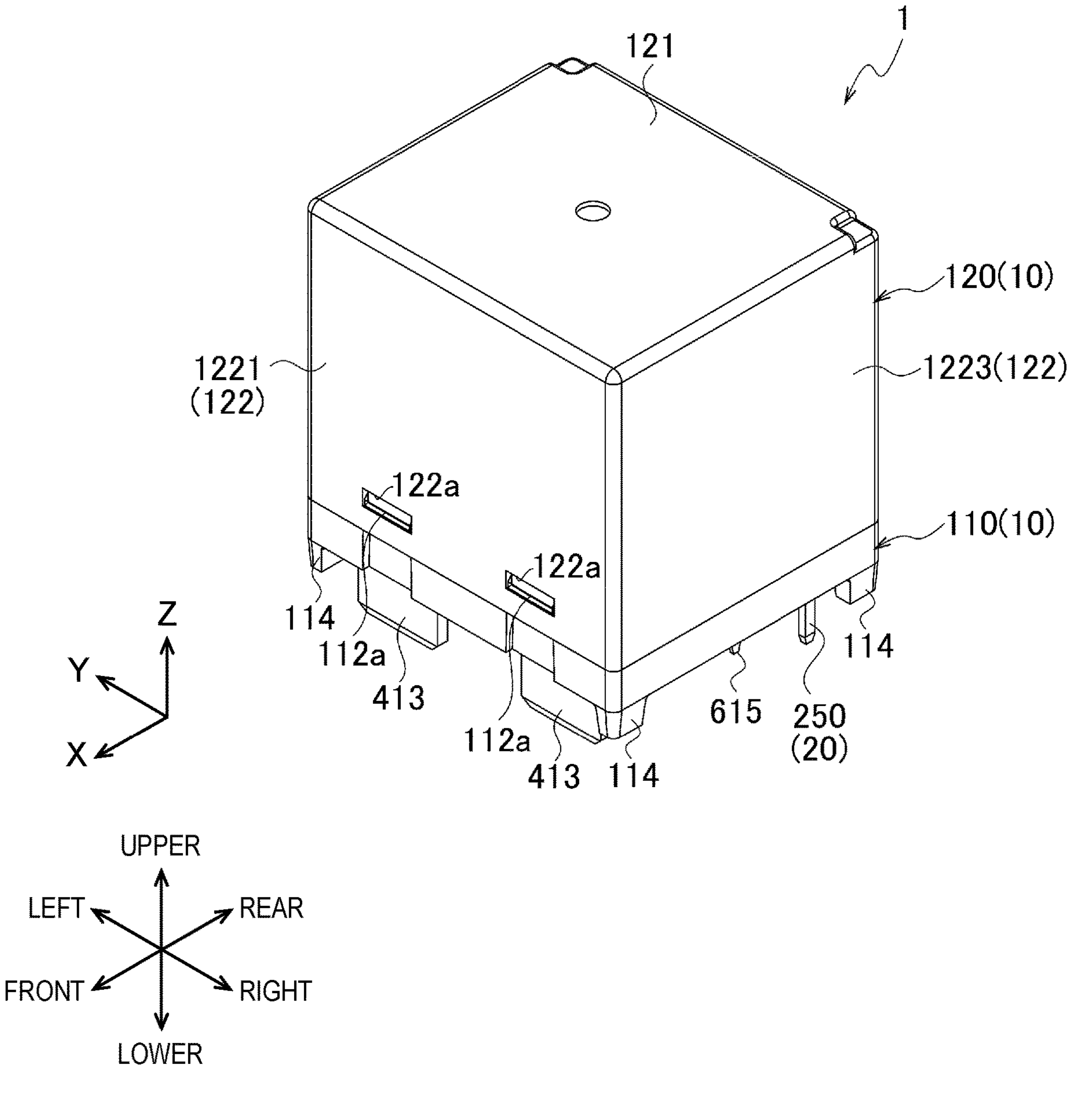
FIG. 2 is a perspective view of the electromagnetic relay according to the first exemplary embodiment as viewed from another direction.

As illustrated in FIGS. 1 and 2, electromagnetic relay 1 according to the present exemplary embodiment includes housing 10 formed of a resin material in a hollow box shape. In the present exemplary embodiment, housing 10 includes base 110 and case 120 covering base 110, and has a substantially rectangular parallelepiped outer surface. In addition, internal space S1 is formed in housing 10 in a state where case 120 is attached to base 110. Note that the shape of the outer surface of housing 10 is not limited to a rectangular parallelepiped shape, and may have any shape.

Electromagnetic device (drive unit) 20 is disposed on the rear side in the X direction (front-rear direction: first direction) in internal space S1 of housing 10, and main contact portion 40 is disposed on the front side in the X direction (front-rear direction: first direction). Further, auxiliary contact portion 60 is disposed behind housing 10 in the X direction (front-rear direction: first direction) and above housing 10 in the Z direction (vertical direction: axial direction) in internal space S1.

Here, in the present exemplary embodiment, main contact portion 40 is a so-called normally closed contact that is turned on in the initial state, and auxiliary contact portion 60 is a so-called normally open contact that is turned off in the initial state. Note that main contact portion 40 can be a so-called normally open contact that is turned off in the initial state, and auxiliary contact portion 60 can be a so-called normally closed contact that is turned on in the initial state.

Base 110 includes base portion 111 in a substantially rectangular plate-shape extending along a substantially horizontal plane (a direction intersecting the Z direction: an XY plane), and a peripheral wall 112 continuously connected to a peripheral edge of base portion 111 and extending in the Z direction (vertical direction) (see FIGS. 3 to 7).

A stepped portion is formed on the opening peripheral edge on the upper end side of peripheral wall 112, and the outer periphery is smaller than that on the lower end side. A pair of protrusions 112*a* is juxtaposed in the right-left direction on each of the front surface and the rear surface above the stepped portion of peripheral wall 112.

On the other hand, case 120 has a substantially box shape that opens downward, and case 120 is attached to base 110 from above.

Figure 3:
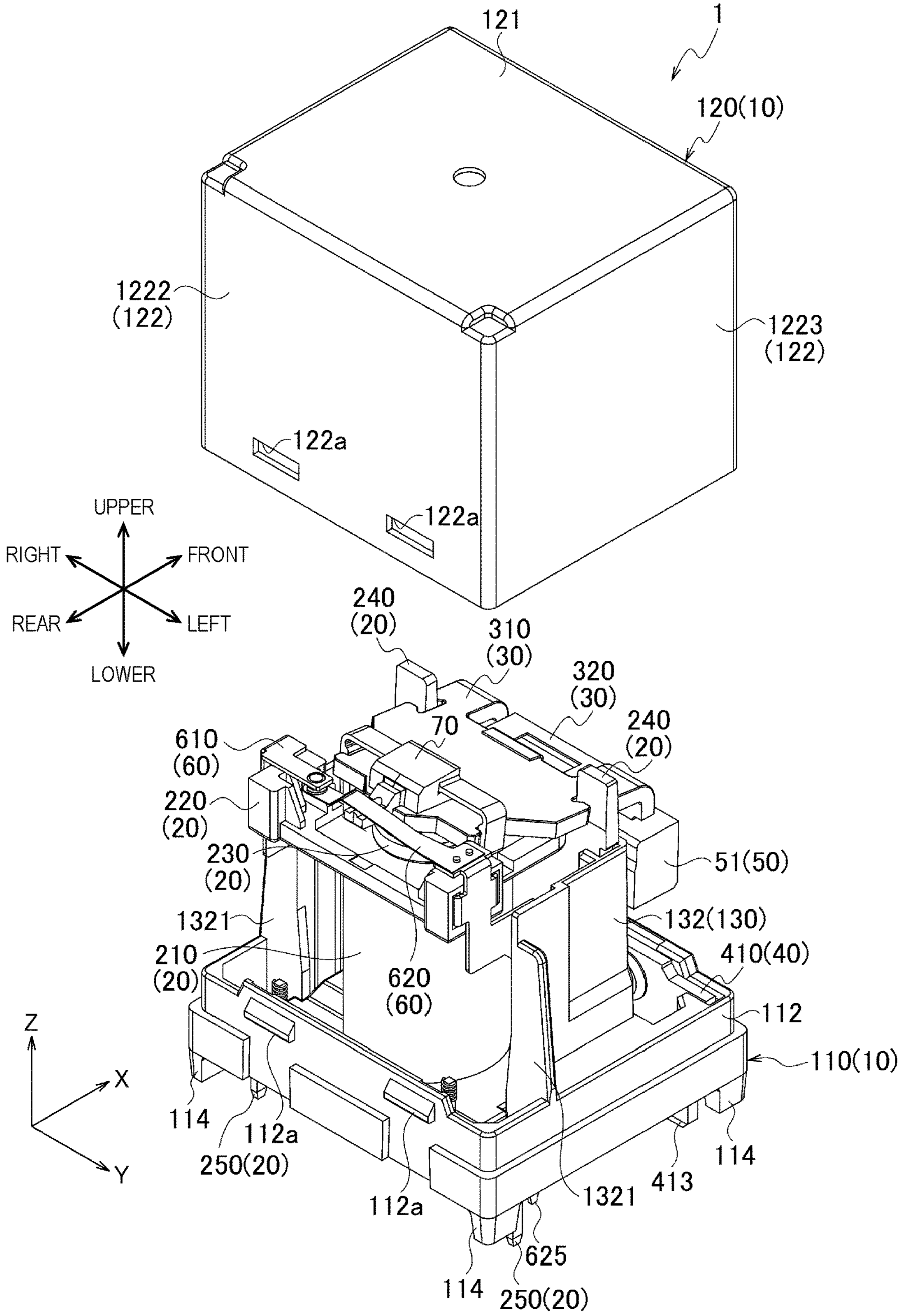
FIG. 3 is a view illustrating the electromagnetic relay according to the first exemplary embodiment, and is an exploded perspective view of a state in which a cover is removed as viewed from one direction.
Figure 4:
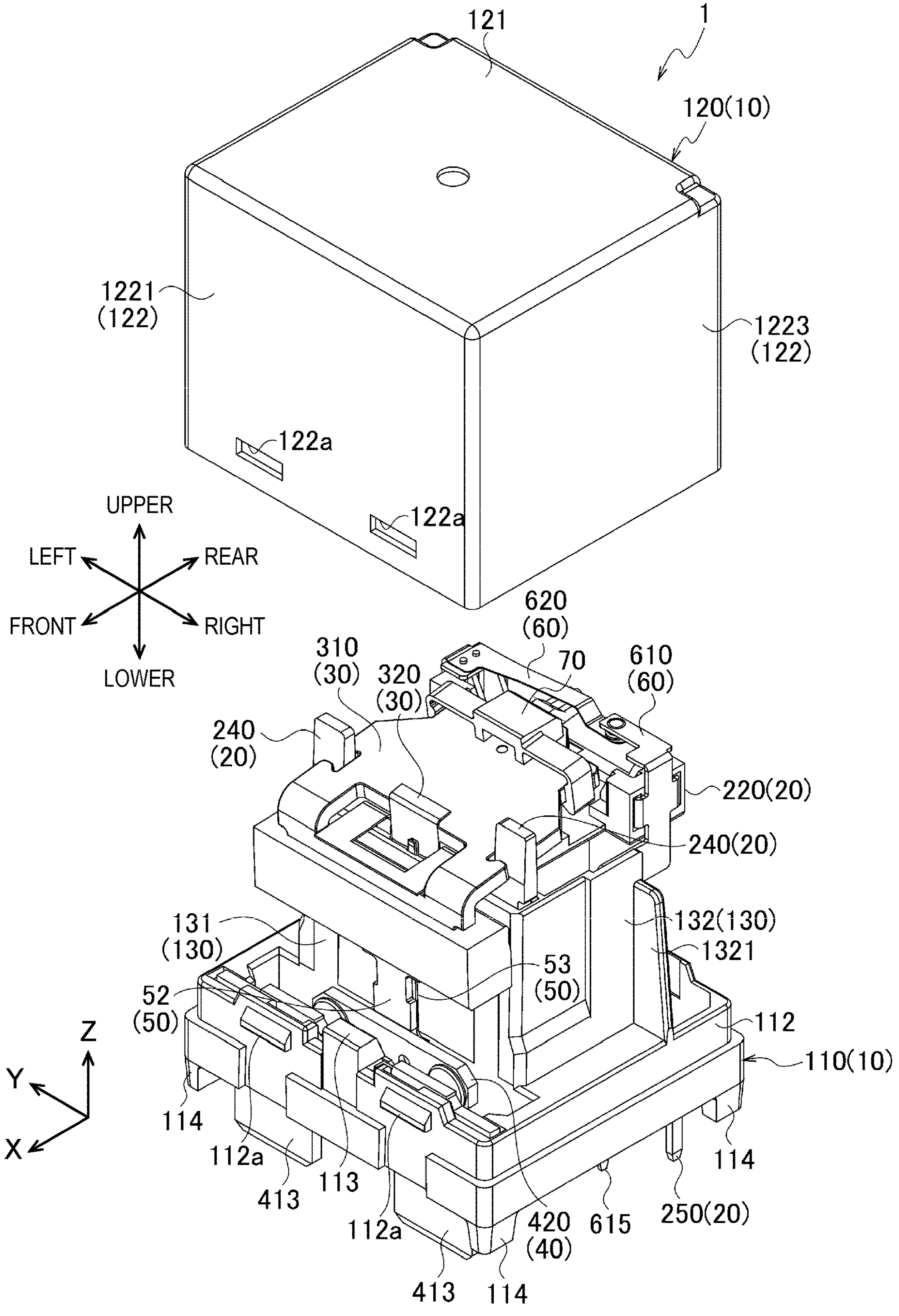
FIG. 4 is a view illustrating the electromagnetic relay according to the first exemplary embodiment, and is an exploded perspective view of a state in which the cover is removed as viewed from another direction.
Figure 5:
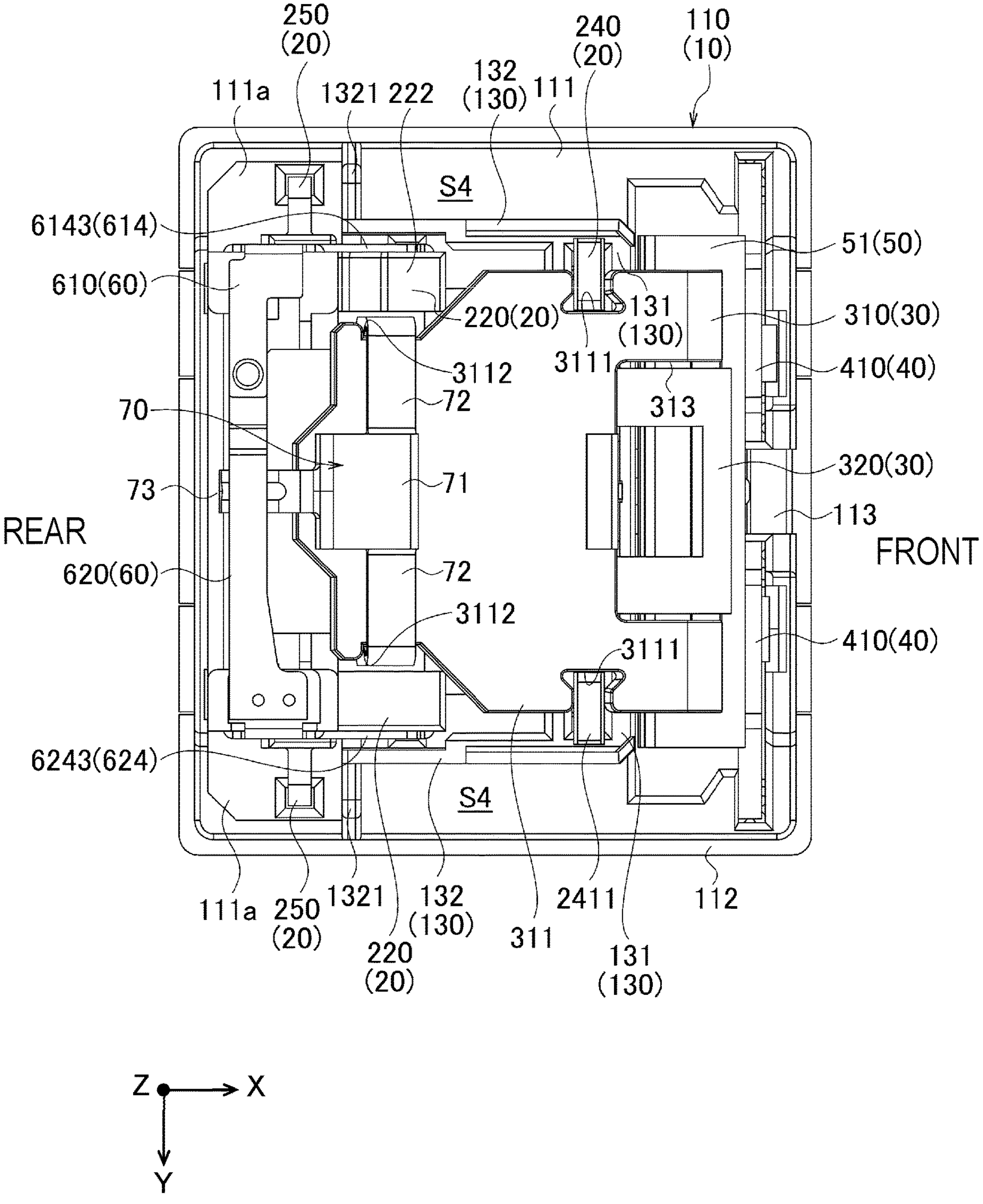
FIG. 5 is a plan view illustrating members other than the cover of the electromagnetic relay according to the first exemplary embodiment as viewed from above.

Case 120 includes top wall 121 in a substantially rectangular plate-shape extending along a substantially horizontal plane (a direction intersecting the Z direction: an XY plane), and peripheral wall 122 extending downward in the Z direction (vertical direction) from a peripheral edge of top wall 121 (see FIGS. 3 to 5).

Peripheral wall 122 includes front wall 1221 that is located on the front side in the X direction (front-rear direction) and extends in the Y direction (width direction) and the Z direction (vertical direction), and a rear wall 1222 that is located backward in the X direction (front-rear direction) and extends in the Y direction (width direction) and the Z direction (vertical direction). Peripheral wall 122 includes a pair of side walls 1223 that is continuously connected to front wall 1221 and rear wall 1222 on both sides in the Y direction (width direction) and extends in the X direction (front-rear direction) and the Z direction (vertical direction).

A pair of insertion holes 122*a* into which protrusion 112*a* of base 110 are inserted when case 120 is attached to base 110 are juxtaposed in the right-left direction in lower portions of the front wall 1221 and rear wall 1222.

In the present exemplary embodiment, base 110 includes first side wall 131 that is continuously provided so as to rise upward from bottom surface 111*a* of base portion 111 and extends in the Y direction (width direction). Further, base 110 includes a pair of second side walls 132 that is continuously connected from both ends in the Y direction (width direction) of first side wall 131 backward in the X direction (front-rear direction). The pair of second side walls 132 also extends upward from bottom surface 111*a* of base portion 111. Yoke 240 of electromagnetic device 20 is held by first side wall 131 and the pair of second side walls 132 extending upward from bottom surface 111*a* of base portion 111, so that three sides (at least a part) of side surface 210*a* of coil 210 are surrounded.

As described above, in the present exemplary embodiment, electromagnetic device 20 is disposed on the rear side of first side wall 131. Main contact portion 40 is disposed on the front side of first side wall 131 (see FIGS. 2 to 4). That is, in the present exemplary embodiment, electromagnetic device 20 and main contact portion 40 are disposed in internal space S1 in a state partitioned in the X direction (front-rear direction) by first side wall 131.

In addition, partition wall 113 is formed on the front side of first side wall 131 of base 110, and a creepage distance between a pair of fixed contact portions 310, 310 described later is secured by partition wall 113.

In addition, base 110 is provided with raising member 114 for providing a gap between base 110 and a printed circuit board (not illustrated) when electromagnetic relay 1 is disposed on the printed circuit board.

Figure 8:
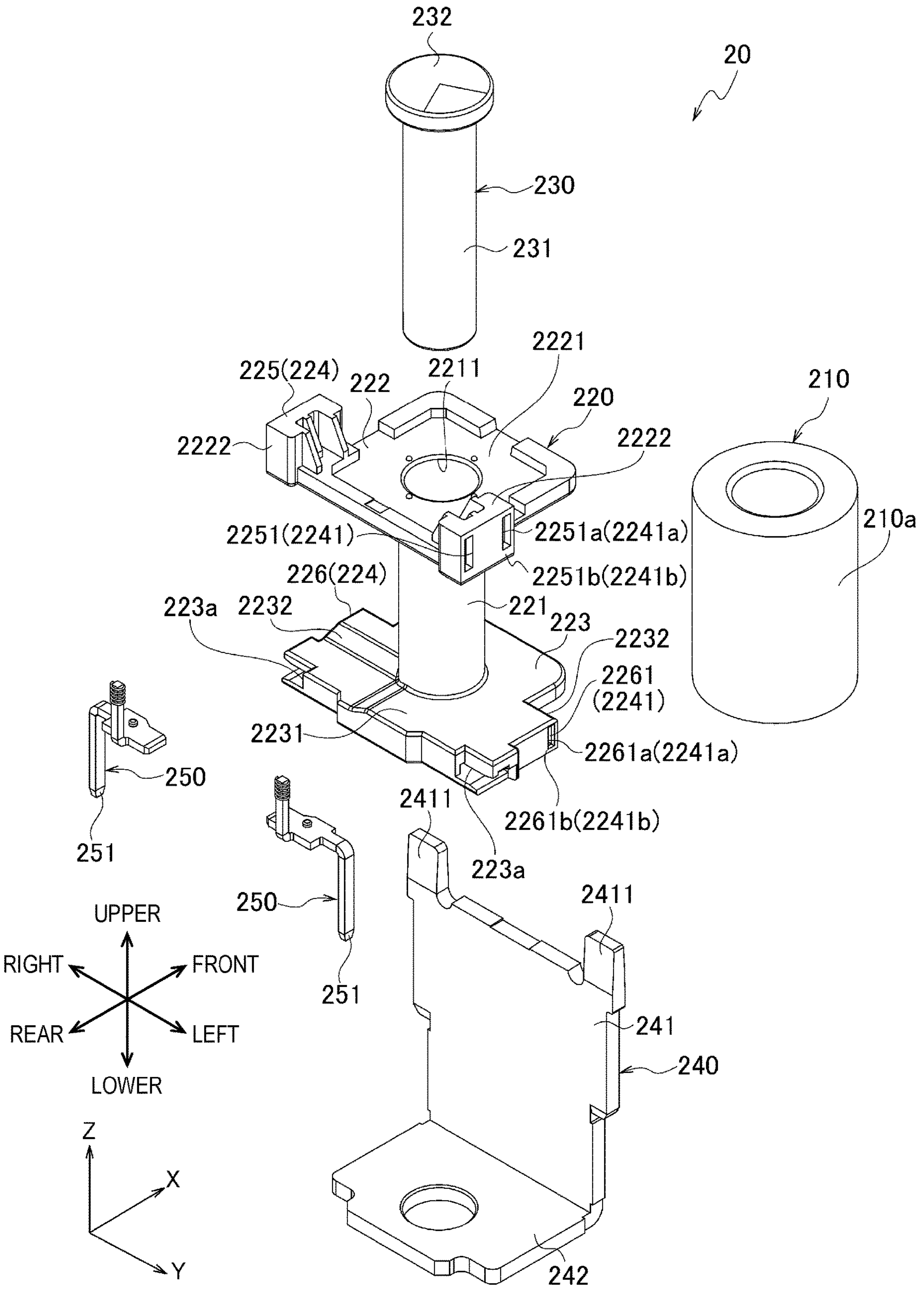
FIG. 8 is an exploded perspective view of the electromagnetic device included in the electromagnetic relay according to the first exemplary embodiment as viewed from one direction.

Electromagnetic device (drive unit) 20 is a device that generates an electromagnetic force, and includes coil 210 that generates a magnetic flux by being energized, and hollow cylindrical coil bobbin 220 around which coil 210 is wound (see FIG. 8).

As coil 210, for example, a conductive wire can be used. In the present exemplary embodiment, coil 210 is disposed in internal space S1 of housing 10 such that the axial direction extends in the Z direction (vertical direction) in a state where base 110 is positioned on the lower side of case 120.

coil bobbin 220 is formed of resin which is an insulating material, and a cylindrical portion 221 having a cylindrical shape and extending in the Z direction (vertical direction: axial direction of the coil) is formed at a central portion of coil bobbin 220. Through-hole 2211 penetrating in the Z direction (vertical direction: axial direction of coil) is formed inside cylindrical portion 221.

In addition, coil bobbin 220 includes upper flange portion 222 in a substantially rectangular shape which is continuously connected to the upper end of cylindrical portion 221 around which coil 210 is wound on the outer surface and protrudes radially outward of cylindrical portion 221. Coil bobbin 220 includes lower flange portion 223 in a substantially rectangular shape which is continuously connected to the lower end of cylindrical portion 221 and protrudes radially outward of cylindrical portion 221.

Further, in the present exemplary embodiment, upper flange portion 222 includes upper flange body 2221 in a substantially rectangular shape protruding outward in the radial direction of cylindrical portion 221, and a pair of extended portions 2222 provided continuously from a rear end of upper flange body 2221 in the X direction (front-rear direction) so as to protrude outward in the Y direction (width direction) and upward in the Z direction (vertical direction: axial direction of the coil). Auxiliary contact portion 60 is held by the pair of extended portions 2222.

On the other hand, lower flange portion 223 includes lower flange body 2231 in a substantially rectangular shape protruding outward in the radial direction of cylindrical portion 221, and a pair of extended portions 2232 provided continuously on the rear end side of lower flange body 2231 in the X direction (front-rear direction) so as to protrude outward in the Y direction (width direction). Auxiliary contact portion 60 is held by the pair of extended portions 2232.

Electromagnetic device 20 also includes iron core 230 that is inserted into through-hole 2211 formed in cylindrical portion 221 of coil bobbin 220 and is magnetized (through which magnetic flux passes) by energized coil 210. Iron core 230 is disposed inside coil 210.

Iron core 230 includes shaft portion 231 in a substantially columnar shape extending in the Z direction (vertical direction) and head 232 in a substantially columnar shape formed to have a larger diameter than shaft portion 231 and continuously connected to an upper end of shaft portion 231 (see FIG. 8).

Electromagnetic device 20 includes yoke 240 disposed around coil 210 wound around cylindrical portion 221. In the present exemplary embodiment, yoke 240 is a substantially plate-shaped member made of a magnetic material, and has a substantially L shape in a side view (as viewed along the Y direction). That is, yoke 240 includes vertical wall (upright portion) 241 disposed on the front side of coil 210 wound around cylindrical portion 221 so as to extend substantially along the vertical plane, and horizontal wall 242 extending to the rear side from the lower end of vertical wall 241 (see FIG. 8). Such yoke 240 can be formed, for example, by bending one plate.

As described above, yoke 240 is supported by first side wall 131 and the pair of second side walls 132 extending upward from bottom surface 111*a* of base portion 111 (see FIGS. 3 and 4). A pair of protruding portions (extension parts) 2411 projecting upward is formed at both ends in the Y direction (width direction) of vertical wall (upright portion) 241 of yoke 240, and armature 310 is disposed between the pair of protruding portions (extension parts) 2411.

Further, electromagnetic device 20 includes a pair of coil terminals 250 to which both ends of coil 210 are connected, and electromagnetic device 20 is driven by energizing coil 210 via the pair of coil terminals 250. In the present exemplary embodiment, coil terminal 250 is fixed to coil bobbin 220 in a state where distal end (connecting piece) 251 protrudes downward (outward) in the vertical direction (Z direction) from housing 10. Specifically, coil terminals 250 are respectively held in a pair of coil terminal holding grooves 223*a* formed in a pair of extended portions 2232 (see FIG. 8).

Then, moving member 30 is moved by switching the driving state of electromagnetic device 20.

In the present exemplary embodiment, moving member 30 includes armature 310 disposed so as to face head 232 of iron core 230 in the vertical direction (Z direction), and hinge spring 320 attached across armature 310 and yoke 240.

Armature 310 is formed of a conductive metal, and is disposed so as to be swingable in the vertical direction (Z direction) with respect to head 232 of iron core 230 according to the excitation/non-excitation of coil 210.

Figure 9:
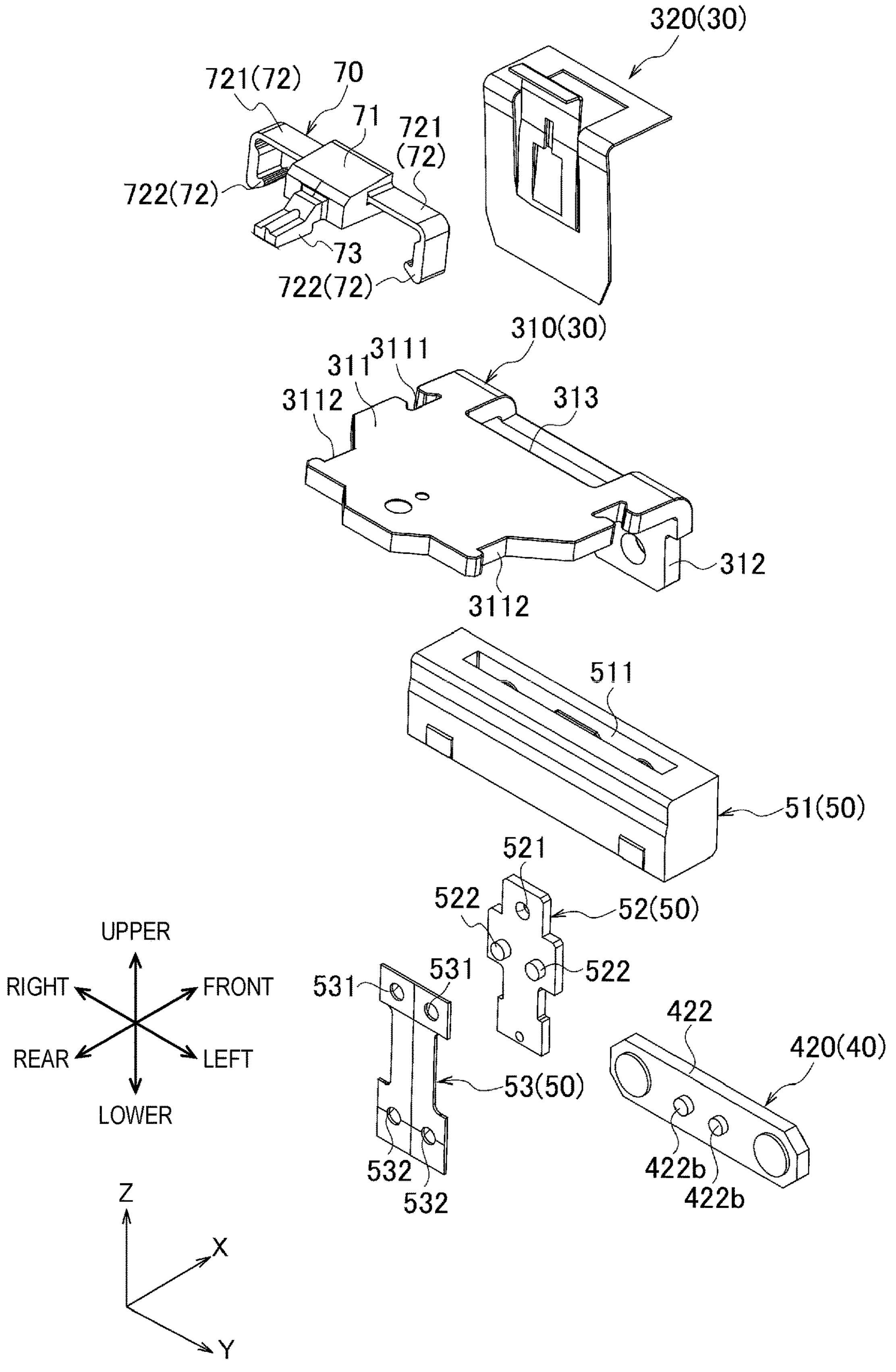
FIG. 9 is an exploded perspective view of a moving member, a movable part, and a main moving contact portion included in the electromagnetic relay according to the first exemplary embodiment as viewed from one direction.
Figure 10:
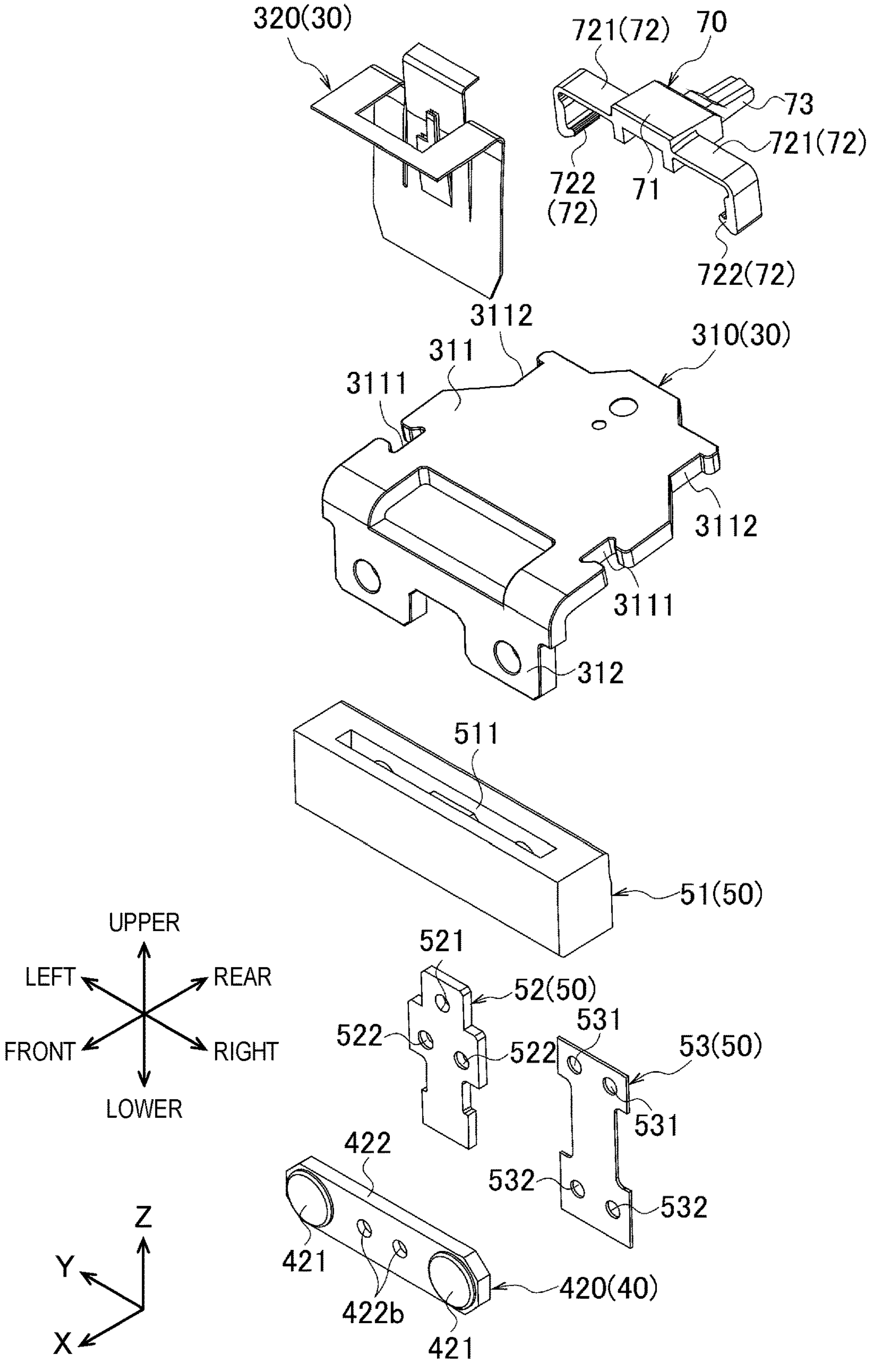
FIG. 10 is an exploded perspective view of the moving member, the movable part, and the main moving contact portion included in the electromagnetic relay according to the first exemplary embodiment as viewed from another direction.

In the present exemplary embodiment, armature 310 includes horizontal wall 311 facing head 232 of iron core 230 in the vertical direction (Z direction), and vertical wall 312 extending downward from the front end of horizontal wall 311 in the X direction (front-rear direction) (see FIGS. 9 and 10).

Horizontal wall 311 of armature 310 is attached to the upper end of vertical wall 241 so as to be swingable in the vertical direction (Z direction), and armature 310 can rotate in the Z direction (vertical direction) about a portion supported by yoke 240.

Specifically, cutouts 3111 are formed at both ends in the Y direction (width direction) at the front end in the X direction (front-rear direction) of horizontal wall 311. Protruding portion (extension portion) 2411 of yoke 240 is inserted into cutout 3111, whereby armature 310 is supported by yoke 240. As described above, in the present exemplary embodiment, cutout 3111 is a portion supported by yoke 240 of armature 310.

Further, in the present exemplary embodiment, through-hole 313 penetrating in the Z direction (vertical direction) is formed at the front end of armature 310 in the X direction (front-rear direction). Hinge spring 320 is attached across armature 310 and yoke 240 in a state of being inserted into through-hole 313. At this time, armature 310 is biased by hinge spring 320 in a direction in which horizontal wall 311 is separated from head 232 of iron core 230.

When coil 210 is energized, armature 310 is rotated so that horizontal wall 311 approaches head 232 of iron core 230. Specifically, horizontal wall 311 of armature 310 is attracted to head 232 of iron core 230 by energizing coil 210, and armature 310 is rotated so that horizontal wall 311 approaches head 232 of iron core 230. That is, by energizing coil 210 via the pair of coil terminals 250, horizontal wall 311 of armature 310 rotates downward in the Z direction (vertical direction). At this time, vertical wall 312 continuously connected to horizontal wall 311 rotates forward in the X direction (front-rear direction).

The swing range of armature 310 is set between a position where horizontal wall 311 is farthest from head 232 of iron core 230 and a position where horizontal wall 311 is closest to head 232 of iron core 230.

In the present exemplary embodiment, the swing range of armature 310 is set between an initial position where horizontal wall 311 is disposed to be separated upward from head 232 of iron core 230 by a predetermined gap and an abutment position where horizontal wall 311 abuts on head 232 of iron core 230.

Therefore, in the present exemplary embodiment, when coil 210 is energized, armature 310 moves to the abutment position where horizontal wall 311 abuts on head 232 of iron core 230, and when the energization to coil 210 is stopped, the armature returns to the initial position by the biasing force of hinge spring 320.

As described above, armature 310 according to the present exemplary embodiment is disposed to face head 232 of iron core 230 via a predetermined gap when coil 210 is not energized, and swings so as to be attracted to head 232 side of iron core 230 when coil 210 is energized.

Then, by switching the driving state of electromagnetic device 20 and swinging armature 310, it is possible to switch conduction and non-conduction between main fixed contact portion 410 and main moving contact portion 420 paired with each other (having main contacts that come into contact with or separate from each other).

In the present exemplary embodiment, main contact portion 40 that opens and closes the main contact according to turning on and off of energization of coil 210 is provided on the front side of electromagnetic device 20.

Main contact portion 40 includes main fixed contact portion 410 and main moving contact portion 420, and main fixed contact portion 410 includes main fixed contact 411 and main body 412 having main fixed contact 411. On the other hand, main moving contact portion 420 includes main moving contact 421 that moves relative to main fixed contact 411 and can come into contact with or separate from main fixed contact 411, and moving contactor 422 having main moving contact 421.

Figure 6:
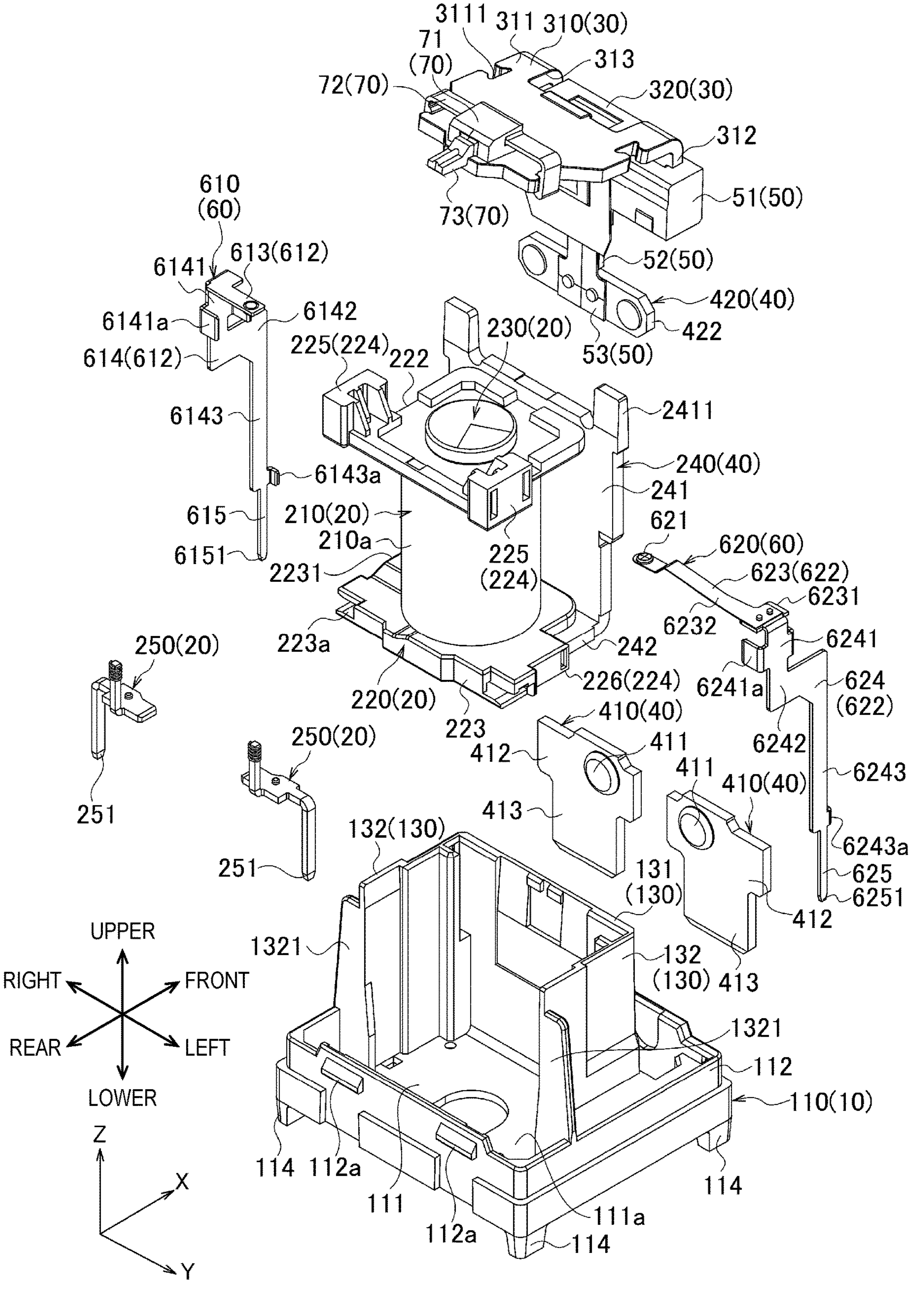
FIG. 6 is an exploded perspective view of members other than the cover of the electromagnetic relay according to the first exemplary embodiment as viewed from one direction.
Figure 7:
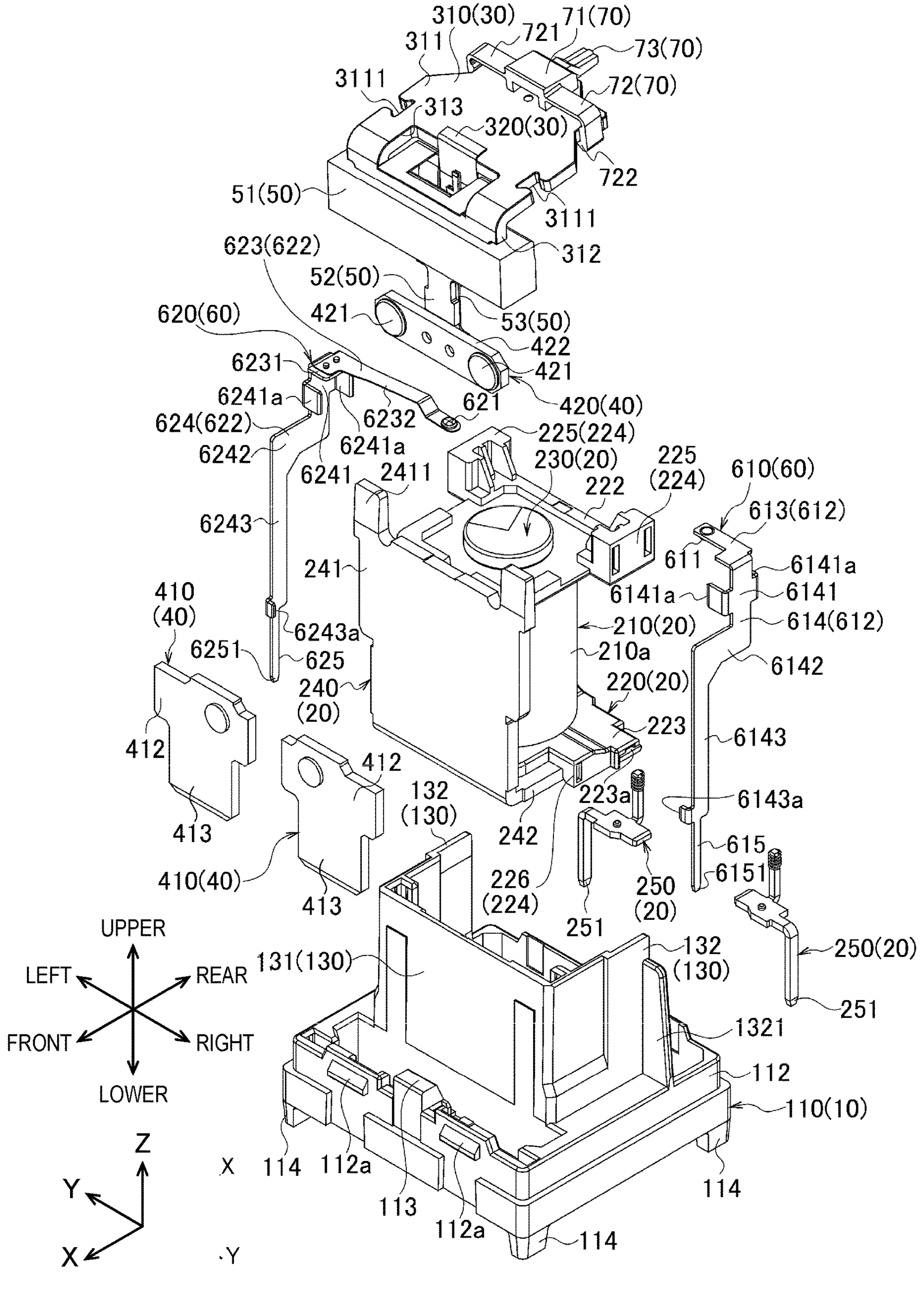
FIG. 7 is an exploded perspective view of members other than the cover of the electromagnetic relay according to the first exemplary embodiment as viewed from another direction.

In the present exemplary embodiment, main contact portion 40 includes only one set of main fixed contact portion 410 and the main moving contact portion 420 (having main contacts that come into contact with or separate from each other) forming a pair with each other (see FIGS. 6 and 7).

In the present exemplary embodiment, the set of main fixed contact portion 410 and main moving contact portion 420 having the main contacts that come into contact with or separate from each other includes the pair of main fixed contact portions 410 and one main moving contact portion 420.

Specifically, two main fixed contact portions 410 having a symmetrical shape with respect to the XZ plane are a pair of main fixed contact portions 410. Two main fixed contact portions 410 forming a pair are fixed to base 110 (housing 10) in a state of being separated in the Y direction (width direction: axial direction and direction intersecting the first direction: second direction).

Each of main fixed contact portions 410 includes main body 412 having one main fixed contact 411 (see FIGS. 6 and 7). In the present exemplary embodiment, a member to be a main fixed contact is inserted into insertion hole 412*a* formed in main body 412 so as to penetrate in the plate thickness direction, and riveting is performed, so that main body 412 has main fixed contact 411 (see FIGS. 14 and 15). As described above, in the present exemplary embodiment, main body 412 has a function as a fixed-side main contact holder that holds main fixed contact 411.

Main fixed contact 411 is not necessarily formed on main body 412 by rivet joining, and can be formed by various methods. For example, it is also possible to cause a portion protruding by performing dowel processing on main body 412 to function as a main fixed contact. Further, by bringing main moving contact 421 into contact with a part of the flat surface of main body 412, it is also possible to cause a part of the flat surface of main body 412 to function as the main fixed contact.

In addition, main fixed contact portion 410 includes connecting piece 413 that is continuously connected to the lower end of main body 412 and is fixed to base 110 (housing 10) in a state where the distal end (connection part) protrudes downward (outward) of base 110 (housing 10).

In the present exemplary embodiment, insertion hole 115 penetrating in the Z direction (vertical direction) is formed in base 110. Then, the distal end (connection part: lower end) of connecting piece 413 is inserted into insertion hole 115 from above. With such a configuration, main fixed contact portion 410 is fixed to base 110 (housing 10) in a state where the distal end (connection part: lower end) of connecting piece 413 protrudes downward (outward) from base 110 (see FIGS. 14 and 15). Main fixed contact portion 410 is fixed to base 110 (housing 10) with an adhesive or the like.

At this time, main fixed contact portion 410 is fixed to base 110 (housing 10) with main fixed contact 411 facing backward in the X direction (front-rear direction). That is, main fixed contact portion 410 is fixed to base 110 (housing 10) in a state where a surface of main body 412 on a side where main fixed contact 411 is formed (rear surface: surface on a side facing main moving contact 421) faces backward.

Note that main fixed contact 411, main body 412, and connecting piece 413 can be formed of, for example, a conductive material such as a silver-based material or a copper-based material.

As described above, in the present exemplary embodiment, two main fixed contacts 411 are disposed side by side in the Y direction that is the direction orthogonal (intersecting) to the direction in which main fixed contact 411 and main moving contact 421 relatively move. One of two main bodies 412 has one main fixed contact 411, and the other main body has other main fixed contact 411.

On the other hand, one main moving contact portion 420 includes one moving contactor 422, and one moving contactor 422 includes a pair of main moving contacts 421 arranged side by side in the Y direction (width direction) (see FIGS. 9 and 10).

In the present exemplary embodiment, a member to be a main moving contact is inserted into insertion hole 422*a* formed on both sides in the longitudinal direction of moving contactor 422 having a substantially rectangular plate shape so as to penetrate in the plate thickness direction, and riveting is performed. Thus, main moving contactor 422 includes main moving contact 421 (see FIGS. 14 and 15). As described above, in the present exemplary embodiment, moving contactor 422 has a function as a movable-side main contact holder that holds main moving contact 421.

Main moving contact 421 is not necessarily formed on moving contactor 422 by riveting, and can be formed by various methods. For example, it is also possible to cause a portion protruding by performing dowel processing on moving contactor 422 to function as a main moving contact. Further, by bringing a part of the flat surface of moving contactor 422 into contact with main fixed contact 411, it is also possible to cause a part of the flat surface of moving contactor 422 to function as the main moving contact.

One of main moving contact portions 420 is disposed so as to be located behind two main fixed contact portions 410 forming a pair in the X direction (front-rear direction) with the plate thickness direction substantially coinciding with the X direction (front-rear direction) and the longitudinal direction substantially coinciding with the Y direction (width direction). At this time, main moving contact portion 420 is disposed in a state where main moving contact 421 faces main fixed contact 411 in the X direction (front-rear direction). Specifically, moving contactor 422 is disposed such that main moving contact 421 formed on one side in the Y direction (width direction) faces main fixed contact 411 of main fixed contact portion 410 disposed on one side in the Y direction (width direction) in the X direction (front-rear direction). Similarly, moving contactor 422 is disposed such that main moving contact 421 formed on the other side in the Y direction (width direction) faces main fixed contact 411 of main fixed contact portion 410 disposed on the other side in the Y direction (width direction) in the X direction (front-rear direction). Thus, one main moving contact 421 comes into contact with or separates from one main fixed contact 411 of two main fixed contacts 411, and other main moving contact 421 comes into contact with or separates from other main fixed contact 411. One moving contactor 422 includes two main moving contacts 421.

Note that main moving contact 421 and moving contactor 422 can also be formed of, for example, a conductive material such as a silver-based material or a copper-based material.

A set including the pair of main fixed contact portions 410 and one main moving contact portion 420 having such a configuration is accommodated on the front side of first side wall 131 in the X direction (front-rear direction: first direction) in internal space S1 (see FIGS. 12 to 15).

Here, main moving contact portion 420 is disposed so as to be relatively swingable in the X direction (front-rear direction) with respect to the pair of main fixed contact portions 410.

In the present exemplary embodiment, main contact portion 40 is continuously connected to armature 310 via movable part 50. By swinging movable part 50 in the X direction (front-rear direction) along with the swinging of armature 310, main moving contact portion 420 swings in the X direction (front-rear direction) in conjunction with the operation of movable part 50. That is, by causing movable part 50 to hold main moving contact portion 420, main moving contact portion 420 swings relative to the pair of main fixed contact portions 410 in the X direction (front-rear direction).

As illustrated in FIGS. 9 and 10, in the present exemplary embodiment, movable part 50 includes holder part 51 which is formed of an insulating resin material and has an upper portion in which insertion hole 511 into which vertical wall 312 of armature 310 is inserted and held is formed. Movable part 50 includes movable plate 52 continuously connected to a lower portion of holder part 51, and movable spring 53 connecting movable plate 52 and moving contactor 422.

In the present exemplary embodiment, through-hole 521 penetrating in the plate thickness direction is formed in an upper portion of movable plate 52 in the Z direction (vertical direction). Then, in a state where the upper end of movable plate 52 is inserted into an insertion hole (not illustrated) formed at the lower end of holder part 51, a projection formed in the insertion hole (not illustrated) of holder part 51 is inserted into through-hole 521, so that movable plate 52 is held by holder part 51.

In addition, projection 522 protruding backward is formed at a central portion of movable plate 52 in the Z direction (vertical direction), and upper through-hole 531 penetrating in the plate thickness direction is formed at an upper portion of movable spring 53 in the Z direction (vertical direction). Projection 522 of movable plate 52 is inserted into upper through-hole 531 of movable spring 53, so that movable spring 53 is held by movable plate 52.

Further, lower through-hole 532 penetrating in the plate thickness direction is formed at a lower portion of movable spring 53 in the Z direction (vertical direction), and projection 422*b* protruding backward is formed at a central portion of moving contactor 422 in the Y direction (width direction). Projection 422*b* of moving contactor 422 is inserted into lower through-hole 532 of movable spring 53 so that movable spring 53 holds moving contactor 422.

In this way, main contact portion 40 is continuously connected to armature 310 via movable part 50.

With such a configuration, main moving contact portion 420 swings relative to the pair of main fixed contact portions 410 in the X direction (front-rear direction) as armature 310 swings. Therefore, main moving contact 421 swings so as to draw an arc around the upper end of vertical wall 312.

Further, in the present exemplary embodiment, auxiliary contact portion 60 is disposed in internal space S1 of housing 10 separately from main contact portion 40. Auxiliary contact portion 60 is disposed in internal space S1 in a state in which the auxiliary contacts (auxiliary fixed contact 611 and auxiliary moving contact 621) exist at positions on the rear side in the X direction (front-rear direction) and on the upper end side of coil 210. Specifically, auxiliary fixed contact 611 and auxiliary moving contact 621 of auxiliary contact portion 60 are disposed on the other side (rear side) in the first direction (X direction) with respect to the axis of coil 210, and are disposed on the upper end side in the axial direction (Z direction) of coil 210 in a state where distal end (connecting piece) 251 of coil terminal 250 is located below coil 210 while coil 210 is disposed such that the axial direction (Z direction) extends in the vertical direction.

Auxiliary contact portion 60 includes auxiliary fixed contact portion 610 and auxiliary moving contact portion 620, and auxiliary fixed contact portion 610 includes auxiliary fixed contact 611 and first auxiliary contact terminal 612 having auxiliary fixed contact 611. On the other hand, auxiliary moving contact portion 620 includes auxiliary moving contact 621 that moves relative to auxiliary fixed contact 611 and can come into contact with or separate from auxiliary fixed contact 611, and second auxiliary contact terminal 622 having auxiliary moving contact 621.

In the present exemplary embodiment, auxiliary contact portion 60 includes only one set of auxiliary fixed contact portion 610 and auxiliary moving contact portion 620 (having auxiliary contacts that come into contact with or separate from each other) forming a pair with each other (see FIGS. 6 and 7).

In the present exemplary embodiment, the set of auxiliary fixed contact portion 610 and auxiliary moving contact portion 620 having the auxiliary contacts that come into contact with or separate from each other includes one auxiliary fixed contact portion 610 and one auxiliary moving contact portion 620. One auxiliary fixed contact 611 is formed in one auxiliary fixed contact portion 610, and only one auxiliary moving contact 621 that comes into contact with or separates from one auxiliary fixed contact 611 is formed in one auxiliary moving contact portion 620.

In the present exemplary embodiment, as described above, auxiliary fixed contact portion 610 includes first auxiliary contact terminal 612 having one auxiliary fixed contact 611.

Figure 11:
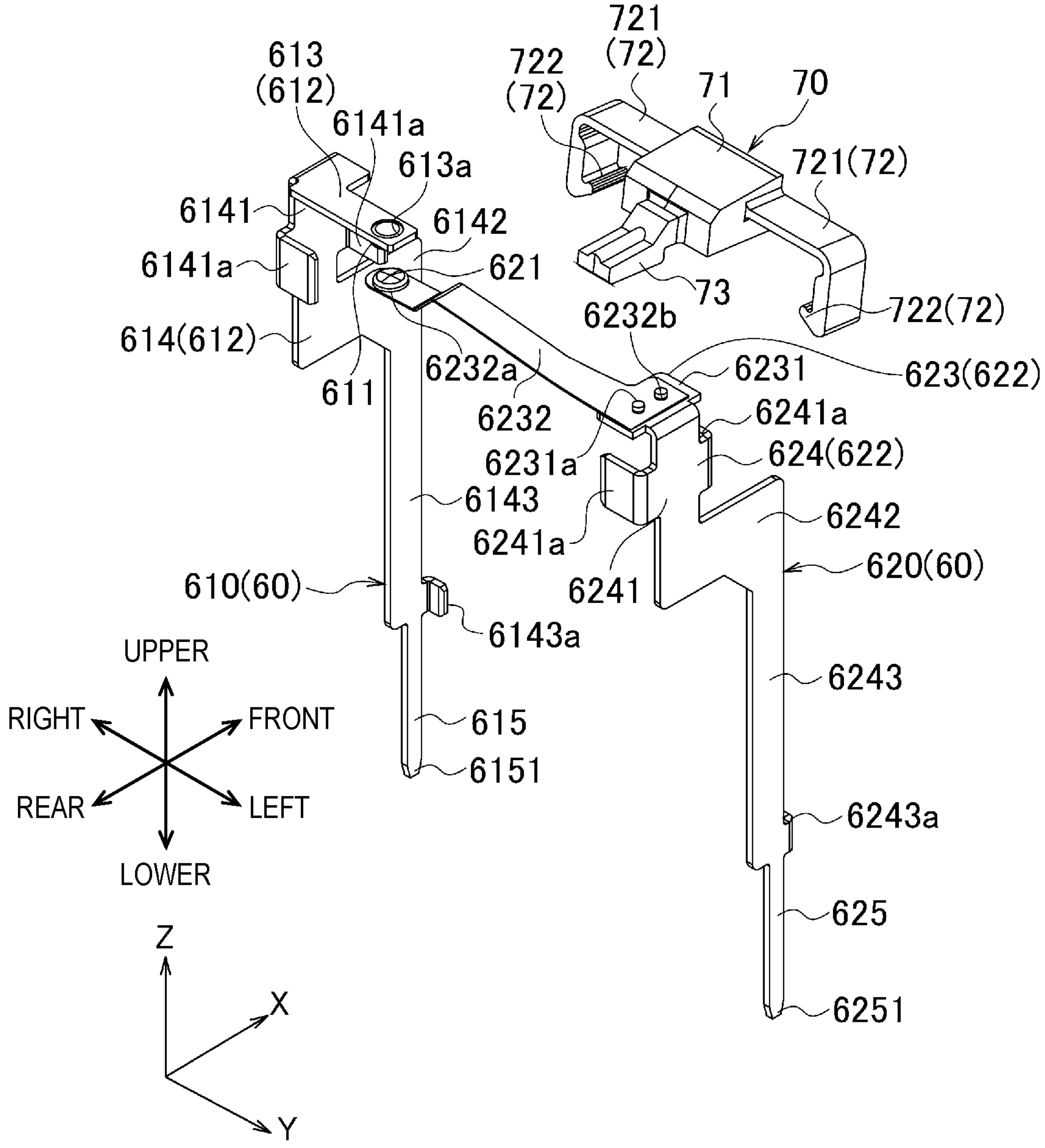
FIG. 11 is an exploded perspective view of an auxiliary contact portion included in the electromagnetic relay according to the first exemplary embodiment as viewed from one direction.

First auxiliary contact terminal 612 includes upper piece 613 extending in the Y direction (width direction: direction intersecting the axial direction and the first direction: second direction) on the upper end side of coil 210. Auxiliary fixed contact 611 is formed on upper piece 613. In the present exemplary embodiment, a member to be an auxiliary fixed contact is inserted into insertion hole 613*a* formed in upper piece 613 so as to penetrate in the plate thickness direction, and riveting is performed, so that upper piece 613 has auxiliary fixed contact 611 (see FIG. 11). As described above, in the present exemplary embodiment, upper piece 613 has a function as a fixed-side auxiliary contact holder that holds auxiliary fixed contact 611.

Auxiliary fixed contact 611 is not necessarily formed on upper piece 613 by riveting, and can be formed by various methods. For example, it is also possible to cause a portion protruding by performing dowel processing on upper piece 613 to function as an auxiliary fixed contact. In addition, by bringing auxiliary moving contact 621 into contact with a part of the flat surface of upper piece 613, it is also possible to cause a part of the flat surface of upper piece 613 to function as an auxiliary fixed contact. A plurality of auxiliary fixed contacts 611 may be provided on upper piece 613 (first auxiliary contact terminal 612).

In addition, first auxiliary contact terminal 612 includes side piece 614 that is continuously connected to an outer end of upper piece 613 in the Y direction (width direction: second direction), extends along the XZ plane, and is elongated in the Z direction (vertical direction: axial direction). In the present exemplary embodiment, side piece 614 is connected to upper piece 613 so as to extend downward in the Z direction (vertical direction: axial direction) from upper piece 613, and is disposed on the side of coil 210 in the Y direction (width direction: second direction).

First auxiliary contact terminal 612 includes connecting piece 615 extending downward from the lower end of side piece 614. Connecting piece 615 is formed so as to protrude below (outward) base 110 in a state where side piece 614 is held by coil bobbin 220 disposed on base 110.

Side piece 614 includes first side piece 6141 continuously connected to an outer end of upper piece 613 in the Y direction (width direction: second direction), and coupling part 6142 extending forward in the X direction (front-rear direction: first direction) from a lower end of first side piece 6141. Side piece 614 further includes second side piece 6143 extending downward in the Z direction (vertical direction: axial direction) from a front end lower portion of coupling part 6142. Connecting piece 615 is coupled to the lower end of second side piece 6143 so as to protrude downward (outward) from housing 10. In the present exemplary embodiment, distal end 6151 of connecting piece 615 is located below coil 210 in the Z direction (vertical direction: axial direction).

In the present exemplary embodiment, side piece 614 includes first side piece 6141 connected to upper piece 613, second side piece 6143 connected to connecting piece 615 and disposed at a position shifted forward in the X direction (front-rear direction: first direction) with respect to first side piece 6141, and coupling part 6142 connecting first side piece 6141 and second side piece 6143, and has a shape bent into a crank shape when viewed from the Y direction (width direction: second direction).

In the present exemplary embodiment, auxiliary fixed contact portion 610 is held by coil bobbin 220.

In the present exemplary embodiment, auxiliary fixed contact portion 610 is held by coil bobbin 220 with auxiliary fixed contact 611 facing downward in the Z direction (vertical direction: axial direction). That is, auxiliary fixed contact portion 610 is held by coil bobbin 220 in a state where the surface of upper piece 613 on the side where auxiliary fixed contact 611 is formed (lower surface: surface facing auxiliary moving contact 621) faces downward.

Further, auxiliary fixed contact 611 and first auxiliary contact terminal 612 can be formed of, for example, a conductive material such as a silver-based material or a copper-based material.

On the other hand, as described above, auxiliary moving contact portion 620 includes second auxiliary contact terminal 622 having one auxiliary moving contact 621.

Second auxiliary contact terminal 622 includes upper piece 623 extending in the Y direction (width direction: direction intersecting the axial direction and the first direction: second direction) on the upper end side of coil 210. Auxiliary moving contact 621 is formed on upper piece 623.

In the present exemplary embodiment, upper piece 623 includes main body 6231 having a substantially rectangular plate shape and leaf spring 6232 extending in the horizontal direction and elongated in the Y direction (width direction). Leaf spring 6232 has auxiliary moving contact 621.

In the present exemplary embodiment, leaf spring 6232 has a shape bent in a crank shape such that the distal end (end on the inner side in the Y direction) is positioned downward. Then, a member to be an auxiliary moving contact is inserted into insertion hole 6232*a* formed at the distal end of leaf spring 6232 so as to penetrate in the plate thickness direction, and riveting is performed so that leaf spring 6232 has auxiliary moving contact 621 (see FIG. 11). As described above, in the present exemplary embodiment, leaf spring 6232 has a function as a movable-side auxiliary contact holder that holds auxiliary moving contact 621.

Auxiliary moving contact 621 is not necessarily formed on leaf spring 6232 (see FIG. 11) by riveting, but can be formed by various methods. For example, it is also possible to cause a portion protruding by performing dowel processing on leaf spring 6232 to function as an auxiliary moving contact. In addition, by bringing auxiliary moving contact 621 into contact with a part of the flat surface of leaf spring 6232, it is also possible to cause a part of the flat surface of leaf spring 6232 to function as an auxiliary moving contact. A plurality of auxiliary moving contacts 621 may be provided on leaf spring 6232 (upper piece 623: second auxiliary contact terminal 622).

Further, main body 6231 is continuously provided at an outer end of leaf spring 6232 in the Y direction (width direction). Specifically, a pair of insertion holes 6232*b* is formed at an outer end in the Y direction (width direction) of leaf spring 6232 so as to be aligned in the X direction (front-rear direction), and a pair of projections 6231*a* is formed on main body 6231 so as to be aligned in the X direction (front-rear direction). The pair of projections 6231*a* is inserted into the pair of insertion holes 6232*b*, and riveting is performed to continuously connect leaf spring 6232 to main body 6231.

In addition, second auxiliary contact terminal 622 includes side piece 624 which is continuously provided to an outer end in the Y direction (width direction: second direction) in main body 6231 (upper piece 623), extends along the XZ plane, and is elongated in the Z direction (vertical direction: axial direction). In the present exemplary embodiment, side piece 624 is connected to main body 6231 (upper piece 623) so as to extend downward in the Z direction (vertical direction: axial direction) from main body 6231 (upper piece 623), and is disposed on a side of coil 210 in the Y direction (width direction: second direction).

Second auxiliary contact terminal 622 includes connecting piece 625 extending downward from the lower end of side piece 624. Connecting piece 625 is formed so as to protrude below (outward) base 110 in a state where side piece 624 is held by coil bobbin 220 disposed on base 110.

Side piece 624 includes first side piece 6241 continuously connected to an outer end in the Y direction (width direction: second direction) in main body 6231 (upper piece 623), and coupling part 6242 extending forward in the X direction (front-rear direction: first direction) from a lower end of first side piece 6241. Side piece 624 further includes second side piece 6243 extending downward in the Z direction (vertical direction: axial direction) from a front end lower portion of coupling part 6242. Connecting piece 625 is coupled to the lower end of second side piece 6243 so as to protrude downward (outward) from housing 10. In the present exemplary embodiment, distal end 6251 of connecting piece 625 is located below coil 210 in the Z direction (vertical direction: axial direction).

As described above, in the present exemplary embodiment, side piece 624 includes first side piece 6241 connected to main body 6231 (upper piece 623), second side piece 6243 connected to connecting piece 625 and disposed at a position shifted forward in the X direction (front-rear direction: first direction) with respect to first side piece 6241, and coupling part 6242 connecting first side piece 6241 and second side piece 6243, and has a shape bent into a crank shape when viewed from the Y direction (width direction: second direction).

Further, in the present exemplary embodiment, auxiliary moving contact portion 620 is held by coil bobbin 220.

In the present exemplary embodiment, auxiliary moving contact portion 620 is held by coil bobbin 220 with auxiliary moving contact 621 facing upward in the Z direction (vertical direction). That is, auxiliary moving contact portion 620 is held by coil bobbin 220 in a state where the surface of leaf spring 6232 on the side where auxiliary moving contact 621 is formed (upper surface: surface on the side facing auxiliary fixed contact 611) faces upward.

Further, auxiliary moving contact 621 and second auxiliary contact terminal 622 can be formed of, for example, a conductive material such as a silver-based material or a copper-based material.

A set including one auxiliary fixed contact portion 610 and one auxiliary moving contact portion 620 having such a configuration is accommodated behind first side wall 131 in the X direction (front-rear direction: first direction) and on the upper end side of coil 210 in internal space S1 (see FIGS. 12 to 15). Auxiliary fixed contact 611 and auxiliary moving contact 621 are disposed above head 232 of iron core 230 in the Z direction (vertical direction).

Here, auxiliary moving contact portion 620 is disposed so that leaf spring 6232 can swing relative to auxiliary fixed contact portion 610 in the Z direction (vertical direction). In the present exemplary embodiment, leaf spring 6232 can be relatively swung in the Z direction (vertical direction) with respect to auxiliary fixed contact portion 610 by auxiliary drive unit 70. That is, by switching the driving state of electromagnetic device 20 and swinging auxiliary drive unit 70, conduction and non-conduction between auxiliary fixed contact portion 610 and auxiliary moving contact portion 620 paired with each other (having auxiliary contacts that come into contact with or separate from each other) can be switched.

In the present exemplary embodiment, auxiliary drive unit 70 is made of an insulating resin material and is held by horizontal wall 311 of armature 310. Auxiliary drive unit 70 is swung in the Z direction (vertical direction) along with the swinging of armature 310. In this way, leaf spring 6232 is swung in the Z direction (vertical direction) along with the swinging of auxiliary drive unit 70 in the Z direction (vertical direction).

Auxiliary drive unit 70 includes main body 71 and fixed part 72 which is continuously provided so as to protrude outward in the Y direction (width direction) from main body 71 and is held by horizontal wall 311 of armature 310. Further, auxiliary drive unit 70 includes push-up part 73 that is continuously provided so as to protrude from main body 71 toward the rear side in the X direction (front-rear direction) and pushes up leaf spring 6232.

In the present exemplary embodiment, fixed part 72 includes arm portion 721 that protrudes outward in the Y direction (width direction), and hook portion 722 that is continuously provided downward in the Z direction (vertical direction) from an outer end in the Y direction (width direction) of arm portion 721.

Held part 3112 which holds auxiliary drive unit 70 is formed on a rear portion of horizontal wall 311 of armature 310 in the X direction (front-rear direction). By hooking a pair of hook portions 72 on the held part 3112, auxiliary drive unit 70 is held by horizontal wall 311 of armature 310.

As described above, in the present exemplary embodiment, by swinging auxiliary drive unit 70 in conjunction with the swinging of armature 310, conduction and non-conduction between auxiliary fixed contact portion 610 and auxiliary moving contact portion 620 having the auxiliary contact that comes into contact with or separates from each other can be switched. That is, main contact portion 40 is brought into and out of contact with one end of armature 310, and auxiliary contact portion 60 comes into contact with or separates from the other end of armature 310.

With such a configuration, auxiliary moving contact portion 620 swings relative to auxiliary fixed contact portion 610 in the Z direction (vertical direction) as armature 310 swings. At this time, auxiliary moving contact 621 swings so as to draw an arc around the outer end in the Y direction (width direction) of leaf spring 6232.

In the present exemplary embodiment, leaf spring 6232 is continuously connected to second auxiliary contact terminal 622 held by coil bobbin 220 in a state where auxiliary moving contact 621 is separated from auxiliary fixed contact 611 in the natural state. In the state where the energization to coil 210 is stopped, push-up part 73 of auxiliary drive unit 70 is pushed up by coming into contact with leaf spring 6232, and auxiliary moving contact 621 comes into contact with auxiliary fixed contact 611.

On the other hand, in a state where coil 210 is energized, the rear end side of horizontal wall 311 of armature 310 rotates downward, and auxiliary drive unit 70 moves downward as the rear end side of horizontal wall 311 rotates downward. When auxiliary drive unit 70 moves downward, leaf spring 6232 moves downward by the elastic restoring force, and auxiliary moving contact 621 is separated from auxiliary fixed contact 611.

In addition, auxiliary drive unit 70 may drive leaf spring 6232 using another method. As another method in which auxiliary drive unit 70 drives leaf spring 6232, for example, there is a method in which, when auxiliary drive unit 70 is separated from leaf spring 6232, auxiliary moving contact 621 is brought into contact with auxiliary fixed contact 611 by the elastic restoring force of leaf spring 6232 to be in the conductive state, and auxiliary moving contact 621 is separated from auxiliary fixed contact 611 to be in the non-conductive state by pushing down leaf spring 6232 by auxiliary drive unit 70.

As described above, in the present exemplary embodiment, auxiliary contact portion 60 is provided such that the on state and the off state are opposite to main contact portion 40.

Next, an example of the operation of electromagnetic relay 1 having the above-described configuration will be described.

First, in a state where coil 210 is not energized, horizontal wall 311 of armature 310 is moved in a direction away from head 232 of iron core 230 by the elastic force of hinge spring 320. At this time, since vertical wall 312 of armature 310 is located behind in the X direction (front-rear direction), movable part 50 is also located behind in the X direction (front-rear direction). That is, main moving contact portion 420 held by movable part 50 is separated from main fixed contact portion 410, and main moving contact 421 is separated from main fixed contact 411 (see FIGS. 12 and 14).

Figure 12:
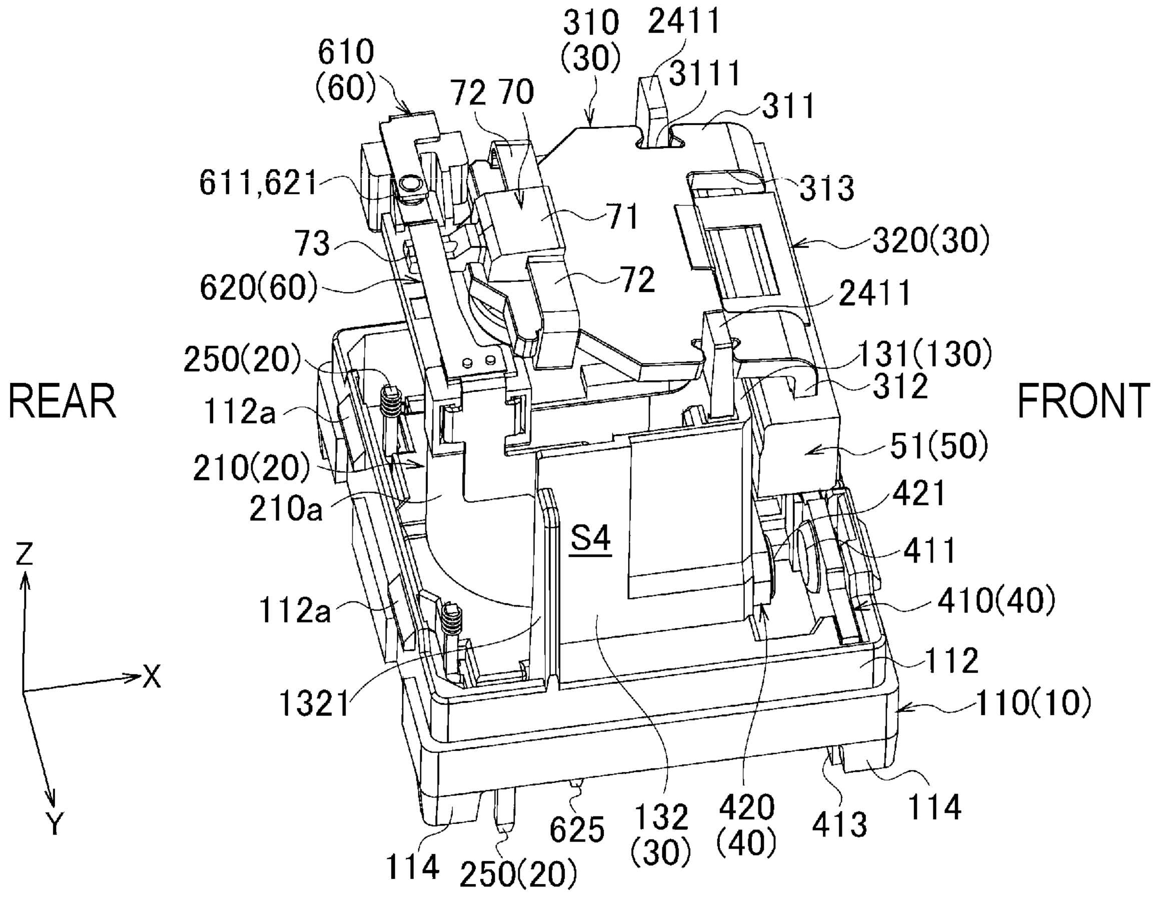
FIG. 12 is a view illustrating contact or separation between the main contact portion and the auxiliary contact portion according to the first exemplary embodiment, and is a perspective view illustrating a state in which the main contact portion and the auxiliary contact portion are at a second position.
Figure 13:
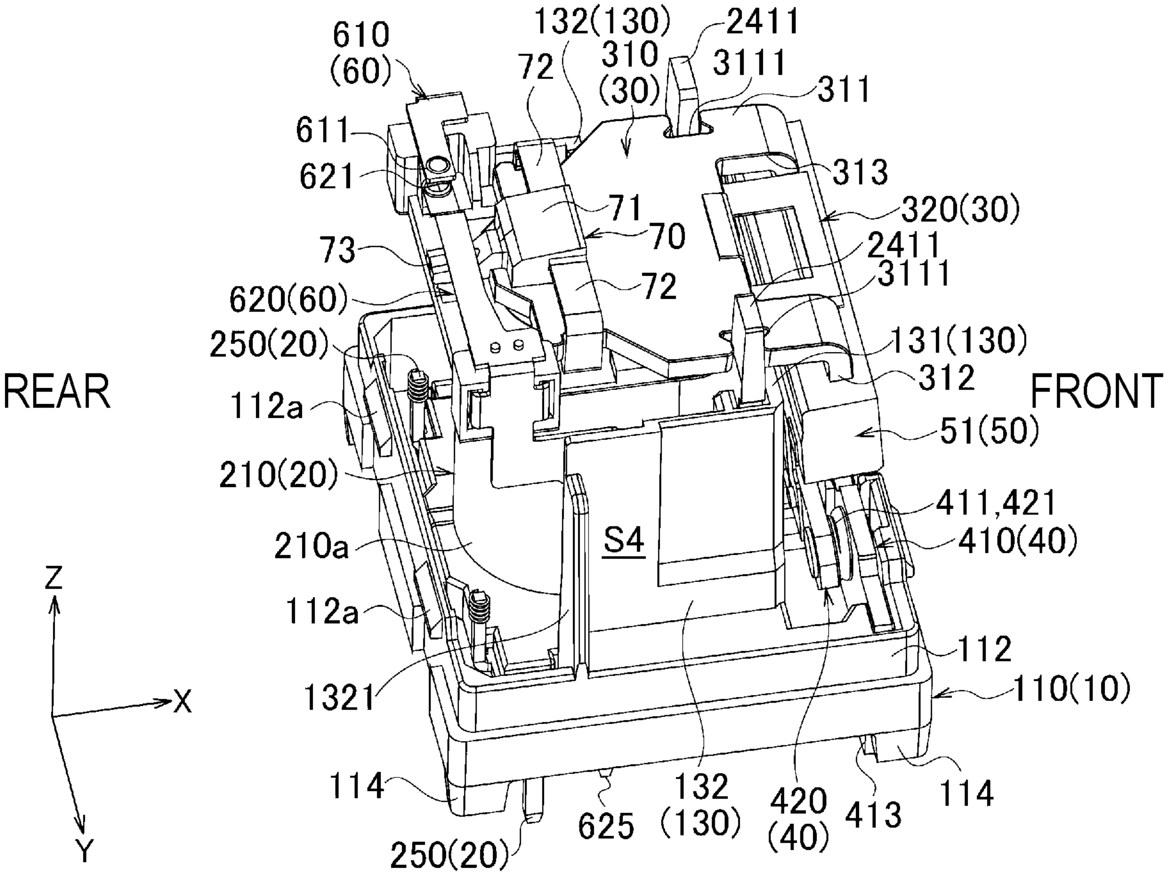
FIG. 13 is a view illustrating contact or separation between the main contact portion and the auxiliary contact portion according to the first exemplary embodiment, and is a perspective view illustrating a state in which the main contact portion and the auxiliary contact portion are at a first position.
Figure 14:
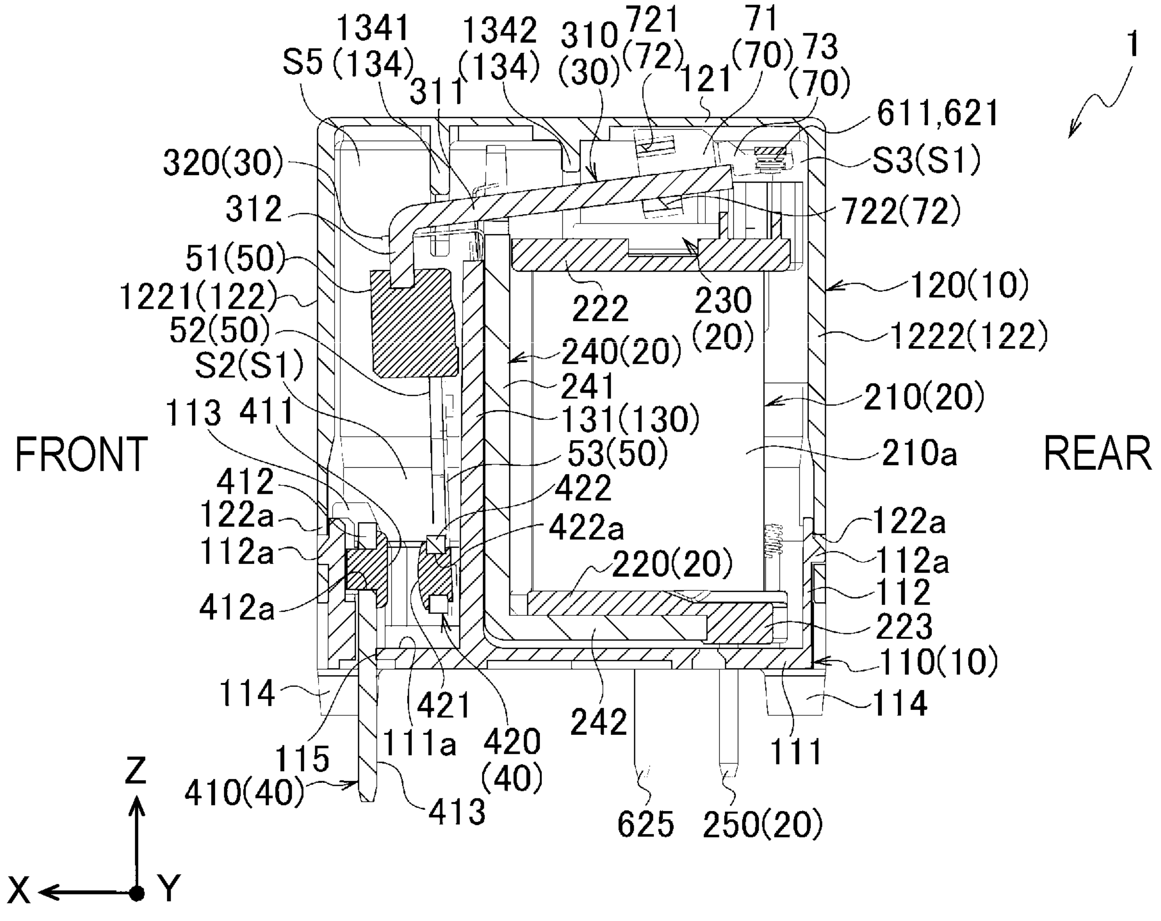
FIG. 14 is a view illustrating the contact or separation between the main contact portion and the auxiliary contact portion according to the first exemplary embodiment, and is a vertical cross-sectional view illustrating a state in which the main contact portion and the auxiliary contact portion are at a second position.

On the other hand, since auxiliary drive unit 70 also moves in the direction away from head 232 of iron core 230, leaf spring 6232 is pushed up by push-up part 73 of auxiliary drive unit 70, and auxiliary moving contact 621 comes into contact with auxiliary fixed contact 611 (see FIGS. 12 and 14).

When coil 210 is energized from the off state, horizontal wall 311 of armature 310 is attracted downward (toward iron core 230) by the electromagnetic force, and approaches head 232 of iron core 230 against the elastic force of hinge spring 320. Then, vertical wall 312 rotates forward as horizontal wall 311 rotates downward (toward iron core 230), and movable part 50 rotates forward as vertical wall 312 rotates forward. Consequently, moving contactor 422 held by movable part 50 rotates forward toward main fixed contact portion 410, and main moving contact 421 of moving contactor 422 comes into contact with main fixed contact 411 of main fixed contact portion 410. Thus, the pair of main fixed contact portions 410 is electrically connected by main moving contact portion 420 (see FIGS. 13 and 15).

On the other hand, since auxiliary drive unit 70 also moves in the direction approaching head 232 of iron core 230, push-up part 73 of auxiliary drive unit 70 is lowered, and auxiliary moving contact 621 is separated from auxiliary fixed contact 611. Accordingly, the electrical connection between auxiliary fixed contact portion 610 and auxiliary moving contact portion 620 is released (see FIGS. 13 and 15).

Then, when the energization to coil 210 is stopped in this state, horizontal wall 311 of armature 310 rotates upward (the side away from iron core 230) by the biasing force of hinge spring 320 and returns to the initial position. In addition, vertical wall 312 rotates backward as horizontal wall 311 rotates upward, and movable part 50 rotates backward as vertical wall 312 rotates backward. As a result, moving contactor 422 held by movable part 50 rotates backward so as to be separated from main fixed contact portion 410, and main moving contact 421 of moving contactor 422 is separated from main fixed contact 411 of main fixed contact portion 410. In this way, the electrical connection between the pair of main fixed contact portions 410 is released.

On the other hand, since auxiliary drive unit 70 also moves in a direction away from head 232 of iron core 230, leaf spring 6232 is pushed up by push-up part 73 of auxiliary drive unit 70 and returns to the initial position. As a result, auxiliary moving contact 621 comes into contact with auxiliary fixed contact 611, and auxiliary fixed contact portion 610 and auxiliary moving contact portion 620 are electrically connected.

As described above, in the present exemplary embodiment, when armature 310 is at the initial position, main moving contact 421 and main fixed contact 411 are separated from each other, and auxiliary moving contact 621 and auxiliary fixed contact 611 are at the second position in contact with each other (see FIGS. 12 and 14). On the other hand, when armature 310 is at the abutment position, main moving contact 421 and main fixed contact 411 are in contact with each other, and auxiliary moving contact 621 and auxiliary fixed contact 611 are at the first position to be separated from each other (see FIGS. 13 and 15).

Therefore, while coil 210 is not energized, the pair of main fixed contact portions 410 are insulated from each other, and while coil 210 is energized, the pair of main fixed contact portions 410 are electrically connected to each other. As described above, in the present exemplary embodiment, main moving contact 421 is configured to be able to relatively reciprocate (turn) in the first direction (X direction: front-rear direction) with respect to main fixed contact 411 between the first position and the second position.

On the other hand, auxiliary fixed contact portion 610 and auxiliary moving contact portion 620 are insulated while coil 210 is not energized, and auxiliary fixed contact portion 610 and auxiliary moving contact portion 620 are electrically connected while coil 210 is energized. As described above, in the present exemplary embodiment, auxiliary moving contact 621 is configured to be able to reciprocate (turn) relatively in the axial direction (Z direction: vertical direction) with respect to auxiliary fixed contact 611 between the first position and the second position.

Here, when energization to coil 210 is stopped in a state where main moving contact 421 and main fixed contact 411 are located at the first position where the main moving contact and the main fixed contact are in contact with each other, opening of main moving contact 421 to separate from main fixed contact 411 is started.

When the opening is started, an arc is generated between main moving contact 421 and main fixed contact 411 in the initial stage of the opening, and the current conduction state is continued by the arc.

Therefore, by extending the arc generated between main moving contact 421 and main fixed contact 411 backward in the X direction (front-rear direction), the arc generated between main moving contact 421 and main fixed contact 411 is extinguished more reliably and more quickly.

At this time, the arc generated between main moving contact 421 and main fixed contact 411 is extended in the space formed between second side wall 132 and side wall 1223 of case 120. Therefore, in the present exemplary embodiment, a space formed between second side wall 132 and side wall 1223 of case 120 is arc extension space S4 for extending an arc (see FIG. 5).

If the arc generated between main moving contact 421 and main fixed contact 411 is extended backward in the X direction (front-rear direction), electromagnetic relay 1 can be downsized. However, when the arc is extended backward in the X direction (front-rear direction), consumable powder or the like may be scattered backward in the X direction (front-rear direction) together with the extended arc. At this time, if the main contact side space (first space) S2 in which main contact portion 40 is disposed and auxiliary contact side space (second space) S3 in which auxiliary contact portion 60 is disposed in internal space S1 of housing 10 communicate with each other through a large passage, auxiliary contact portion 60 may be affected by the consumable powder or the like.

As described above, when main contact side space S2 in which main contact portion 40 is disposed and auxiliary contact side space S3 in which auxiliary contact portion 60 is disposed are completely communicated with each other, auxiliary contact portion 60 may be affected by consumable powder or the like. In particular, in an electromagnetic relay through which a large current flows, auxiliary contact portion 60 is greatly affected by consumable powder or the like.

Therefore, in the present exemplary embodiment, even when the current flowing through main contact portion 40 is large, it is possible to prevent the contact reliability of auxiliary contact portion 60 from deteriorating. Specifically, partition wall 130 is formed which divides internal space S1 into main contact side space S2 where main contact portion 40 exists and auxiliary contact side space S3 where auxiliary contact portion 60 exists. That is, main contact side space S2 and auxiliary contact side space S3 of internal space S1 can be defined by the continuous portion of partition wall 130.

By providing partition wall 130, main contact side space S2 in which main contact portion 40 is disposed and auxiliary contact side space S3 in which auxiliary contact portion 60 is disposed can communicate with each other through a narrower gap. That is, by providing partition wall 130, it is possible to prevent main contact side space S2 and auxiliary contact side space S3 from communicating with each other through a relatively wide gap as much as possible. In this way, it is possible to more reliably prevent the consumable powder or the like generated in main contact portion 40 from entering auxiliary contact side space S3 where auxiliary contact portion 60 exists.

In the present exemplary embodiment, partition wall 130 includes first side wall 131 that is continuously connected to base 110 so as to extend along the Z direction (vertical direction: axial direction) on the front side of coil 210 in the X direction (front-rear direction) (one side in the first direction intersecting the axial direction).

Partition wall 130 includes a pair of second side walls 132 disposed on both sides in the Y direction (width direction: a second direction intersecting with the axial direction of the coil and the first direction) and continuously connected to base 110 so as to extend along the Z direction (vertical direction: axial direction).

As described above, in the present exemplary embodiment, first side wall 131 and the pair of second side walls 132 for supporting yoke 240 also function as partition wall 130 that divides into main contact side space S2 where main contact portion 40 exists and auxiliary contact side space S3 where auxiliary contact portion 60 exists.

First side wall 131 is continuously connected to base 110 such that main contact portion 40 and movable part 50 are located on the front side in the X direction (front-rear direction) and auxiliary contact portion 60 and coil 210 are located on the rear side in the X direction (front-rear direction) (the other side in the first direction intersecting the axial direction).

At least a part of side surface 210*a* of coil 210 is surrounded by first side wall 131 and the pair of second side walls 132.

Figure 16:
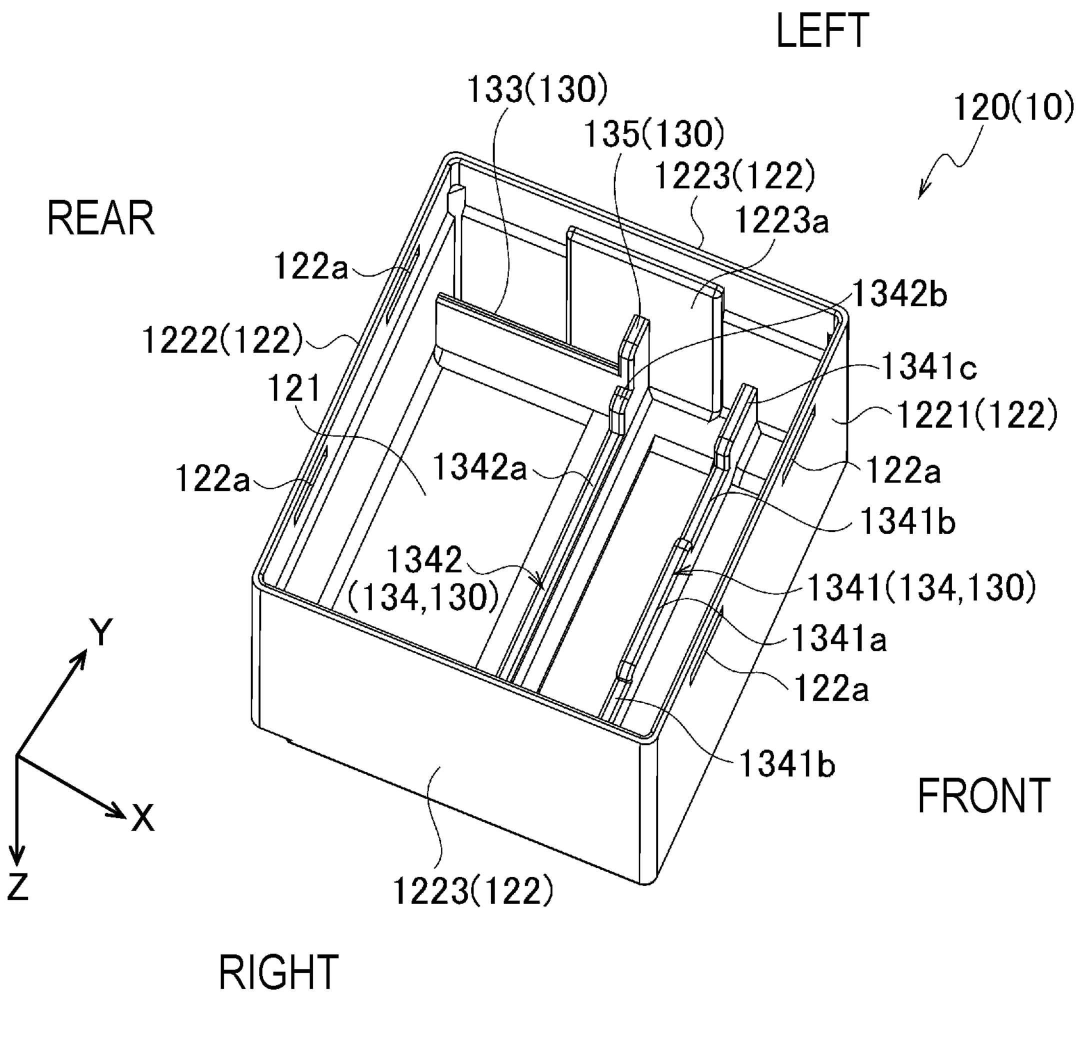
FIG. 16 is a perspective view illustrating the inside of the cover according to the first exemplary embodiment.
Figure 17:
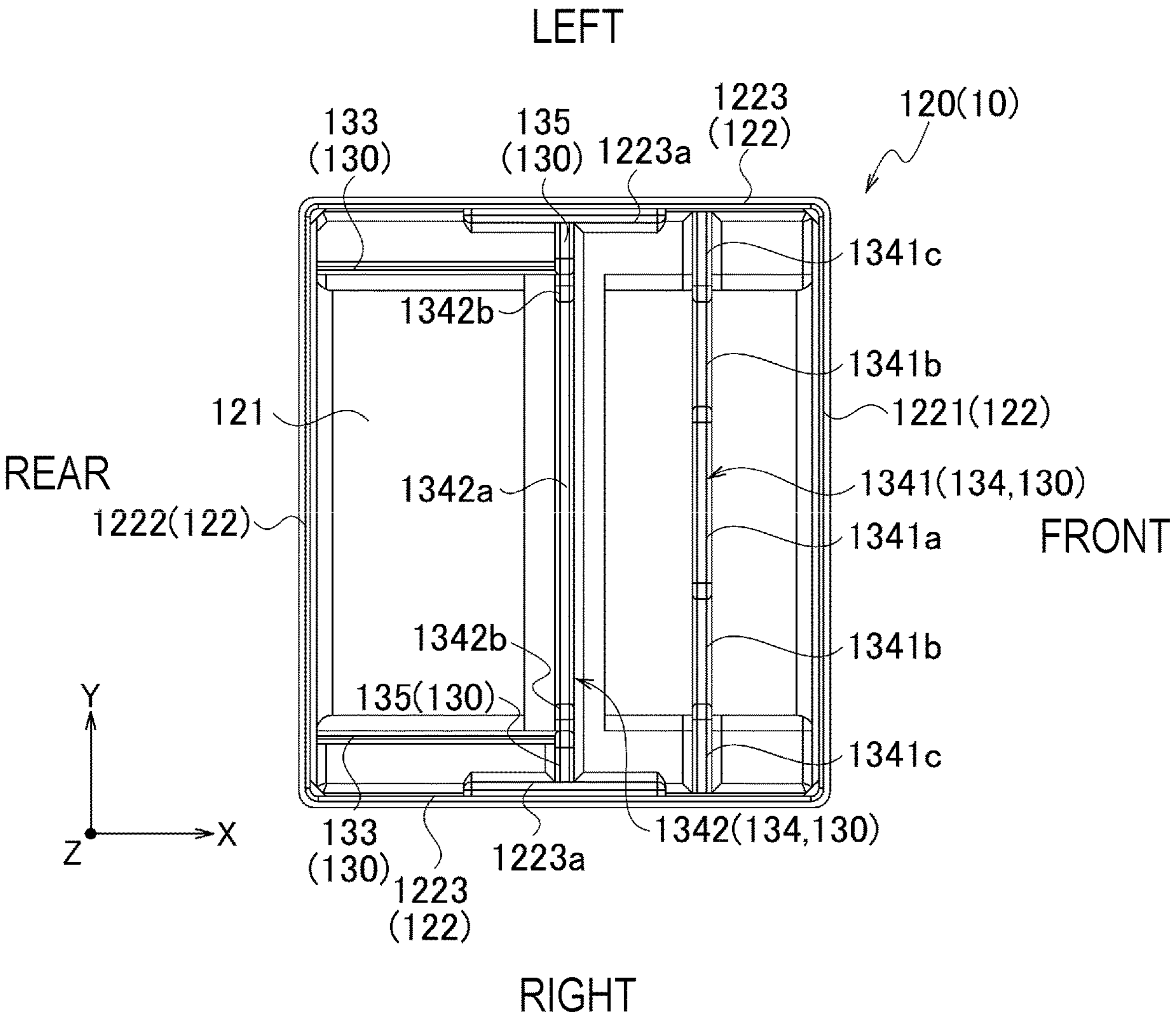
FIG. 17 is a rear view illustrating the cover according to the first exemplary embodiment.

Further, in the present exemplary embodiment, partition wall 130 includes a pair of third side walls 133 disposed side by side in the Y direction (width direction: second direction) and provided along the Z direction (vertical direction: axial direction) and along second side wall 132 (see FIGS. 16 and 17).

In the present exemplary embodiment, third side wall 133 is formed inside case 120. Specifically, third side wall 133 extends from the inner surface of top wall 121 along the X direction (front-rear direction: first direction) and the Z direction (vertical direction: axial direction). Third side wall 133 is formed such that the rear end in the X direction (front-rear direction: first direction) is in contact with the inner surface of rear wall 1222.

With case 120 attached to base 110, the lower end of third side wall 133 is disposed outside second side wall 132 in the Y direction (width direction: second direction). At this time, a gap is hardly formed between the lower end of third side wall 133 and second side wall 132 (see FIG. 18).

As described above, in the present exemplary embodiment, third side wall 133 is provided on case 120 so as to overlap second side wall 132 as viewed in the Y direction (width direction: second direction).

Here, main contact side space S2 includes internal space S1 facing a front side surface of first side wall 131 in the X direction, internal space S1 facing an outer side surface of the pair of second side walls 132 in the Y direction, and internal space S1 facing an outer side surface of third side wall 133 in the Y direction. On the other hand, auxiliary contact side space S3 includes internal space S1 facing the side surface on the rear side in the X direction of first side wall 131, internal space S1 facing the inner side surface in the Y direction of the pair of second side walls 132, and internal space S1 facing the inner side surface in the Y direction of third side wall 133. In the portion where second side wall 132 and third side wall 133 overlap, internal space S1 facing the outer side surface in the Y direction of one of second side wall 132 and third side wall 133 is main contact side space S2, and internal space S1 facing the inner side surface in the Y direction of the other is auxiliary contact side space S3.

Further, the pair of third side walls 133 is provided at the same height as the contact peripheral portion of auxiliary contact portion 60 in the Z direction (vertical direction: axial direction) with bottom surface 111*a* of base 110 as a reference in a state where base 110 is positioned below case 120 (see FIG. 18). That is, the pair of third side walls 133 overlaps at least a part of the contact peripheral portion of auxiliary contact portion 60 when viewed from the direction orthogonal to the Z direction. In the present exemplary embodiment, the contact peripheral portion includes auxiliary fixed contact 611, terminal portion 612 (upper end of upper piece 613 and side piece 614) around auxiliary fixed contact 611, auxiliary moving contact 621 and upper piece 623 (main body 6231 and leaf spring 6232) movable within the movable range of leaf spring 6232, and the upper end of side piece 624.

The contact peripheral portion of auxiliary contact portion 60 is located at the upper end of auxiliary contact portion 60. The pair of third side walls 133 is provided at the same height as at least one of auxiliary fixed contact 611 and auxiliary moving contact 621 in the Z direction with reference to bottom surface 111*a* of base 110. Note that the pair of third side walls 133 may be provided higher than head 232 of iron core 230 in the Z direction with respect to bottom surface 111*a* of base 110.

In the present exemplary embodiment, when viewed from the Y direction (width direction: second direction), entire leaf spring 6232 provided with auxiliary moving contact 621 and entire upper piece 613 provided with auxiliary fixed contact 611 (terminal portion 612 around auxiliary fixed contact 611) overlap third side wall 133. That is, the contact peripheral portion (entire leaf spring 6232 provided with auxiliary moving contact 621 and upper piece 613 provided with auxiliary fixed contact 611) of auxiliary contact portion 60 is disposed between the pair of third side walls 133 in the Y direction (width direction: second direction).

In this way, arc extension space S4 and auxiliary contact side space S3 of main contact side space S2 are divided by third side wall 133. Third side wall 133 more reliably prevents the consumable powder or the like generated in main contact portion 40 from entering auxiliary contact side space S3 through arc extension space S4.

In the present exemplary embodiment, main contact side space S2 is located above main contact portion 40 and has a substantially L-shaped space when viewed from the Y direction (width direction: second direction). This space is armature arrangement space S5 in which armature 310 is disposed (see FIGS. 14 and 15). Since armature 310 is disposed in armature arrangement space S5 in a state of being allowed to swing, a relatively large gap is formed between armature 310 and case 120 in armature arrangement space S5. Therefore, there is a possibility that armature 310 is displaced at the time of swinging, or consumable powder or the like generated in main contact portion 40 enters auxiliary contact side space S3 through a relatively large gap formed between armature 310 and case 120.

Therefore, in the present exemplary embodiment, partition wall 130 includes fourth side wall 134 provided on case 120 so as to protrude downward in the Z direction (vertical direction: axial direction) in a state where base 110 is positioned below case 120. Fourth side wall 134 extends in the Y direction (width direction: second direction) and faces armature 310 in the Z direction (vertical direction: axial direction) (see FIGS. 14 and 15).

Further, in the present exemplary embodiment, fourth side wall 134 includes pressing wall 1341 which is disposed on the front side (main contact portion 40 side) in the X direction (front-rear direction: first direction) with respect to vertical wall (upright portion) 241 of yoke 240, and is capable of pressing armature 310.

Pressing wall 1341 includes protrusion 1341*a* formed at the central portion in the Y direction (width direction: second direction) and a pair of recesses 1341*b* formed at both ends in the Y direction (width direction: second direction) of protrusion 1341*a* (see FIGS. 16 and 17). Further, pressing wall 1341 includes a pair of pressing wall extended portions 1341*c* formed on the outer sides of the pair of recesses 1341*b* in the Y direction (width direction: second direction). The pair of pressing wall extended portions 1341*c* is formed such that the outside in the Y direction (width direction: second direction) is in contact with the inner surface of side wall 1223.

Figure 20:
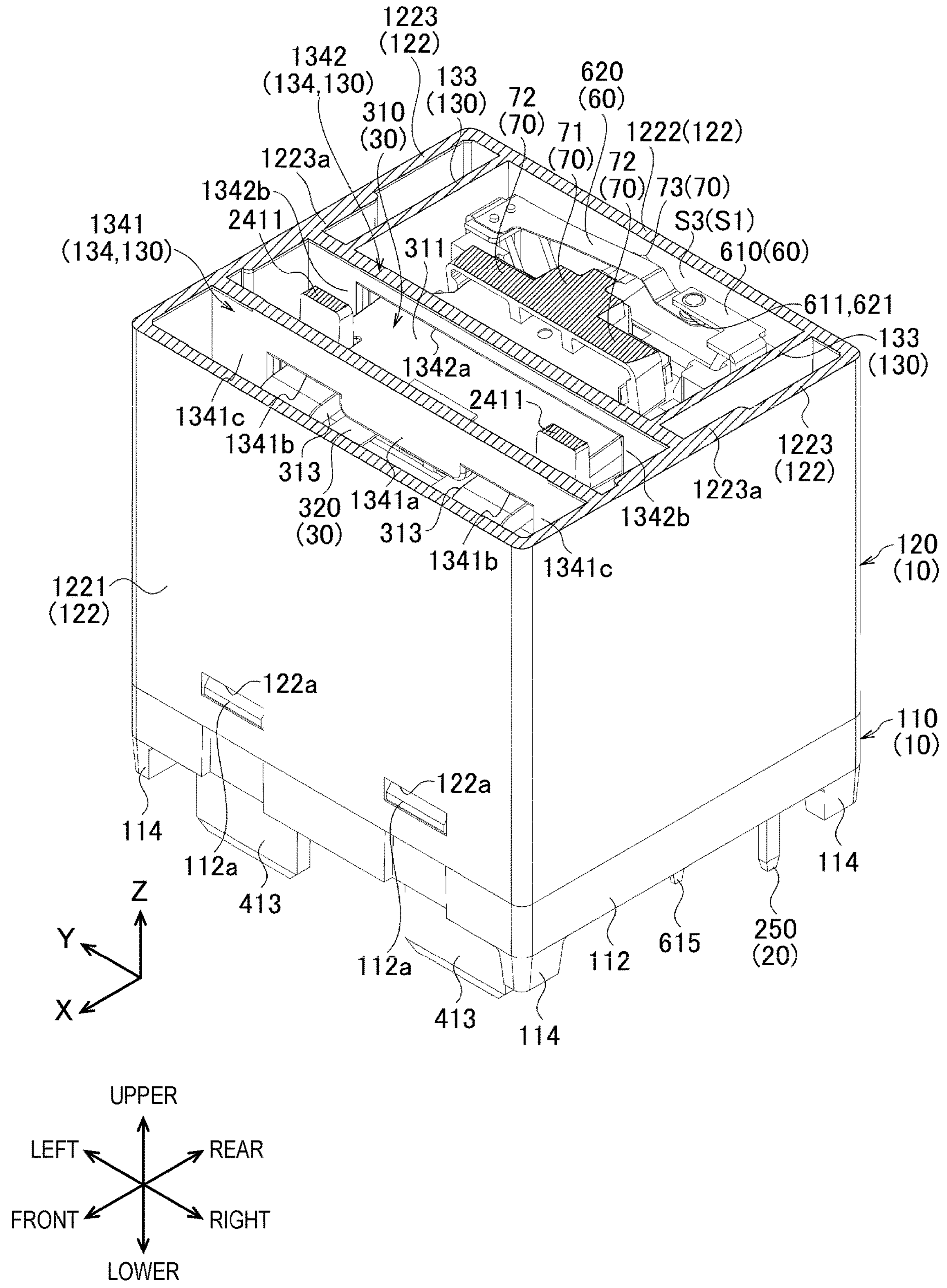
FIG. 20 is a view illustrating the electromagnetic relay according to the first exemplary embodiment, and is a perspective view illustrating a state in which a position where an auxiliary drive unit of the electromagnetic relay exists is cut by a horizontal plane.

In a state where case 120 is attached to base 110, the lower end of protrusion 1341*a* is inserted into through-hole 313 formed in armature 310 (see FIG. 20). In addition, in a state where case 120 is attached to base 110, the pair of recesses 1341*b* faces both sides of through-hole 313 of armature 310 in the Y direction (width direction: second direction) in the Z direction (vertical direction: axial direction). Further, in a state where case 120 is attached to base 110, armature 310 is disposed between the pair of pressing wall extended portions 1341*c* in the Y direction (width direction: second direction). By providing pressing wall 1341 having such a shape in case 120, position deviation of armature 310 at the time of swinging is suppressed. In addition, since armature arrangement space S5 is divided in the X direction (front-rear direction: first direction) by pressing wall 1341, the consumable powder and the like generated in main contact portion 40 can be more reliably suppressed from entering auxiliary contact side space S3 by pressing wall 1341.

Further, fourth side wall 134 is disposed behind (on auxiliary contact portion 60 side) the vertical wall (upright portion) 241 of yoke 240 in the X direction (front-rear direction: first direction), and has partition wall 1342 capable of dividing space S5 above armature 310.

Main contact side space S2 includes internal space S1 facing the side surface on the front side in the X direction of fourth side wall 134 (pressing wall 1341, partition wall 1342). On the other hand, auxiliary contact side space S3 includes internal space S1 facing the side surface on the rear side in the X direction of fourth side wall 134 (pressing wall 1341, partition wall 1342).

Partition wall 1342 includes recess 1342*a* formed at the central portion in the Y direction (width direction: second direction) and a pair of partition wall extended portions 1342*b* formed at both ends in the Y direction (width direction: second direction) of recess 1342*a* (see FIGS. 16 and 17). The pair of partition wall extended portions 1342*b* is formed such that the outside in the Y direction (width direction: second direction) is continuously connected to the front end of third side wall 133.

Figure 15:
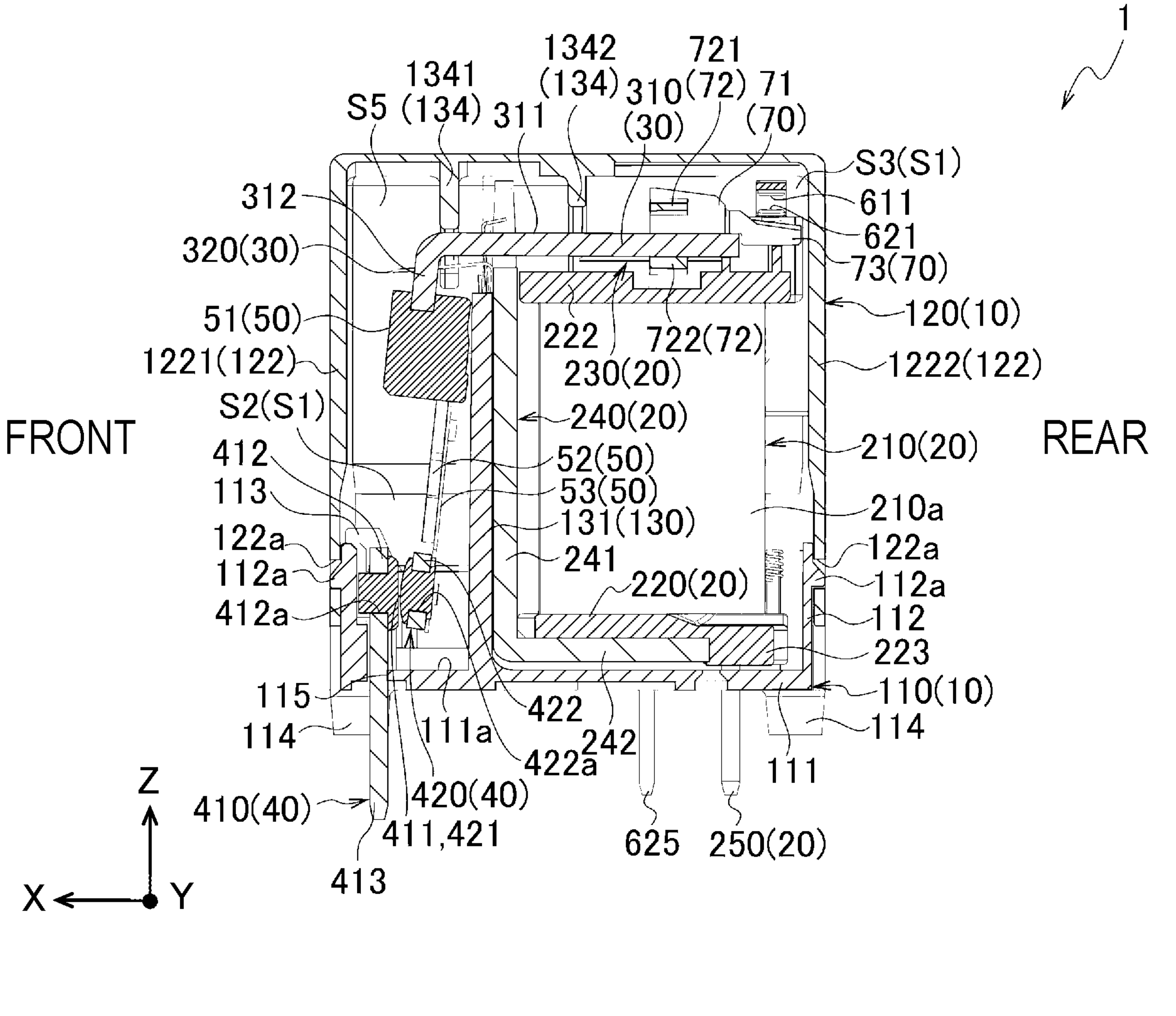
FIG. 15 is a view illustrating the contact or separation between the main contact portion and the auxiliary contact portion according to the first exemplary embodiment, and is a vertical cross-sectional view illustrating a state in which the main contact portion and the auxiliary contact portion are at the first position.

In a state where case 120 is attached to base 110, the lower end of recess 1342*a* faces armature 310 (the upper surface of water wall 311) in the Z direction (vertical direction: axial direction) (see FIGS. 14 and 15). Further, in a state where case 120 is attached to base 110, armature 310 is disposed between the pair of partition wall extended portions 1342*b* in the Y direction (width direction: second direction).

As described above, in the present exemplary embodiment, partition wall 1342 has partition wall extended portions 1342*b* disposed on both sides of armature 310 in the Y direction (width direction: second direction). In the present exemplary embodiment, partition wall extended portion **1342*b* has a portion located outside second side wall 132** in the Y direction (width direction: second direction).

By providing partition wall 1342 having such a shape in case 120, it is possible to suppress the consumable powder or the like that has not been blocked by pressing wall 1341 from entering auxiliary contact side space S3 by partition wall 1342.

Further, in the present exemplary embodiment, partition wall 130 includes fifth side wall 135 that extends in the Z direction (vertical direction: axial direction) and is provided on case 120 so as to be disposed outside second side wall 132 in the Y direction (width direction: second direction).

In the present exemplary embodiment, thick portion **1223*a* is formed at the central portion of side wall 1223 of case 120 in the X direction (front-rear direction: first direction). Fifth side wall 135 extends so as to protrude inward in the Y direction (width direction: second direction) from a central portion in the X direction (front-rear direction: first direction) in thick portion 1223*a*. Fifth side wall 135 extends downward in the Z direction (vertical direction: axial direction) from top wall 121 of case 120. In a state where case 120 is attached to base 110, the lower end of fifth side wall 135 is positioned at an intermediate portion between base portion 111 of base 110 and top wall 121 of case 120**.

The lower end of fifth side wall 135 only needs to be positioned between base portion 111 of base 110 and top wall 121 of case 120, and the amount of protrusion of fifth side wall 135 from top wall 121 can be appropriately set. However, the amount of protrusion of fifth side wall 135 from top wall 121 is preferably such an amount that a space linearly communicating from main contact portion 40 to auxiliary contact side space S3 is not formed in arc extension space S4. That is, the shortest route from main contact portion 40 to auxiliary contact side space S3 through arc extension space S4 is preferably a polygonal line when viewed from the Y direction (width direction: second direction). Accordingly, in order for the consumable powder or the like generated in main contact portion 40 to enter auxiliary contact side space S3, it is necessary to change the direction at least once. Therefore, it is possible to more reliably prevent the consumable powder or the like generated in main contact portion 40 from entering auxiliary contact side space S3.

Further, in the present exemplary embodiment, fifth side wall 135 is formed integrally with third side wall 133 and partition wall extended portion **1342*b*. Specifically, fifth side wall 135, third side wall 133, and partition wall extended portion 1342*b*** are formed by integral molding.

Since arc extension space S4 is divided in the X direction (front-rear direction: first direction) by providing fifth side wall 135 having such a shape, the consumable powder or the like generated in main contact portion 40 can be more reliably suppressed from entering auxiliary contact side space S3 by fifth side wall 135.

In the present exemplary embodiment, main contact side space S2 includes internal space S1 facing the side surface on the front side in the X direction of fifth side wall 135. On the other hand, auxiliary contact side space S3 includes internal space S1 facing the side surface on the rear side in the X direction of fifth side wall 135.

In the present exemplary embodiment, second side wall 132 has extension part 1321 extending outward in the Y direction (width direction: second direction). Extension part 1321 extends in the Y direction (width direction: second direction) and the Z direction (vertical direction: axial direction) from the rear end of second side wall 132 in the X direction (front-rear direction: first direction). In the present exemplary embodiment, extension part 1321 is formed from the lower end to the upper end side (the middle of the upper end) of second side wall 132. That is, extension part 1321 is continuously connected to second side wall 132 in a state where the upper end of second side wall 132 protrudes upward from the upper end of extension part 1321 (see FIGS. 6 and 7).

In the present exemplary embodiment, the lower end of third side wall 133 is located near the upper end of extension part 1321. Thus, third side wall 133 is provided on case 120 so as to overlap second side wall 132 when viewed from the Y direction (width direction: second direction) and to overlap extension part 1321 of second side wall 132 when viewed from the Z direction (vertical direction: axial direction).

Figure 21:
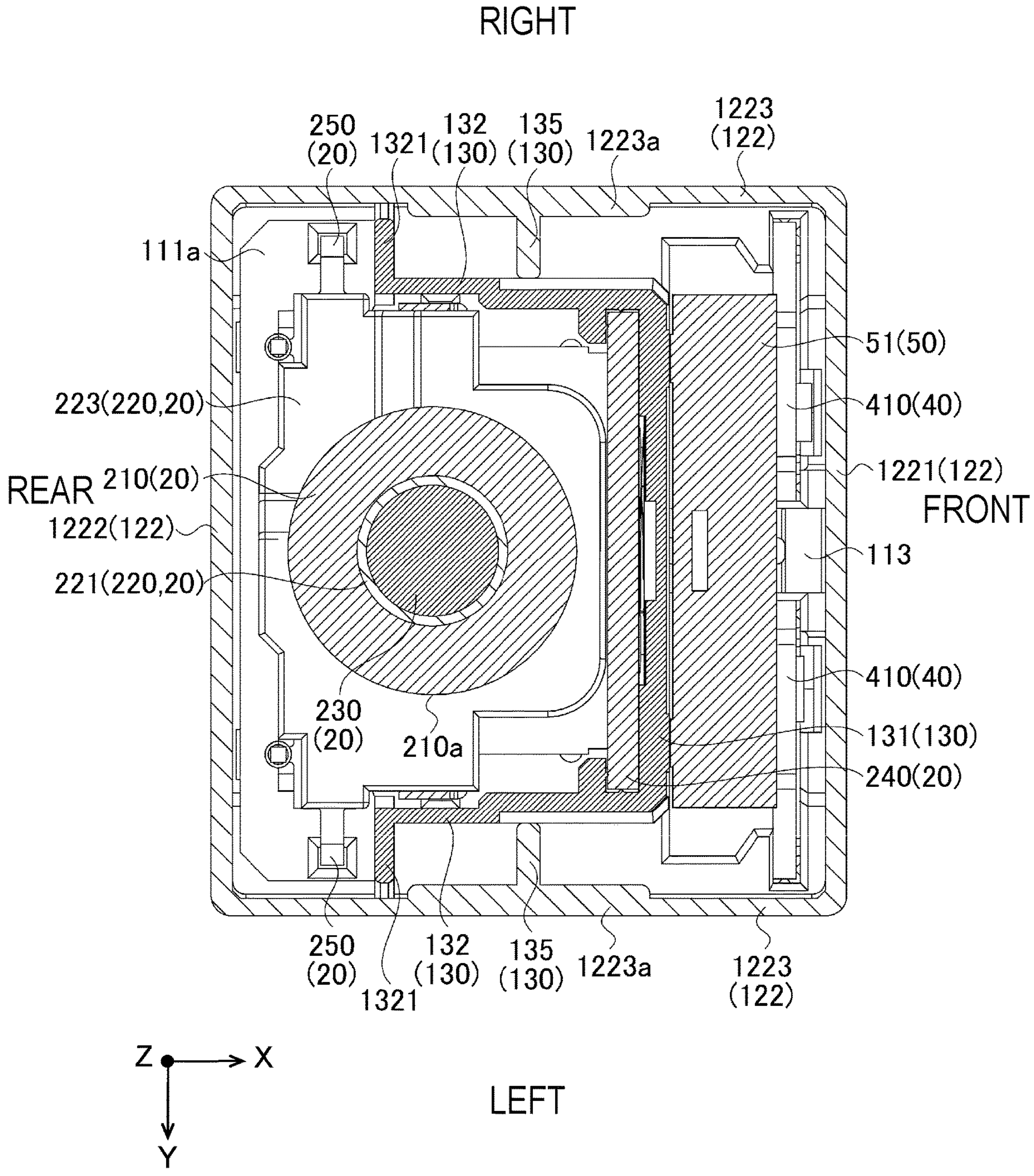
FIG. 21 is a view illustrating the electromagnetic relay according to the first exemplary embodiment, and is a plan view illustrating a state in which a central portion in a vertical direction of the electromagnetic relay is cut by a horizontal plane.
Figure 22:
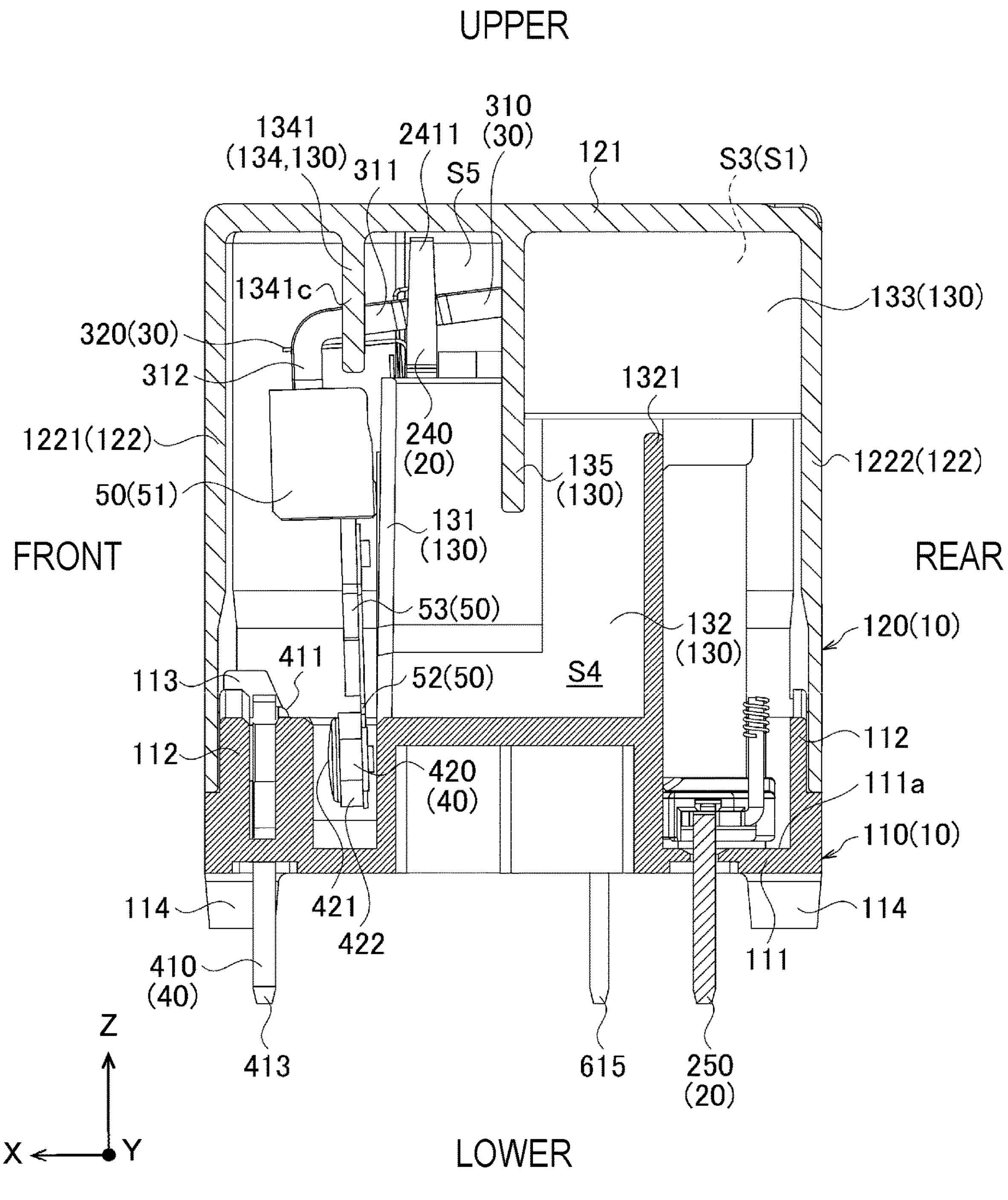
FIG. 22 is a view illustrating the electromagnetic relay according to the first exemplary embodiment, and is a side view illustrating a state in which the position where the extension part of the second side wall of the electromagnetic relay exists is cut by a vertical plane extending in the front-rear direction.

Fifth side wall 135 is provided on case 120 so as to overlap with extension part 1321 of second side wall 132 in a state of being viewed from the X direction (front-rear direction: first direction) (see FIG. 21).

In the present exemplary embodiment, the auxiliary contact terminals (first auxiliary contact terminal 612 and second auxiliary contact terminal 622) can be prevented from coming off from coil bobbin 220 or rotating.

Figure 23:
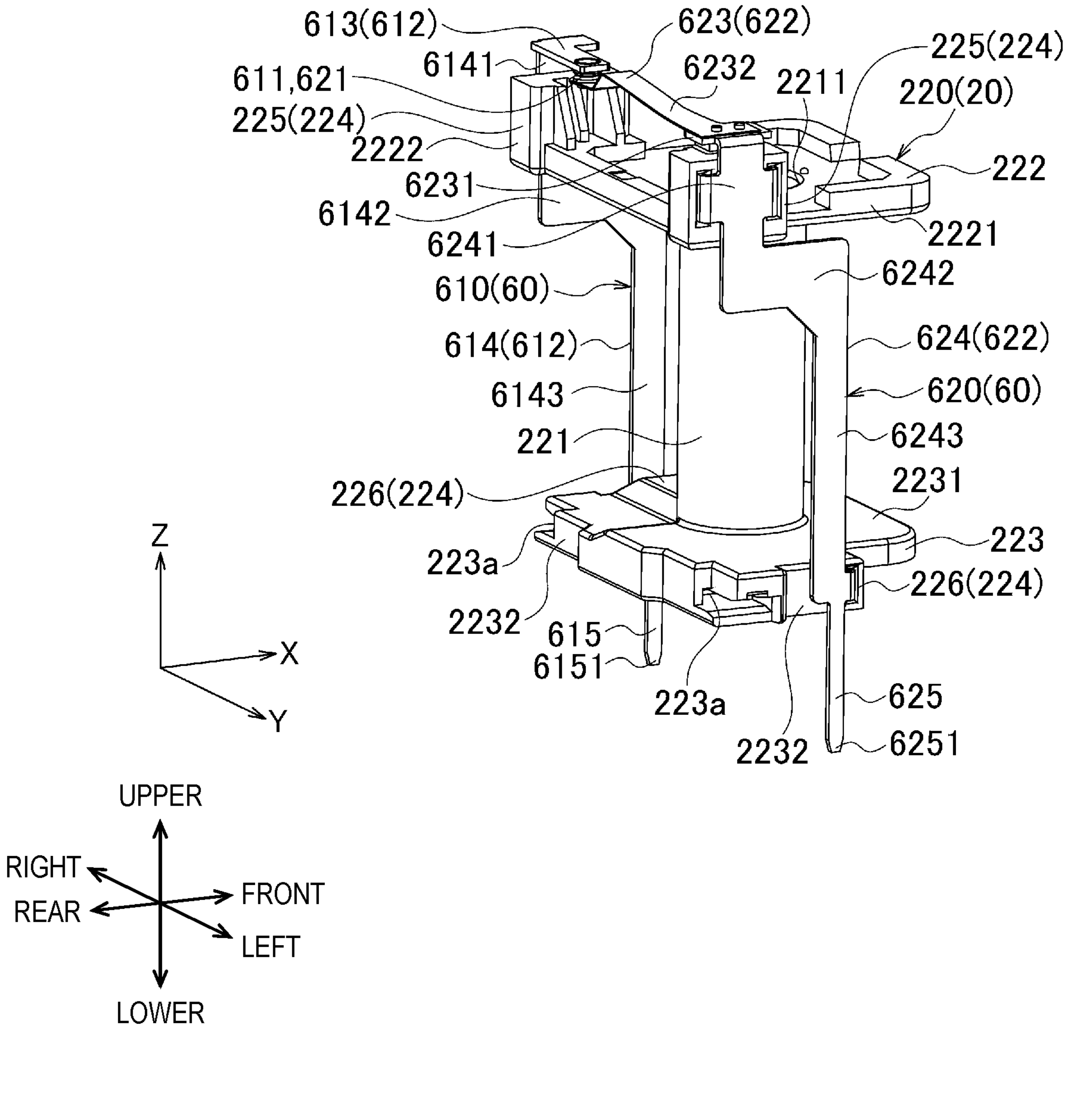
FIG. 23 is a perspective view of a state in which the auxiliary contact portion according to the first exemplary embodiment is attached to the coil bobbin as viewed from one direction.
Figure 24:
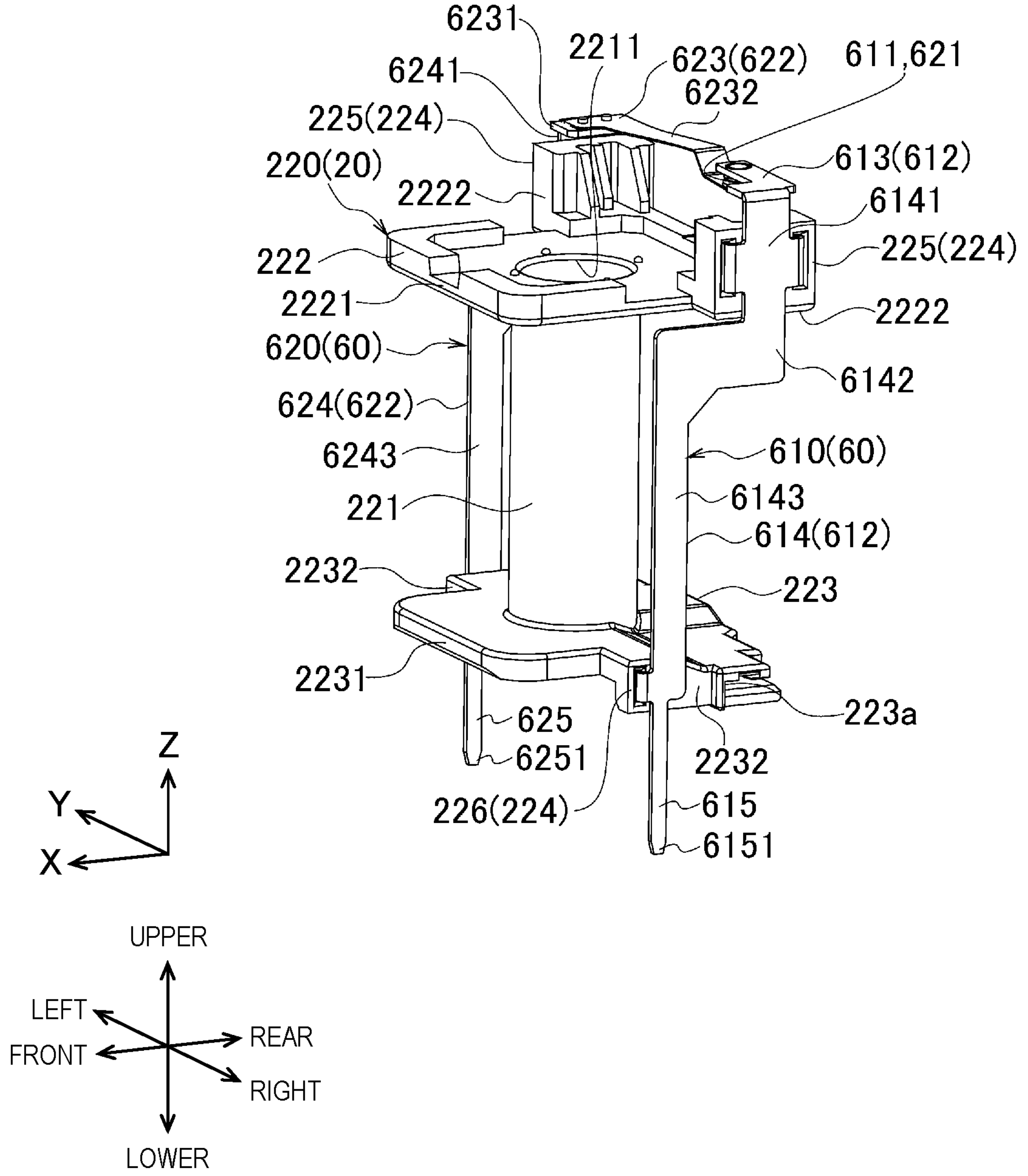
FIG. 24 is a perspective view of a state in which the auxiliary contact portion according to the first exemplary embodiment is attached to the coil bobbin as viewed from another direction.

Specifically, press-fitting portion 224 is formed in coil bobbin 220, and side piece 614 of first auxiliary contact terminal 612 and side piece 624 of second auxiliary contact terminal 622 are press-fitted and held by press-fitting portion 224 (see FIGS. 23 and 24).

As illustrated in FIGS. 23 and 24, in the present exemplary embodiment, a pair of press-fitting portions 224 is formed at both left and right ends of coil bobbin 220. Side piece 614 of first auxiliary contact terminal 612 is press-fitted and held by press-fitting portion 224 on the right side, and side piece 624 of second auxiliary contact terminal 622 is press-fitted and held by press-fitting portion 224 on the left side.

In the present exemplary embodiment, each press-fitting portion 224 includes groove 2241 into which side piece 614 and side piece 624 are inserted. Groove 2241 includes opening **2241*a* into which side piece 614 and side piece 624 are press-fitted, restriction wall 2241*b* formed around opening 2241*a* so as to face side piece 614 and side piece 624, and pressure contact part 2241*c* that sandwiches and presses side piece 614 and side piece 624**.

Further, in the present exemplary embodiment, each of the pair of press-fitting portions 224 includes upper press-fitting portion (first press-fitting portion) 225 provided in upper flange portion 222 of coil bobbin 220 and lower press-fitting portion (second press-fitting portion) 226 provided in lower flange portion 223 of coil bobbin 220. Side piece 614 of first auxiliary contact terminal 612 is press-fitted and held by upper press-fitting portion 225 and lower press-fitting portion 226 formed on one side in the Y direction (width direction: second direction), and side piece 624 of second auxiliary contact terminal 622 is press-fitted and held by upper press-fitting portion 225 and lower press-fitting portion 226 formed on the other side in the Y direction (width direction: second direction).

Upper press-fitting portion 225 is formed on each of a pair of extended portions 2222 provided continuously from a rear end of upper flange body 2221 in the X direction (front-rear direction) so as to protrude outward in the Y direction (width direction) and upward in the Z direction (vertical direction: axial direction of the coil) (see FIGS. 23 and 24). First side piece 6141 of side piece 614 is press-fitted and held by one upper press-fitting portion 225, and first side piece 6241 of side piece 624 is press-fitted and held by other upper press-fitting portion 225.

Figure 25:
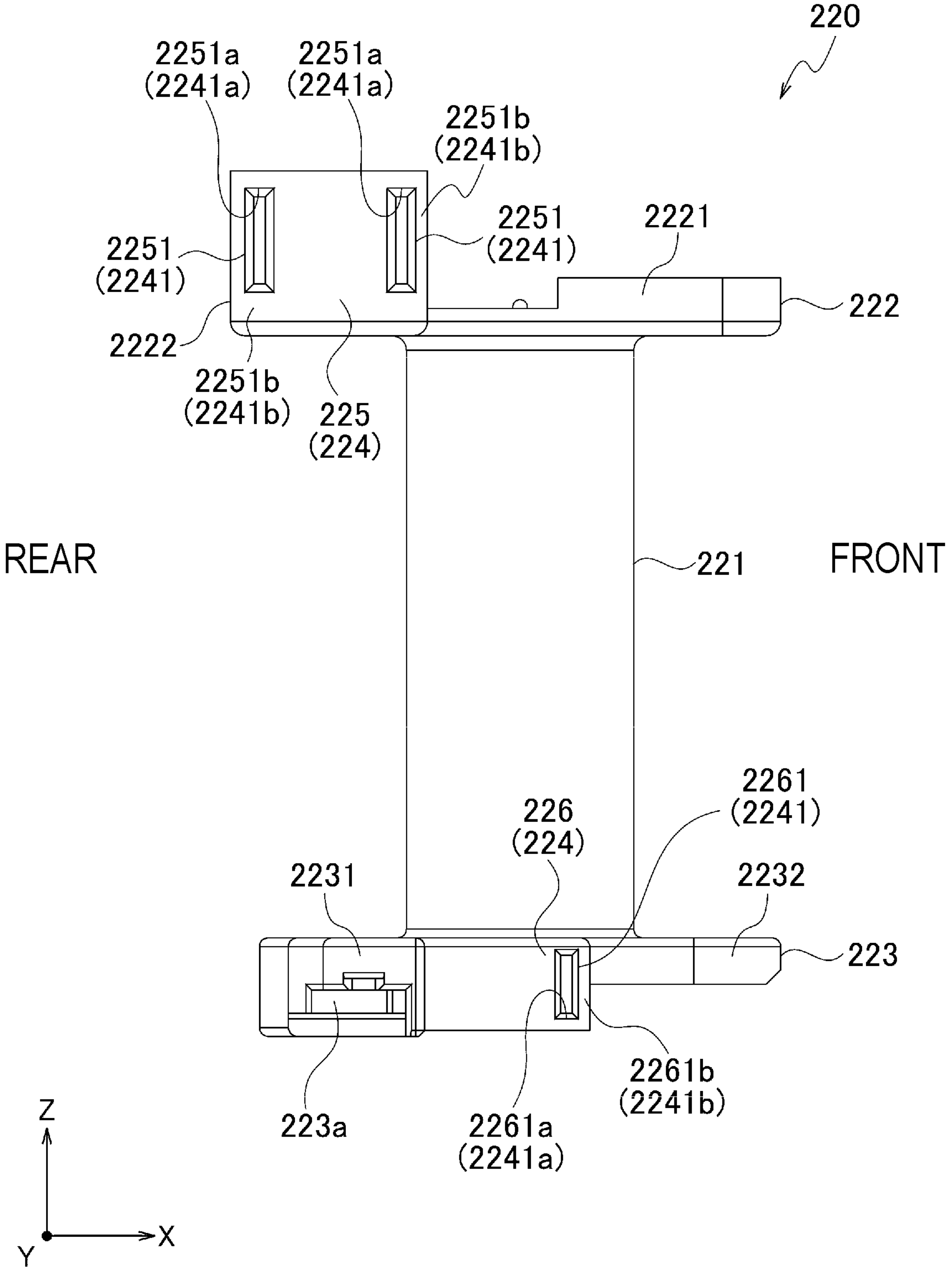
FIG. 25 is a side view illustrating the coil bobbin according to the first exemplary embodiment.

In the present exemplary embodiment, in each of the pair of upper press-fitting portions 225, a pair of upper grooves 2251 is formed in a state of being separated in the X direction (front-rear direction: first direction) (see FIG. 25). Each of upper grooves 2251 is formed so as to open only to the outside in the Y direction (width direction: second direction), and the opening of upper groove 2251 in the Y direction (width direction: second direction) is upper-side opening 2251*a* included in upper press-fitting portion 225. First side piece 6141 and first side piece 6241 are press-fitted from an opening (upper-side opening 2251*a*) opened only to the outside in the Y direction (width direction: second direction) of upper groove 2251.

Figure 26:
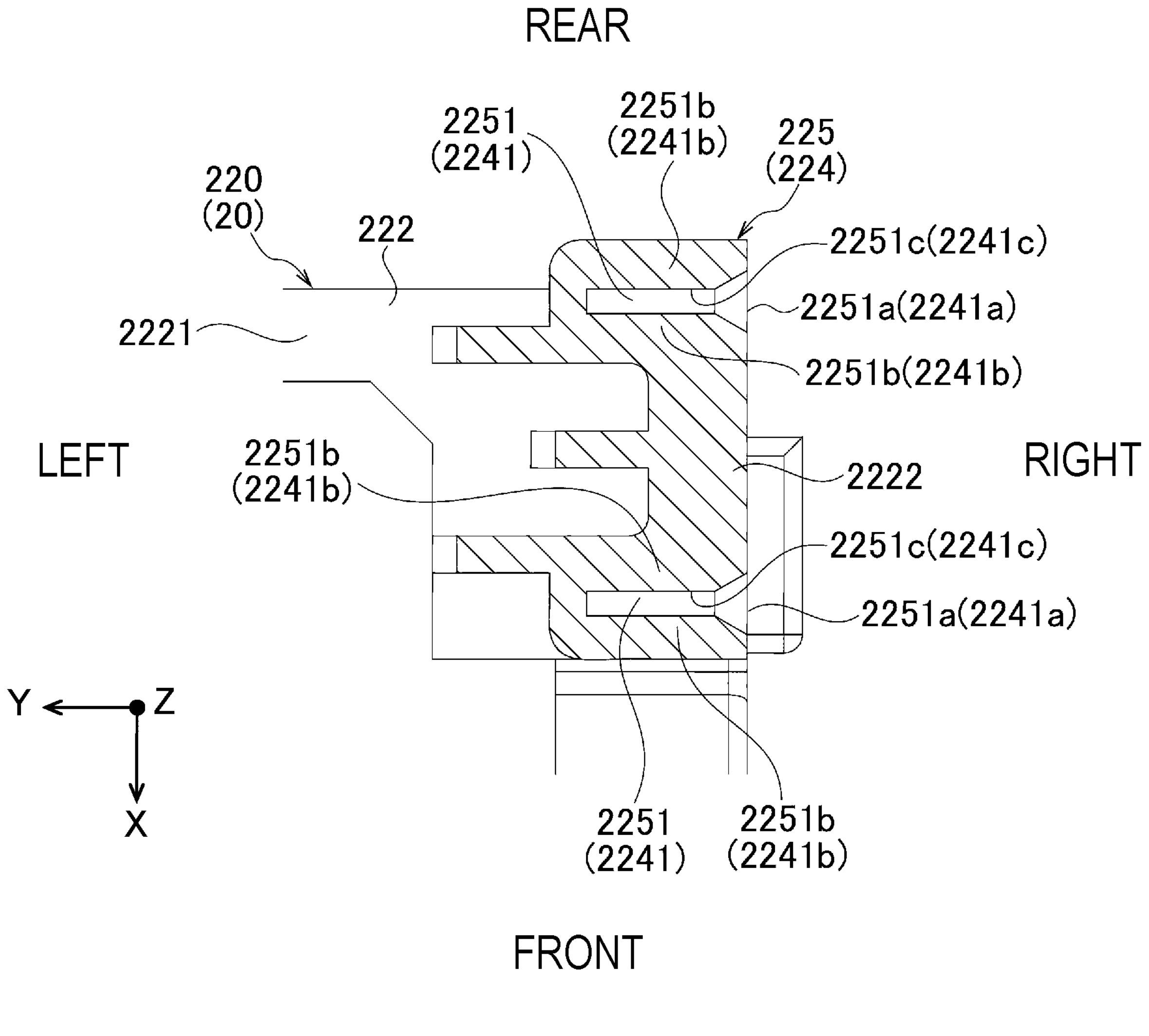
FIG. 26 is a horizontal cross-sectional view illustrating an upper press-fitting portion according to the first exemplary embodiment.

Specifically, each of upper grooves 2251 includes upper-side opening 2251*a*, upper restriction wall 2251*b* formed around upper-side opening 2251*a* so as to face side piece 614 and side piece 624, and upper pressure contact part 2251*c* that sandwiches and presses side piece 614 and side piece 624 (see FIGS. 25 and 26).

On the other hand, press-fitting pieces 6141*a* protruding inward in the Y direction (width direction: second direction) are respectively provided at both ends in the X direction (front-rear direction: first direction) of first side piece 6141, and press-fitting pieces 6241*a* protruding inward in the Y direction (width direction: second direction) are respectively provided at both ends in the X direction (front-rear direction: first direction) of first side piece 6241 (see FIGS. 6 and 7).

Figure 27:
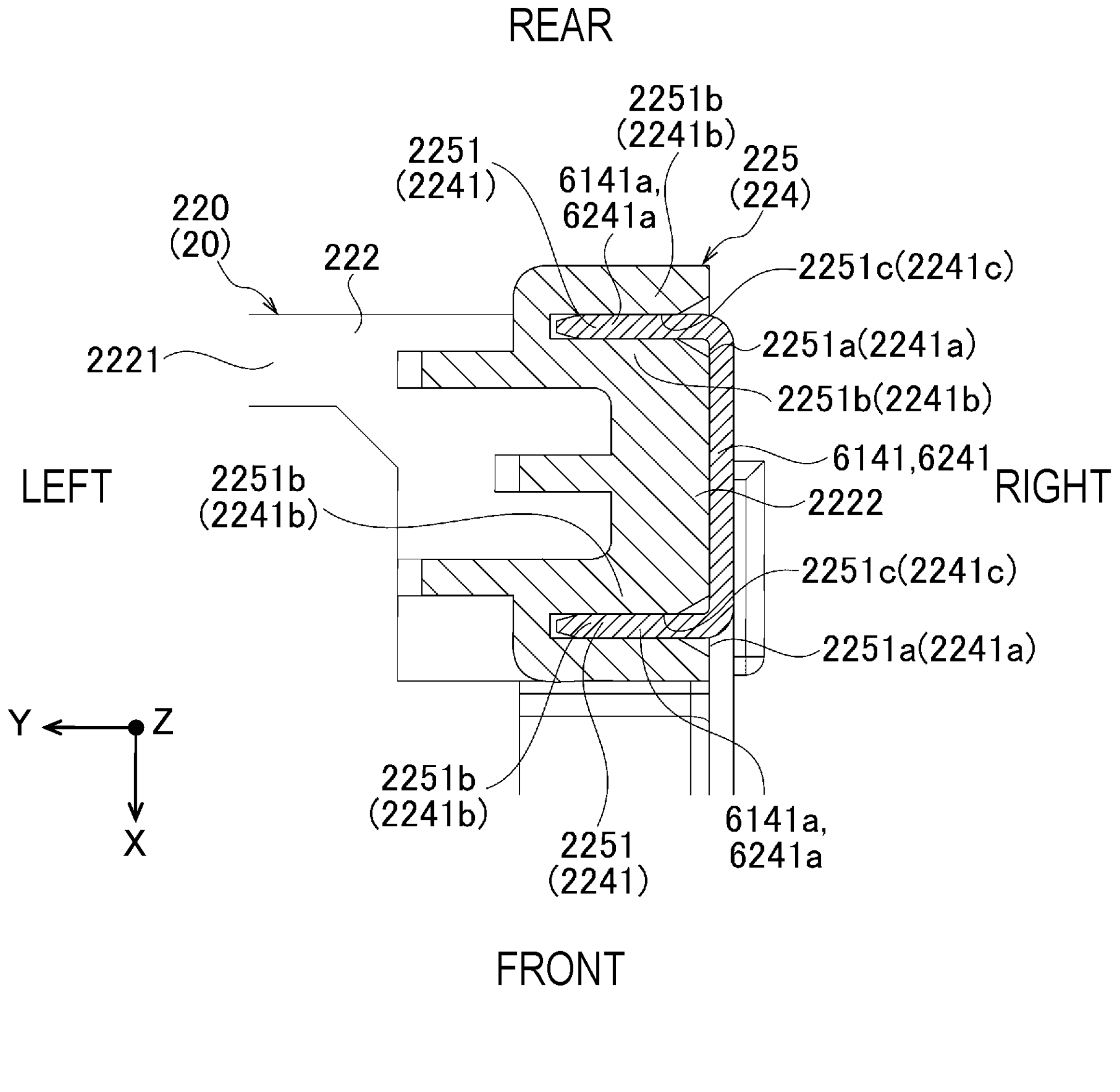
FIG. 27 is a horizontal cross-sectional view illustrating a state in which the terminal portion of the auxiliary contact portion is press-fitted into the upper press-fitting portion according to the first exemplary embodiment.

Then, the pair of press-fitting pieces 6141*a* is press-fitted into the pair of upper grooves 2251 formed in upper press-fitting portion 225 on one side from upper-side opening 2251*a*, so that first side piece 6141 of side piece 614 is press-fitted and held in the one upper press-fitting portion 225 (see FIG. 27).

At this time, press-fitting piece 6141*a* is sandwiched and pressed by upper pressure contact part 2251*c* formed on the inner surface of upper groove 2251. Thus, the relative movement of side piece 614 (first auxiliary contact terminal 612) held by upper press-fitting portion 225 with respect to coil bobbin 220 in the Y direction (width direction: second direction) is restricted. upper restriction wall 2251*b* formed around upper groove 2251 restricts rotation of side piece 614 (first auxiliary contact terminal 612) with respect to coil bobbin 220 and movement of the side piece in a direction orthogonal to the Y direction (width direction: second direction).

Similarly, by press-fitting the pair of press-fitting pieces 6241*a* into the pair of upper grooves 2251 formed in upper press-fitting portion 225 on the other side from upper-side opening 2251*a*, first side piece 6241 of side piece 624 is press-fitted and held in other upper press-fitting portion 225.

At this time, press-fitting piece 6241*a* is sandwiched and pressed by upper pressure contact part 2251*c* formed on the inner surface of upper groove 2251. Thus, the relative movement of side piece 624 (second auxiliary contact terminal 622) held by upper press-fitting portion 225 with respect to coil bobbin 220 in the Y direction (width direction: second direction) is restricted. Upper restriction wall 2251*b* formed around upper groove 2251 restricts rotation of side piece 624 (second auxiliary contact terminal 622) with respect to coil bobbin 220 and movement of the side piece in a direction orthogonal to the Y direction (width direction: second direction).

In the present exemplary embodiment, each upper-side opening 2251*a* has a rectangular shape elongated in the Z direction (vertical direction: axial direction), and each upper groove 2251 is formed in a rectangular parallelepiped shape. Upper restriction wall 2251*b* is formed so as to surround the periphery of rectangular upper-side opening 2251*a* (rectangular parallelepiped upper groove 2251). Therefore, in the present exemplary embodiment, upper restriction wall 2251*b* includes a vertical wall facing side piece 614 and side piece 624 in the X direction (front-rear direction: first direction), and a horizontal wall facing side piece 614 and side piece 624 in the Z direction (vertical direction: axial direction).

On the other hand, lower press-fitting portion 226 is formed on each of a pair of extended portions 2232 provided continuously on the rear end side in the X direction (front-rear direction: first direction) of lower flange body 2231 so as to protrude outward in the Y direction (width direction: second direction) (see FIGS. 23 and 24). Then, second side piece 6143 of side piece 614 is press-fitted and held by one lower press-fitting portion 226, and second side piece 6243 of side piece 624 is press-fitted and held by other lower press-fitting portion 226.

In the present exemplary embodiment, one lower groove 2261 is formed in each of the pair of lower press-fitting portions 226 (see FIG. 25). Each of lower grooves 2261 is formed so as to open only on the outer side in the Y direction (width direction: second direction), and the opening of lower groove 2261 in the Y direction (width direction: second direction) is lower-side opening 2261*a* of lower press-fitting portion 226. Then, second side piece 6143 and second side piece 6243 are press-fitted from the opening (lower-side opening 2261*a*) opened only on the outer side in the Y direction (width direction: second direction) of lower groove 2261.

Figure 28:
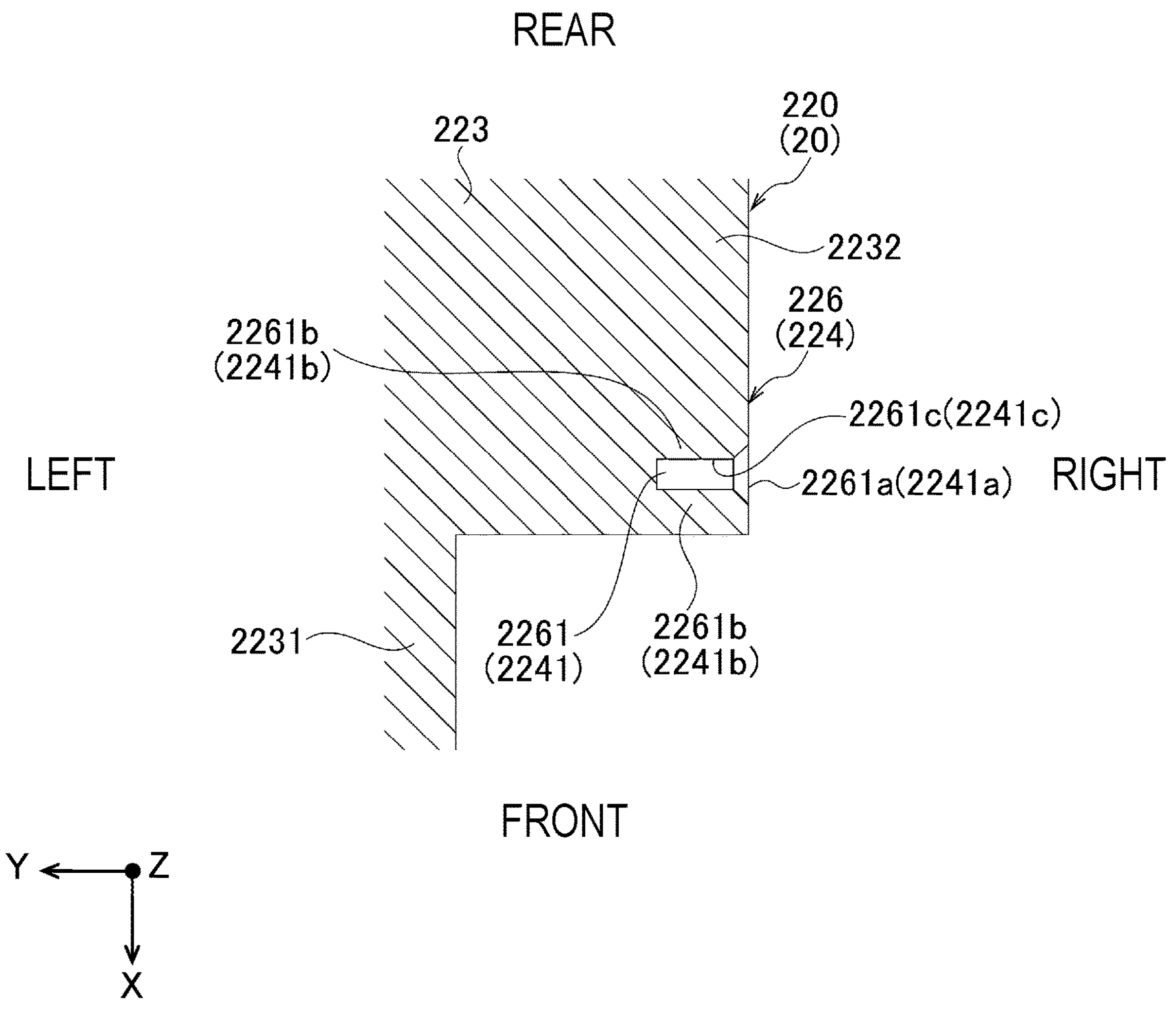
FIG. 28 is a horizontal cross-sectional view illustrating a lower press-fitting portion according to the first exemplary embodiment.

Specifically, each lower groove 2261 includes lower-side opening 2261*a*, lower restriction wall 2261*b* formed around lower-side opening 2261*a* so as to face side piece 614 and side piece 624, and lower pressure contact part 2261*c* that sandwiches and presses side piece 614 and side piece 624 (see FIGS. 25 and 28).

On the other hand, press-fitting piece 6143*a* protruding inward in the Y direction (width direction: second direction) is provided at a lower end of second side piece 6143 on the front end side in the X direction (front-rear direction), and press-fitting piece 6243*a* protruding inward in the Y direction (width direction: second direction) is provided at a lower end of second side piece 6243 on the front end side in the X direction (front-rear direction) (see FIGS. 6 and 7).

Figure 29:
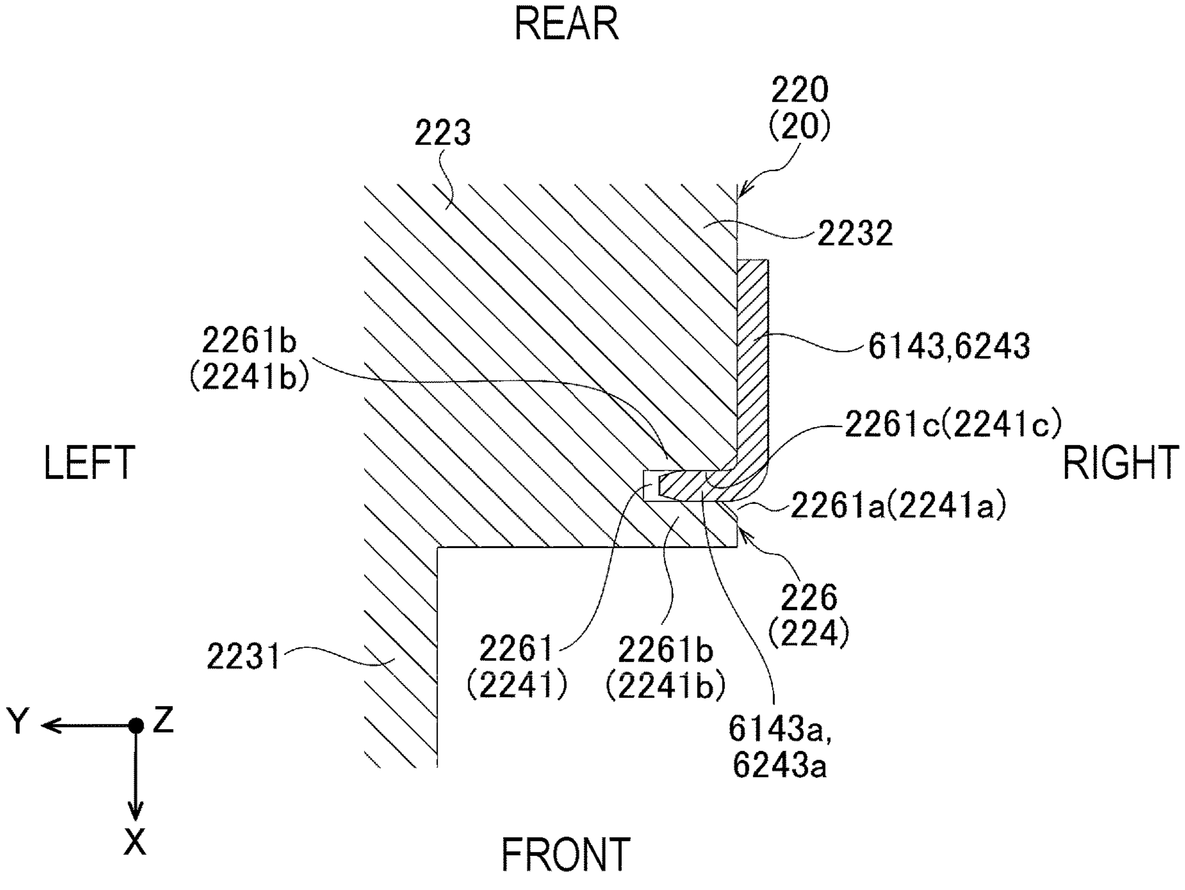
FIG. 29 is a horizontal cross-sectional view illustrating a state in which the terminal portion of the auxiliary contact portion is press-fitted into the lower press-fitting portion according to the first exemplary embodiment.
Figure 30:
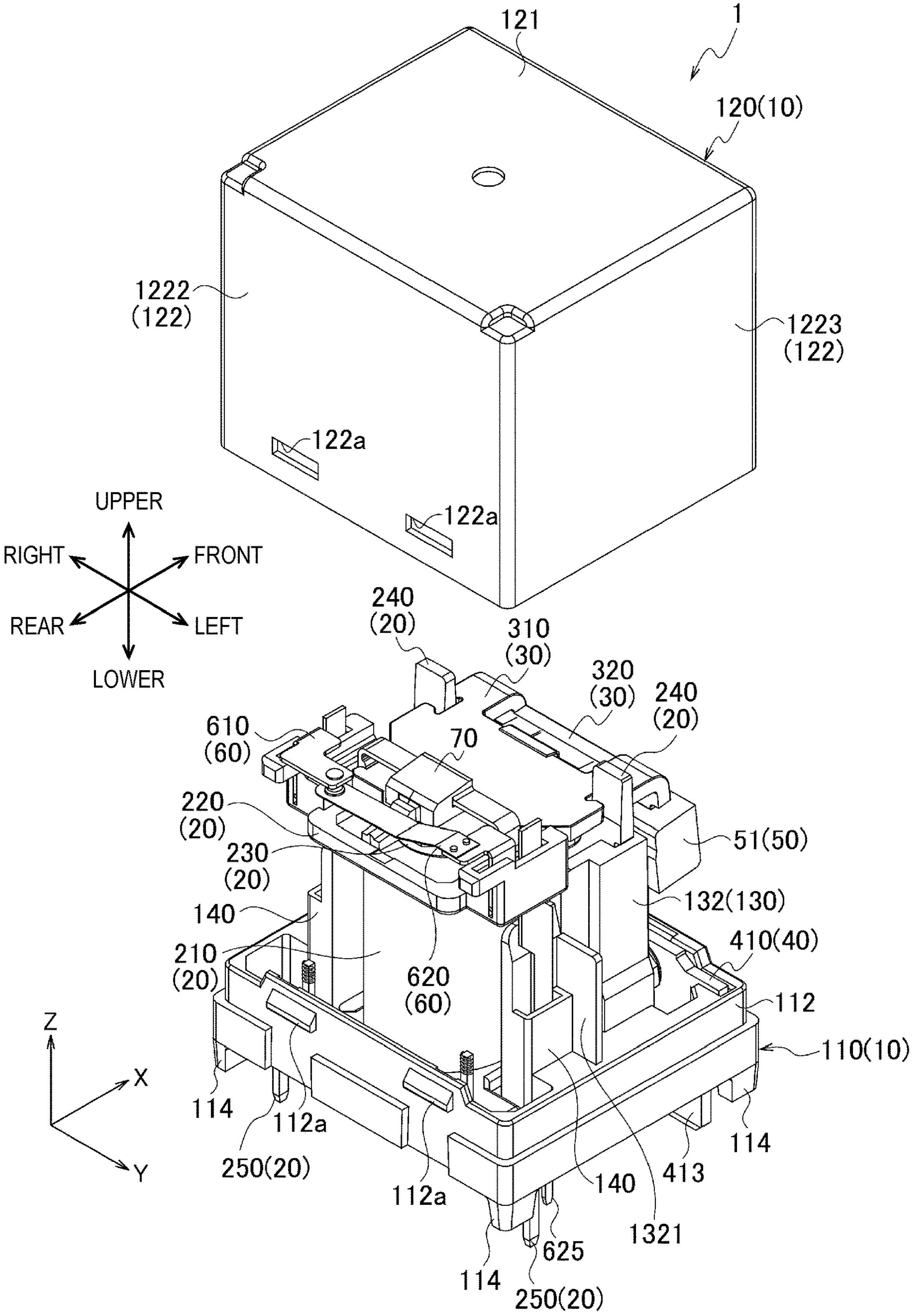
FIG. 30 is an exploded perspective view of a state in which a cover of the electromagnetic relay according to a second exemplary embodiment is removed as viewed from one direction.
Figure 31:
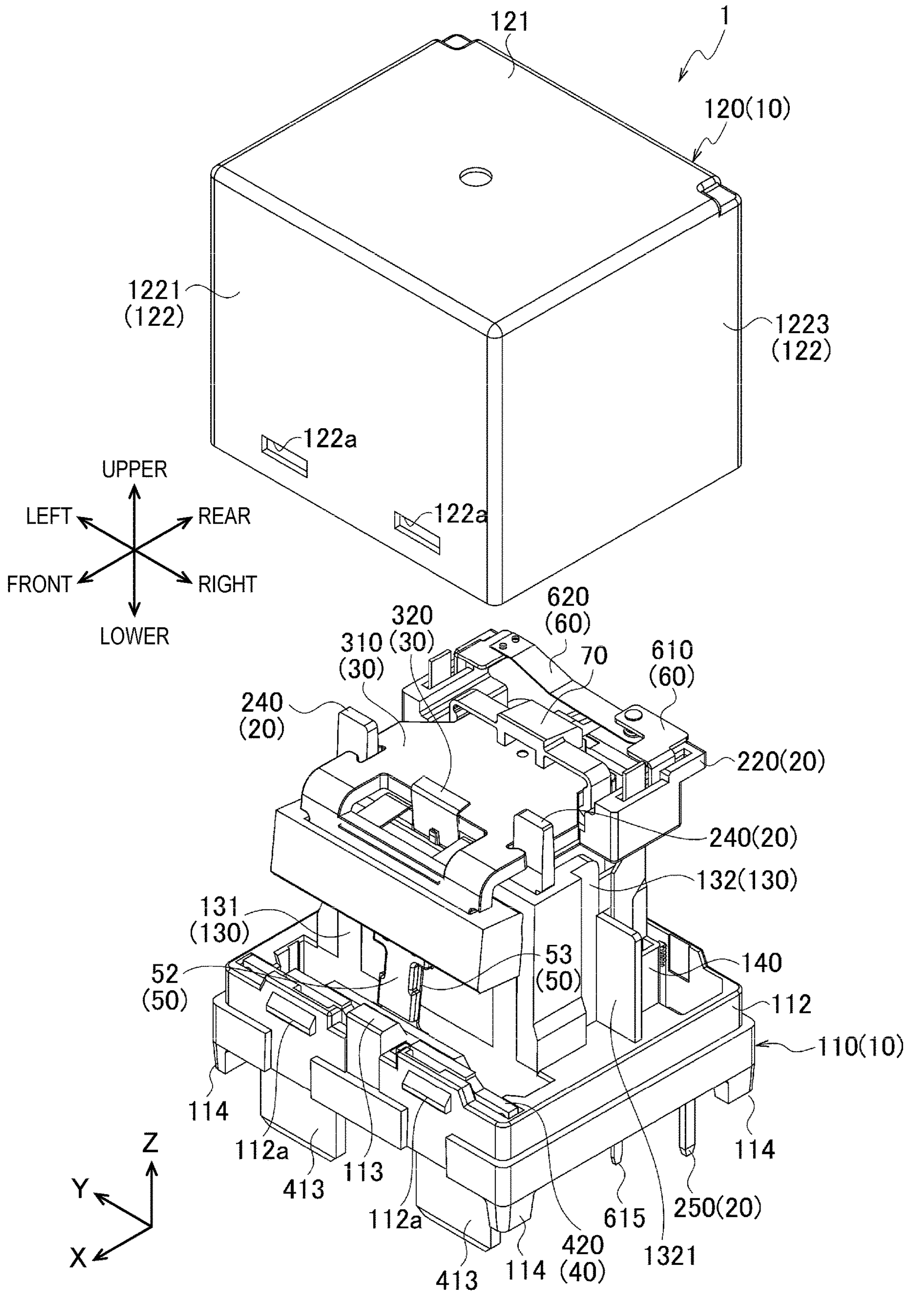
FIG. 31 is an exploded perspective view of a state in which the cover of the electromagnetic relay according to the second exemplary embodiment is removed as viewed from another direction.

Then, by press-fitting press-fitting piece 6143*a* into lower groove 2261 formed in lower press-fitting portion 226 on one side from lower-side opening 2261*a*, second side piece 6143 of side piece 614 is press-fitted and held in lower press-fitting portion 226 on one side (see FIG. 29).

At this time, press-fitting piece 6143*a* is sandwiched and pressed by lower pressure contact part 2261*c* formed on the inner surface of lower groove 2261. Thus, the relative movement of side piece 614 (first auxiliary contact terminal 612) held by lower press-fitting portion 226 with respect to coil bobbin 220 in the Y direction (width direction: second direction) is restricted. Further, the rotation of side piece 614 (first auxiliary contact terminal 612) with respect to coil bobbin 220 and the movement of the side piece in the direction orthogonal to the Y direction (width direction: second direction) are restricted by lower restriction wall 2261*b* formed around lower groove 2261.

Similarly, by press-fitting press-fitting piece 6243*a* into lower groove 2261 formed in lower press-fitting portion 226 on the other side from lower-side opening 2261*a*, second side piece 6243 of side piece 624 is press-fitted and held in lower press-fitting portion 226 on the other side.

At this time, press-fitting piece 6243*a* is sandwiched and pressed by lower pressure contact part 2261*c* formed on the inner surface of lower groove 2261. Thus, the relative movement of side piece 624 (second auxiliary contact terminal 622) held by lower press-fitting portion 226 with respect to coil bobbin 220 in the Y direction (width direction: second direction) is restricted. Further, the rotation of side piece 624 (second auxiliary contact terminal 622) with respect to coil bobbin 220 and the movement of the side piece in the direction orthogonal to the Y direction (width direction: second direction) are restricted by lower restriction wall 2261*b* formed around lower groove 2261.

In the present exemplary embodiment, each lower-side opening 2261*a* has a rectangular shape elongated in the Z direction (vertical direction: axial direction), and each lower groove 2261 is formed in a rectangular parallelepiped shape. Lower restriction wall 2261*b* is formed so as to surround the periphery of rectangular lower-side opening 2261*a* (rectangular parallelepiped lower groove 2261). Therefore, in the present exemplary embodiment, lower restriction wall 2261*b* includes a vertical wall facing side piece 614 and side piece 624 in the X direction (front-rear direction), and a horizontal wall facing side piece 614 and side piece 624 in the Z direction (vertical direction: axial direction).

As described above, in the present exemplary embodiment, while the pair of press-fitting pieces 6141*a* formed on first side piece 6141 is press-fitted into the pair of upper grooves 2251, one press-fitting piece 6143*a* formed on second side piece 6143 is press-fitted into lower groove 2261, so that side piece 614 is held by press-fitting portion 224 (upper press-fitting portion 225 and lower press-fitting portion 226).

On the other hand, while the pair of press-fitting pieces 6241*a* formed on first side piece 6241 is press-fitted into the pair of upper grooves 2251, one press-fitting piece 6243*a* formed on second side piece 6243 is press-fitted into lower groove 2261, so that side piece 624 is held by press-fitting portion 224 (upper press-fitting portion 225 and lower press-fitting portion 226).

As described above, in the present exemplary embodiment, upper-side opening 2251*a* and lower-side opening 2261*a* constitute opening 2241*a*, upper restriction wall 2251*b* and lower restriction wall 2261*b* constitute restriction wall 2241*b*, and upper pressure contact part 2251*c* and lower pressure contact part 2261*c* constitute pressure contact part 2241*c*. That is, upper groove 2251 and lower groove 2261 constitute groove 2241, and upper press-fitting portion 225 and lower press-fitting portion 226 constitute press-fitting portion 224.

Further, in the present exemplary embodiment, side piece 614 and side piece 624 are disposed so as to overlap second side wall 132 in a state of being viewed from the Y direction (width direction: second direction). Specifically, second side piece 6143 of side piece 614 and second side piece 6243 of side piece 624 are disposed so as to overlap second side wall 132 when viewed from the Y direction (width direction: second direction) (see FIGS. 3 to 5).

Thus, the relative movement amount of side piece 614 (first auxiliary contact terminal 612) and side piece 624 (second auxiliary contact terminal 622) with respect to coil bobbin 220 in the Y direction (width direction: second direction) is restricted by second side wall 132.

Figure 18:
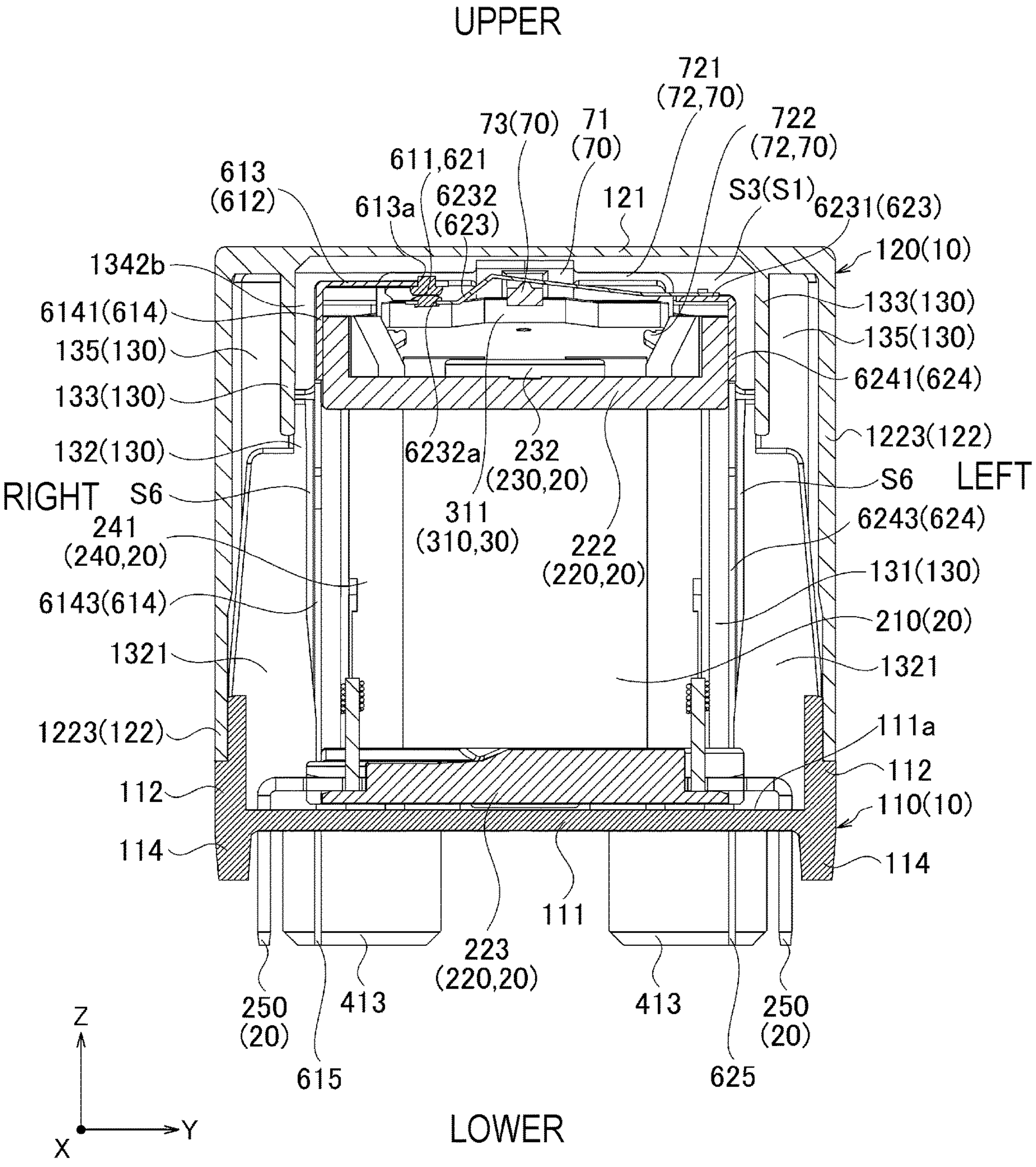
FIG. 18 is a view illustrating the electromagnetic relay according to the first exemplary embodiment, and is a cross-sectional view illustrating a state in which a position where the auxiliary contact of the electromagnetic relay exists is cut by a vertical plane extending in the right-left direction.

In the present exemplary embodiment, gap S6 is formed between second side piece 6143 and second side wall 132 and between second side piece 6243 and second side wall 132 (see FIG. 18). Thus, coil bobbin 220 in which first auxiliary contact terminal 612 and second auxiliary contact terminal 622 are press-fitted and held can be more easily placed on base 110.

Figure 19:
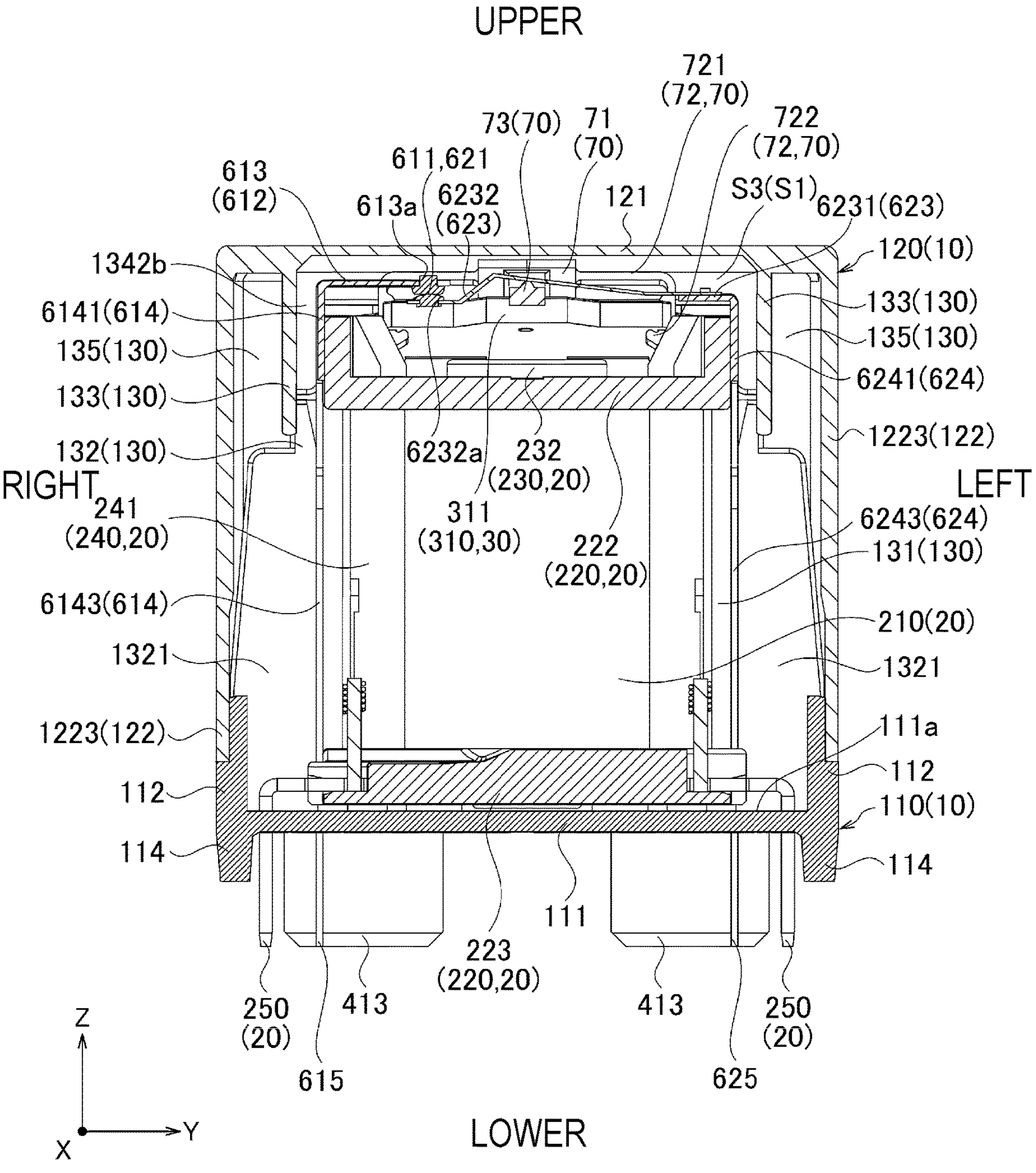
FIG. 19 is a view illustrating an electromagnetic relay according to a modification of the first exemplary embodiment, and is a cross-sectional view illustrating a state in which a position where an auxiliary contact of the electromagnetic relay exists is cut by a vertical plane extending in the right-left direction.

As illustrated in FIG. 19, it is also possible to prevent gap S6 (see FIG. 18) from being formed between side piece 614 and second side wall 132 and between side piece 624 and second side wall 132.

Second Exemplary Embodiment

As illustrated in FIGS. 30 to 33, electromagnetic relay 1 according to the present exemplary embodiment has the same configuration as electromagnetic relay 1 shown in the first exemplary embodiment.

That is, electromagnetic relay 1 according to the present exemplary embodiment includes housing 10, main fixed contact 411, main moving contact 421 that comes into contact with or separates from main fixed contact 411, and main contact portion 40 disposed in internal space S1 formed in housing 10.

Auxiliary fixed contact 611 and auxiliary moving contact 621 that comes into contact with or separates from auxiliary fixed contact 611 are provided, and auxiliary contact portion 60 disposed in internal space S1 is provided. Auxiliary contact portion 60 includes first auxiliary contact terminal 612 provided with auxiliary fixed contact 611 and second auxiliary contact terminal 622 provided with auxiliary moving contact 621.

Further provided are coil 210 disposed in internal space S1, coil bobbin 220 around which coil 210 is wound, and coil terminal 250 disposed on one side (lower side) in the axial direction (Z direction) of coil 210 and to which coil 210 is connected.

Electromagnetic relay 1 according to the present exemplary embodiment also includes partition wall 130 that divides internal space S1 into main contact side space S2 where main contact portion 40 exists and auxiliary contact side space S3 where auxiliary contact portion 60 exists.

Partition wall 130 includes first side wall 131 continuously connected to base 110 so as to extend along the Z direction (vertical direction: axial direction) on the front side of coil 210 in the X direction (front-rear direction) (one side in the first direction intersecting the axial direction).

Partition wall 130 includes a pair of second side walls 132 disposed on both sides in the Y direction (width direction: a second direction intersecting with the axial direction of the coil and the first direction) and continuously connected to base 110 so as to extend along the Z direction (vertical direction: axial direction).

First side wall 131 is continuously connected to base 110 such that main contact portion 40 and movable part 50 are located on the front side in the X direction (front-rear direction) and auxiliary contact portion 60 and coil 210 are located on the rear side in the X direction (front-rear direction) (the other side in the first direction intersecting the axial direction).

In addition, at least a part of side surface 210*a* of coil 210 is surrounded by first side wall 131 and the pair of second side walls 132.

Further, also in the present exemplary embodiment, partition wall 130 includes a pair of third side walls 133 disposed side by side in the Y direction (width direction: second direction) and provided along the Z direction (vertical direction: axial direction) and along second side wall 132.

Figure 34:
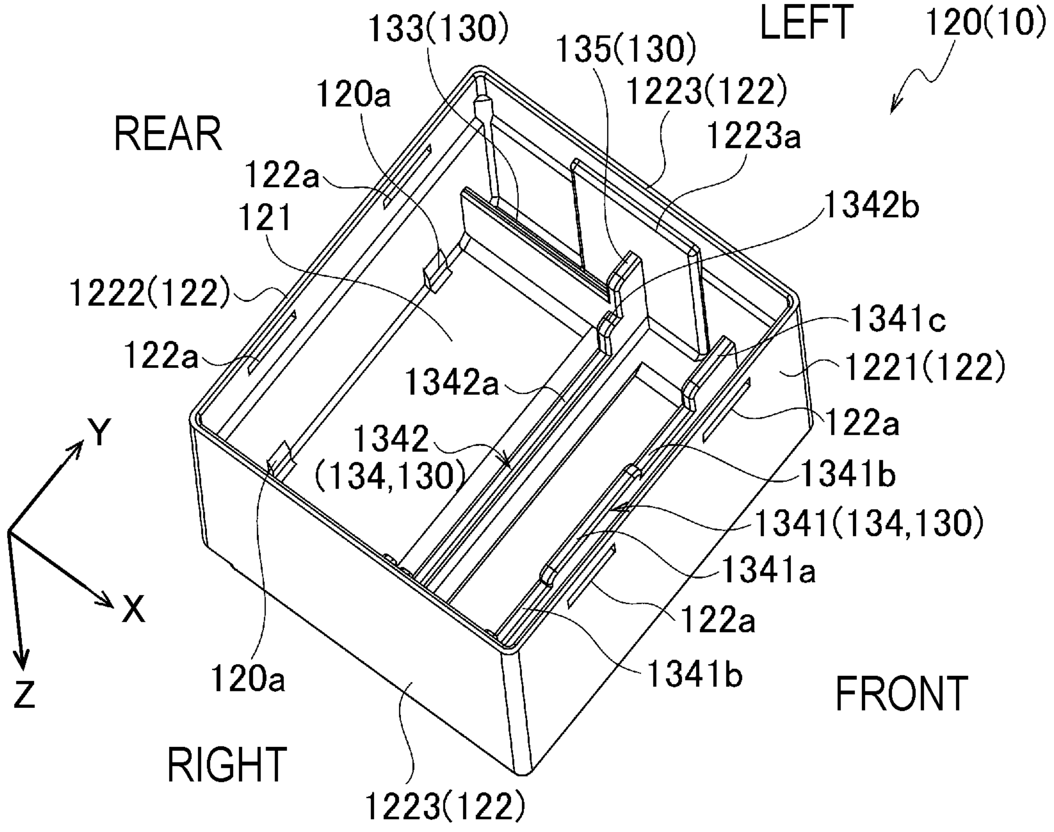
FIG. 34 is a perspective view illustrating the inside of the cover according to the second exemplary embodiment.
Figure 35:
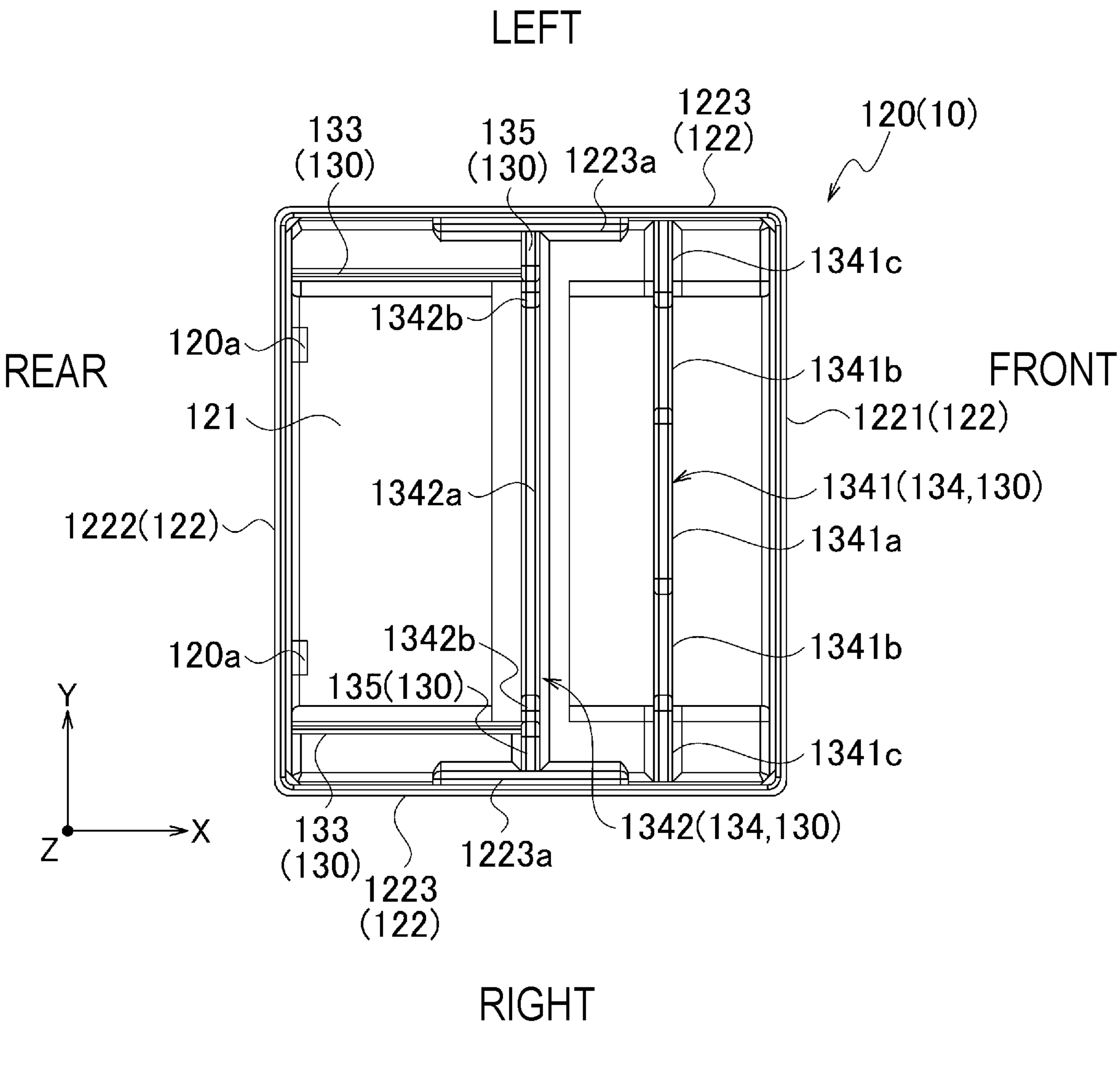
FIG. 35 is a rear view illustrating the cover according to the second exemplary embodiment.

Also in the present exemplary embodiment, third side wall 133 is formed inside case 120 (see FIGS. 34 and 35). Specifically, third side wall 133 extends from the inner surface of top wall 121 along the X direction (front-rear direction: first direction) and the Z direction (vertical direction: axial direction). Third side wall 133 is formed such that the rear end in the X direction (front-rear direction: first direction) is in contact with the inner surface of rear wall 1222.

In a state where base 110 is positioned below case 120, the pair of third side walls 133 is provided at the same height as the contact peripheral portion of auxiliary contact portion 60 in the Z direction (vertical direction: axial direction) with bottom surface 111*a* of base 110 as a reference (see FIG. 36).

Further, also in the present exemplary embodiment, partition wall 130 includes fourth side wall 134 provided on case 120 so as to protrude downward in the Z direction (vertical direction: axial direction) in a state where base 110 is positioned below case 120 (see FIGS. 34 and 35). Fourth side wall 134 extends in the Y direction (width direction: second direction) and faces armature 310 in the Z direction (vertical direction: axial direction).

Fourth side wall 134 includes pressing wall 1341 which is disposed on the front side (main contact portion 40 side) in the X direction (front-rear direction: first direction) with respect to vertical wall (upright portion) 241 of yoke 240, and is capable of pressing armature 310.

Pressing wall 1341 includes protrusion 1341*a* formed at the center in the Y direction (width direction: second direction) and a pair of recesses 1341*b* formed at both ends in the Y direction (width direction: second direction) of protrusion 1341*a* (see FIGS. 34 and 35). Further, pressing wall 1341 includes a pair of pressing wall extended portions 1341*c* formed on the outer sides of the pair of recesses 1341*b* in the Y direction (width direction: second direction).

Fourth side wall 134 includes partition wall 1342 which is disposed on the rear side (auxiliary contact portion 60 side) in the X direction (front-rear direction: first direction) with respect to vertical wall (upright portion) 241 of yoke 240, and is capable of dividing space S5 above armature 310.

Partition wall 1342 includes recess 1342*a* formed at the center in the Y direction (width direction: second direction) and a pair of partition wall extended portions 1342*b* formed at both ends in the Y direction (width direction: second direction) of recess 1342*a* (see FIGS. 34 and 35).

Further, also in the present exemplary embodiment, partition wall 130 includes fifth side wall 135 that extends in the Z direction (vertical direction: axial direction) and is provided on case 120 so as to be disposed outside second side wall 132 in the Y direction (width direction: second direction).

Also in the present exemplary embodiment, fifth side wall 135 extends so as to protrude downward in the Z direction (vertical direction: axial direction) from top wall 121 of case 120. Further, also in the present exemplary embodiment, fifth side wall 135 is formed integrally with third side wall 133 and partition wall extended portion 1342*b*.

Also in the present exemplary embodiment, second side wall 132 includes extension part 1321 extending outward in the Y direction (width direction: second direction). Extension part 1321 extends in the Y direction (width direction: second direction) and the Z direction (vertical direction: axial direction) from a rear end of second side wall 132 in the X direction (front-rear direction: first direction). Extension part 1321 is formed from the lower end to the upper end side (the middle of the upper end) of second side wall 132 (see FIGS. 32 and 33).

Figure 32:
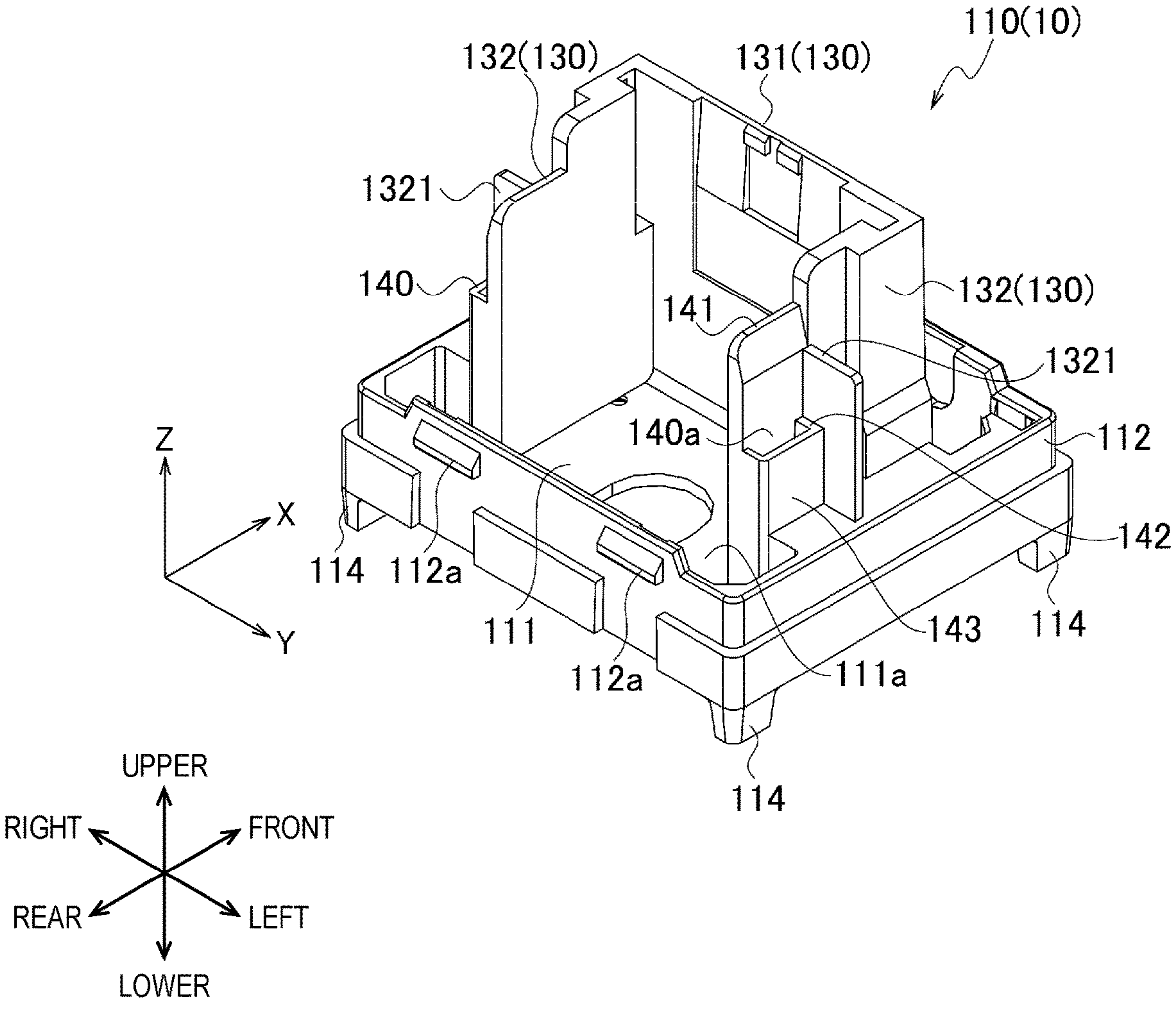
FIG. 32 is a perspective view of a base according to the second exemplary embodiment as viewed from one direction.
Figure 33:
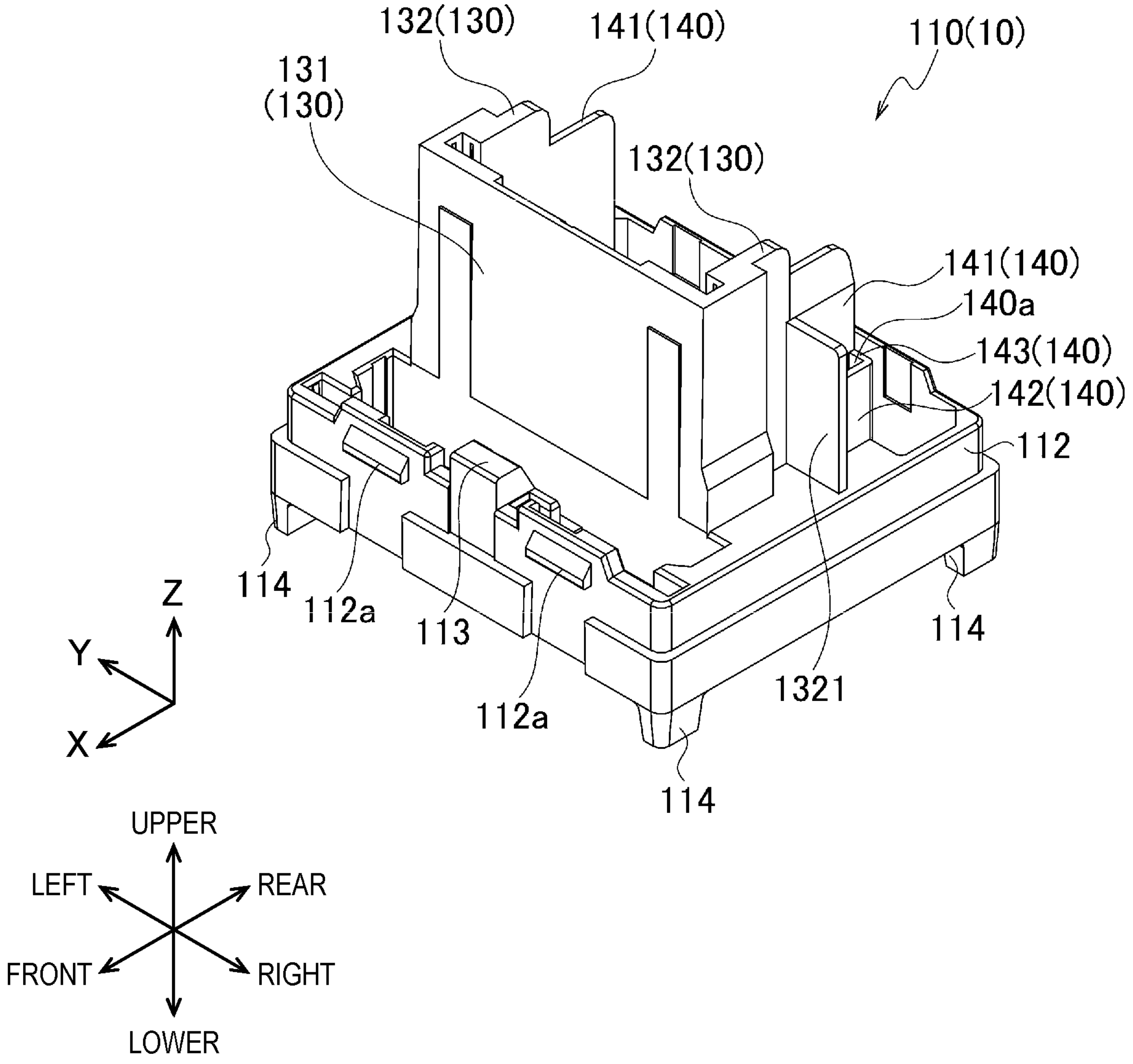
FIG. 33 is a perspective view of the base according to the second exemplary embodiment as viewed from another direction.

In the present exemplary embodiment, auxiliary terminal insertion wall 140 into which first auxiliary contact terminal 612 and second auxiliary contact terminal 622 are inserted is formed at the rear end of extension part 1321 of base 110 in the X direction (front-rear direction: first direction) (see FIGS. 32 and 33). Auxiliary terminal insertion wall 140 includes: extension wall 141 provided continuously from a rear end of second side wall 132 in the X direction (front-rear direction: first direction) and extending backward in the X direction (front-rear direction: first direction); facing wall 142 disposed outside extension wall 141 in the Y direction (width direction: second direction) and facing extension wall 141 in the Y direction (width direction: second direction); and a pair of coupling walls 143 connecting extension wall 141 and the facing wall. A space surrounded by the extension wall 141, the opposing wall, and the pair of coupling walls 143 is insertion space 140*a* that opens in the Z direction (vertical direction: axial direction).

Figure 37:
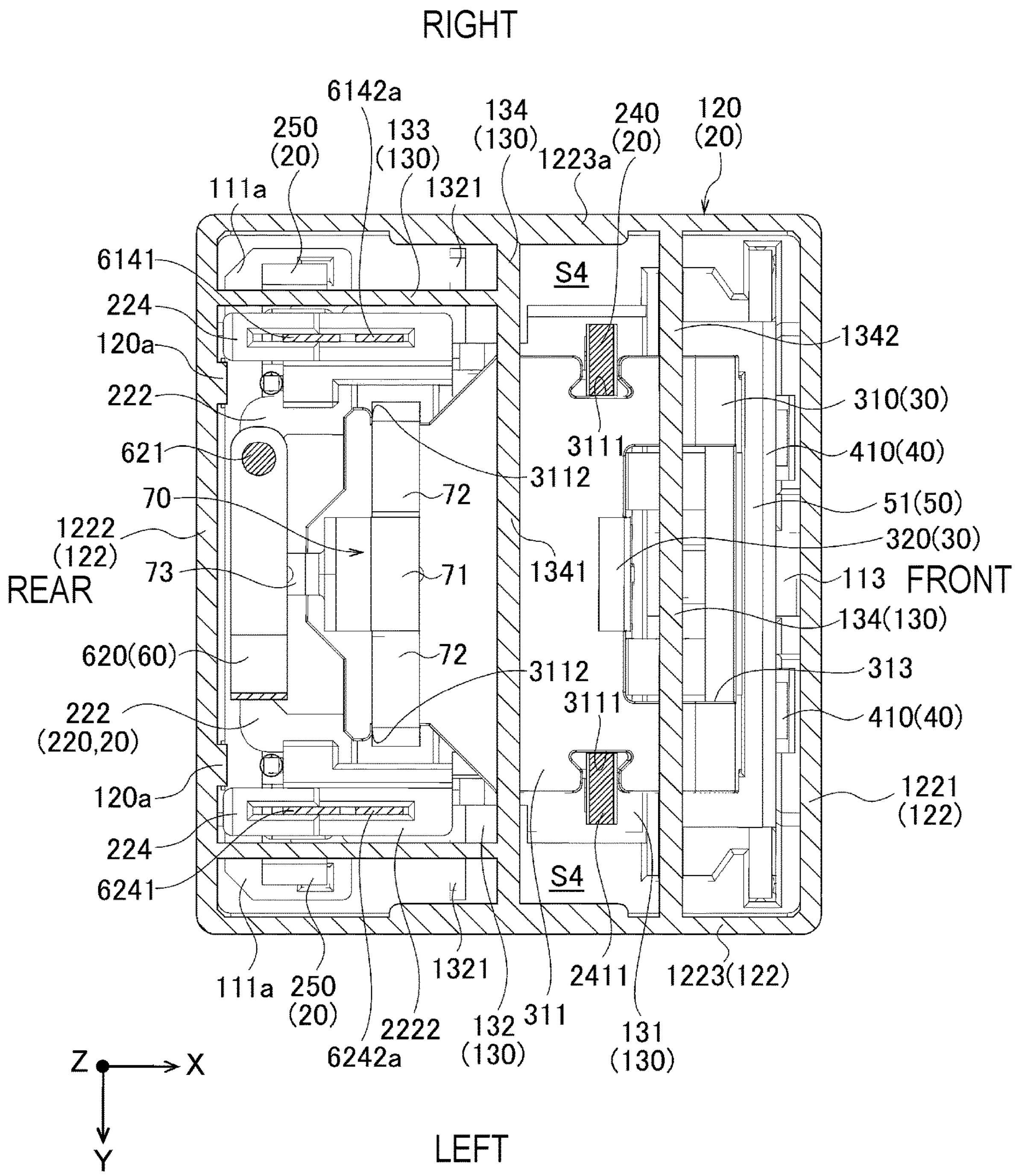
FIG. 37 is a view illustrating an electromagnetic relay according to the second exemplary embodiment, and is a plan view illustrating a state in which a position where the projecting portion of the cover exists in the electromagnetic relay is cut by a horizontal plane.
Figure 38:
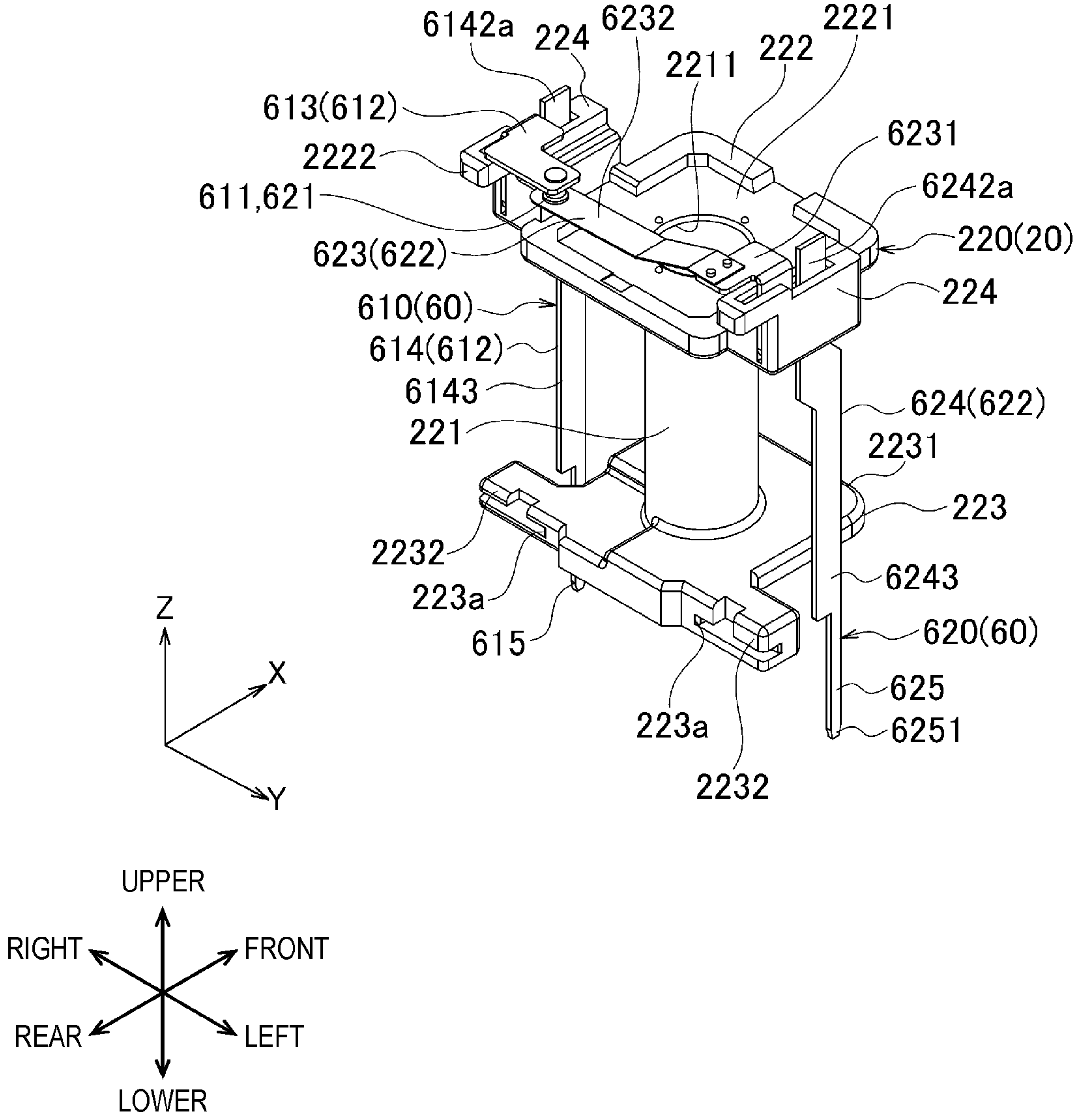
FIG. 38 is a perspective view of a state where an auxiliary contact portion according to the second exemplary embodiment is attached to a coil bobbin as viewed from one direction.
Figure 39:
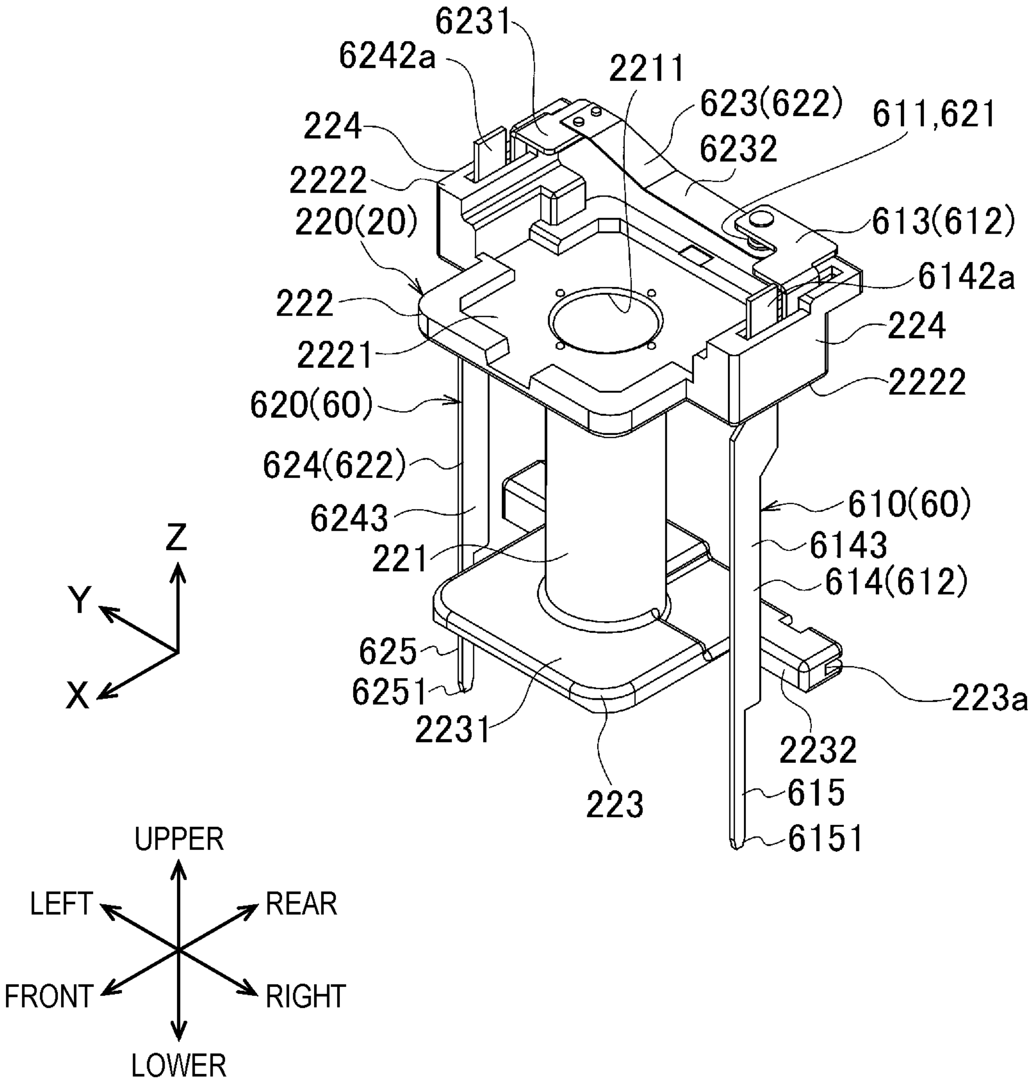
FIG. 39 is a perspective view of a state in which the auxiliary contact portion according to the second exemplary embodiment is attached to the coil bobbin as viewed from another direction.

Further, also in the present exemplary embodiment, press-fitting portion 224 is formed in coil bobbin 220, and side piece 614 of first auxiliary contact terminal 612 and side piece 624 of second auxiliary contact terminal 622 are press-fitted and held by press-fitting portion 224 (see FIGS. 37 to 39).

Also in the present exemplary embodiment, a pair of press-fitting portions 224 is formed at both ends in the Y direction (width direction: second direction) on the rear side in the X direction (front-rear direction) of coil bobbin 220. Side piece 614 of first auxiliary contact terminal 612 is press-fitted and held by press-fitting portion 224 on one side in the Y direction (width direction: second direction), and side piece 624 of second auxiliary contact terminal 622 is press-fitted and held by press-fitting portion 224 on the other side in the Y direction (width direction: second direction).

Press-fitting portion 224 is formed on each of a pair of extended portions 2222 provided continuously from a rear portion of upper flange body 2221 in the X direction (front-rear direction) so as to protrude outward in the Y direction (width direction: second direction) and upward in the Z direction (vertical direction: axial direction of the coil) (see FIGS. 38 and 39). Side piece 614 is press-fitted and held by one press-fitting portion 224, and side piece 624 is press-fitted and held by other press-fitting portion 224.

Groove 2241 into which side piece 614 and side piece 624 are inserted is formed in each of the pair of press-fitting portions 224. Groove 2241 includes opening 2241*a* into which side piece 614 and side piece 624 are press-fitted, restriction wall 2241*b* formed around opening 2241*a* so as to face side piece 614 and side piece 624, and pressure contact part 2241*c* that sandwiches and presses side piece 614 and side piece 624.

Here, in the present exemplary embodiment, each groove 2241 is formed so as to open on both sides in the Z direction (vertical direction: axial direction of the coil), and an opening that opens on both sides in the Z direction (vertical direction: axial direction of the coil) of groove 2241 is opening 2241*a* included in press-fitting portion 224. Then, side piece 614 and side piece 624 are inserted from opening 2241*a* opened on the upper side in the Z direction (vertical direction: axial direction of the coil) of groove 2241 and press-fitted and held.

Specifically, press-fitting portion 224 includes top wall 2242 and bottom wall 2243 positioned below top wall 2242 and facing top wall 2242 in the Z direction (vertical direction: axial direction of the coil) (see FIGS. 42 and 43). Further, press-fitting portion 224 includes front wall 2244 connected to front ends of top wall 2242 and bottom wall 2243, a rear wall 2245 connected to rear ends of top wall 2242 and bottom wall 2243, and a pair of side walls 2246 connected to side ends of top wall 2242 and bottom wall 2243, respectively.

Figure 47:
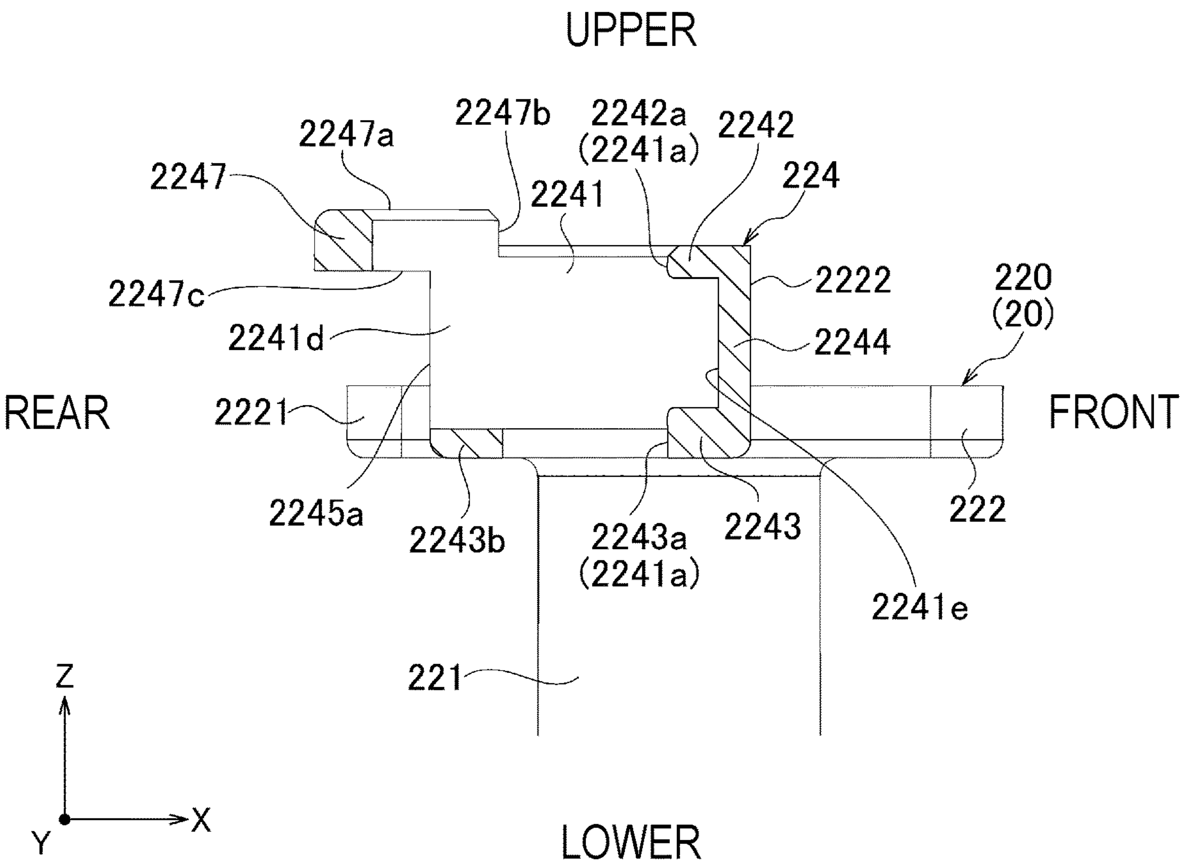
FIG. 47 is a side cross-sectional view illustrating the press-fitting portion according to the second exemplary embodiment.

Groove 2241 is formed inside press-fitting portion 224 so as to penetrate in the Z direction (vertical direction: axial direction of the coil) (see FIG. 47). As a result, upper opening 2242*a* is formed in top wall 2242, and lower opening 2243*a* is formed in bottom wall 2243, so that upper opening 2242*a* and lower opening 2243*a* are openings 2241*a* included in groove 2241.

Figure 48:
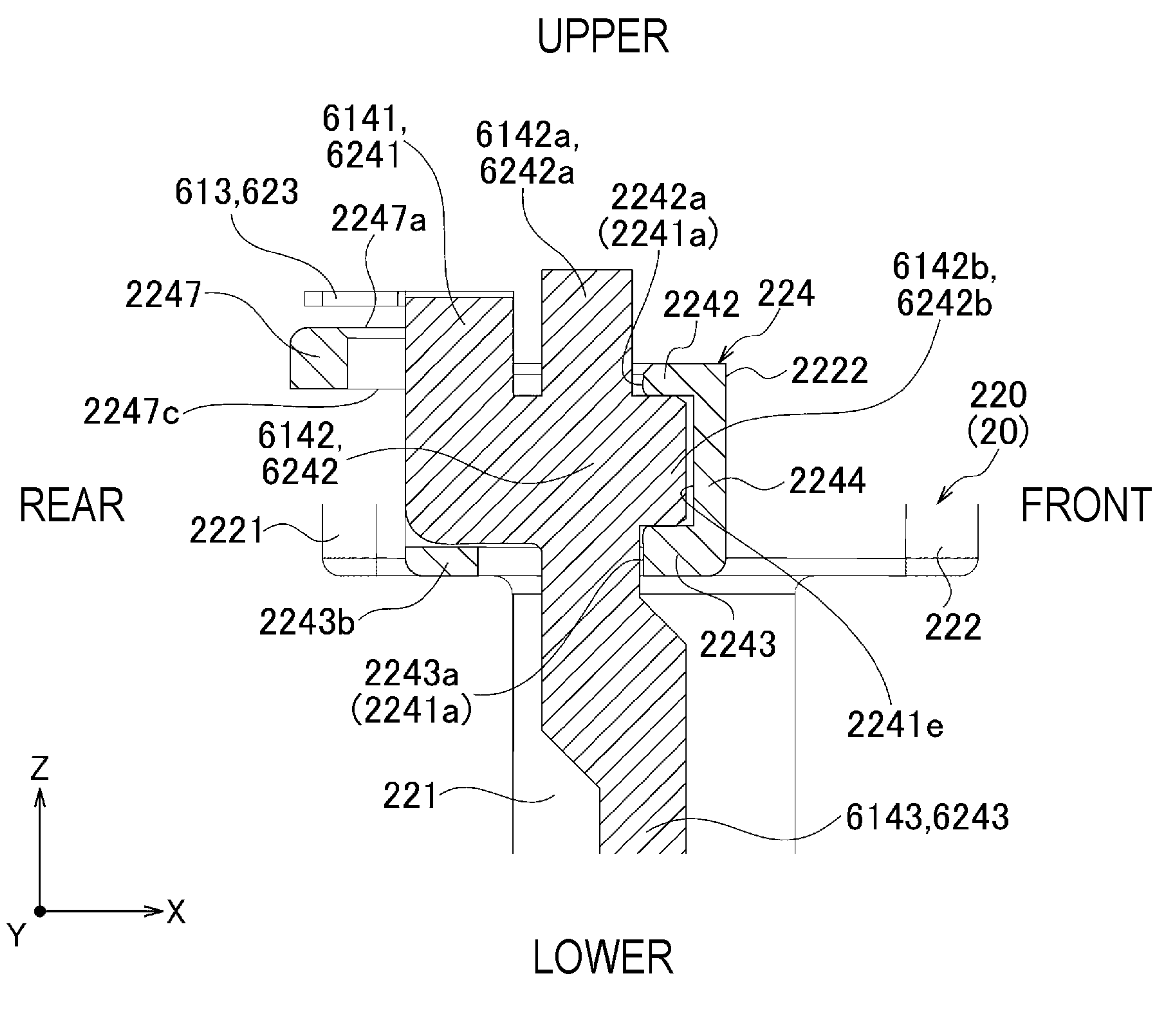
FIG. 48 is a side cross-sectional view illustrating a state in which the terminal portion of the auxiliary contact portion is press-fitted into the press-fitting portion according to the second exemplary embodiment.

Lower restriction wall 2243*b* is formed behind lower opening 2243*a* of bottom wall 2243 in the X direction (front-rear direction: first direction), and when side piece 614 and side piece 624 are inserted from above in the Z direction (vertical direction: axial direction of the coil), the movement of side piece 614 and side piece 624 downward in the Z direction (vertical direction: axial direction of the coil) is restricted by lower restriction wall 2243*b* (see FIGS. 47 and 48).

Figure 42:
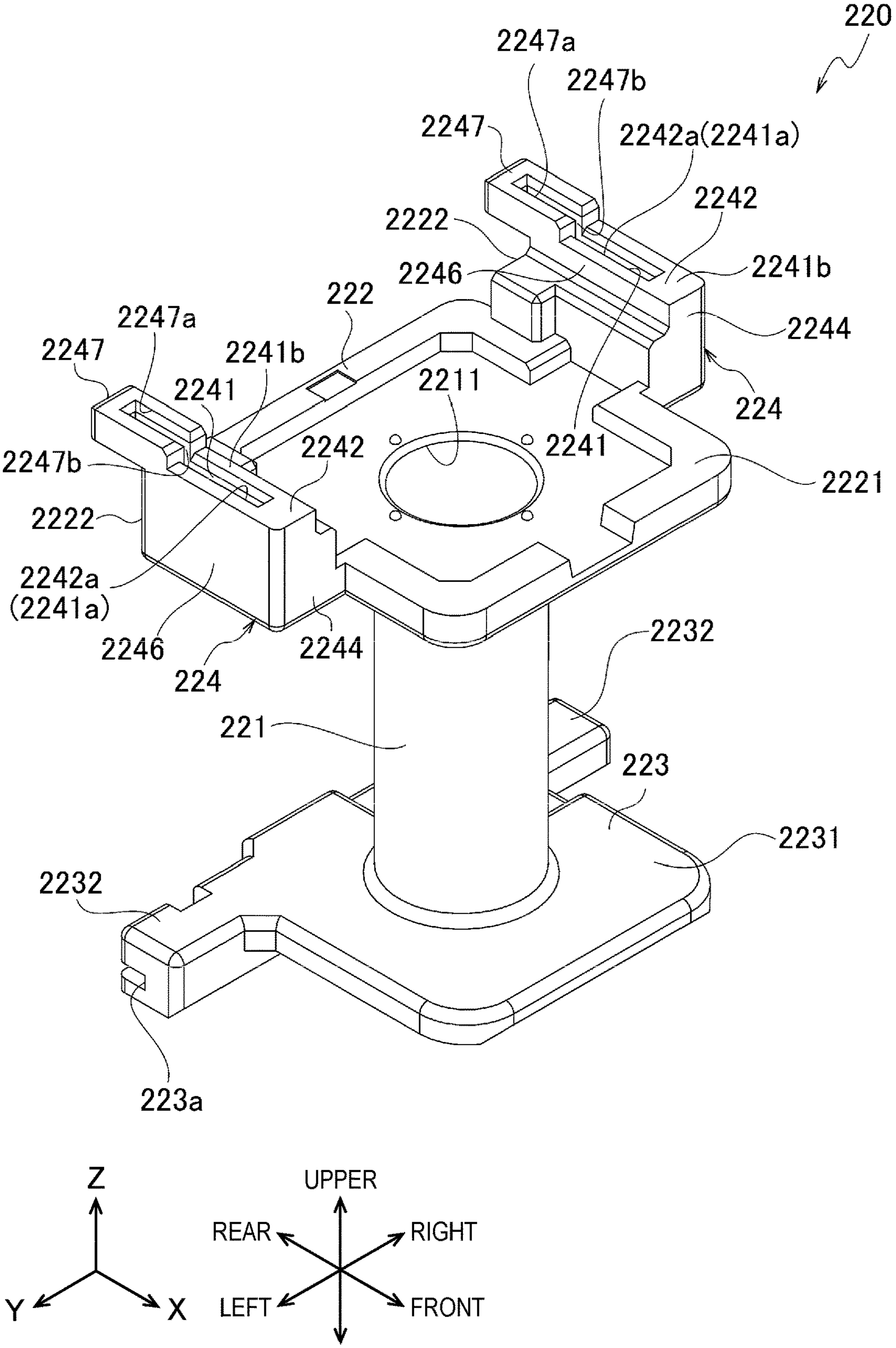
FIG. 42 is a perspective view of a coil bobbin according to the second exemplary embodiment as viewed from above.
Figure 43:
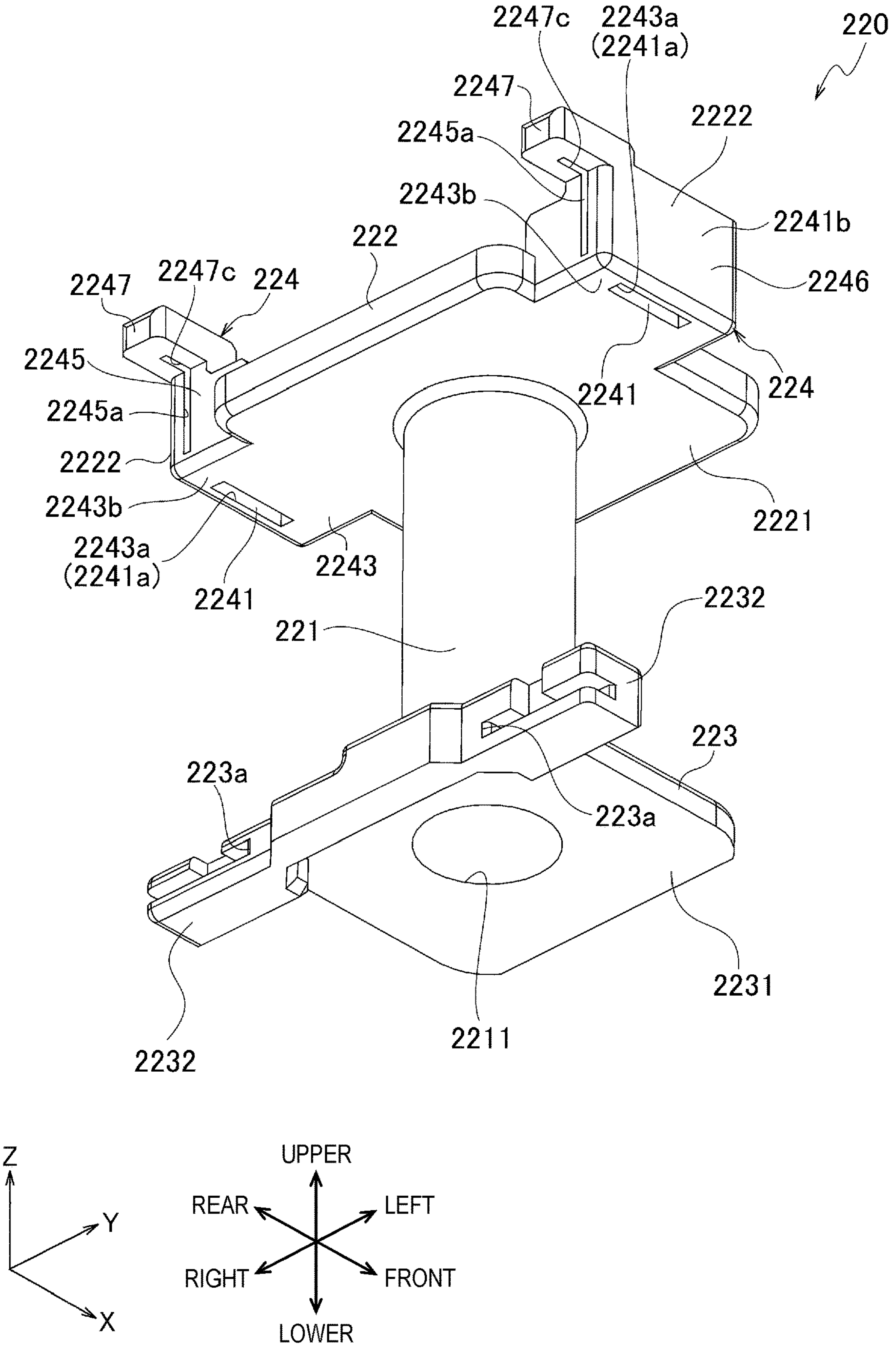
FIG. 43 is a perspective view of the coil bobbin according to the second exemplary embodiment as viewed from below.
Figure 44:
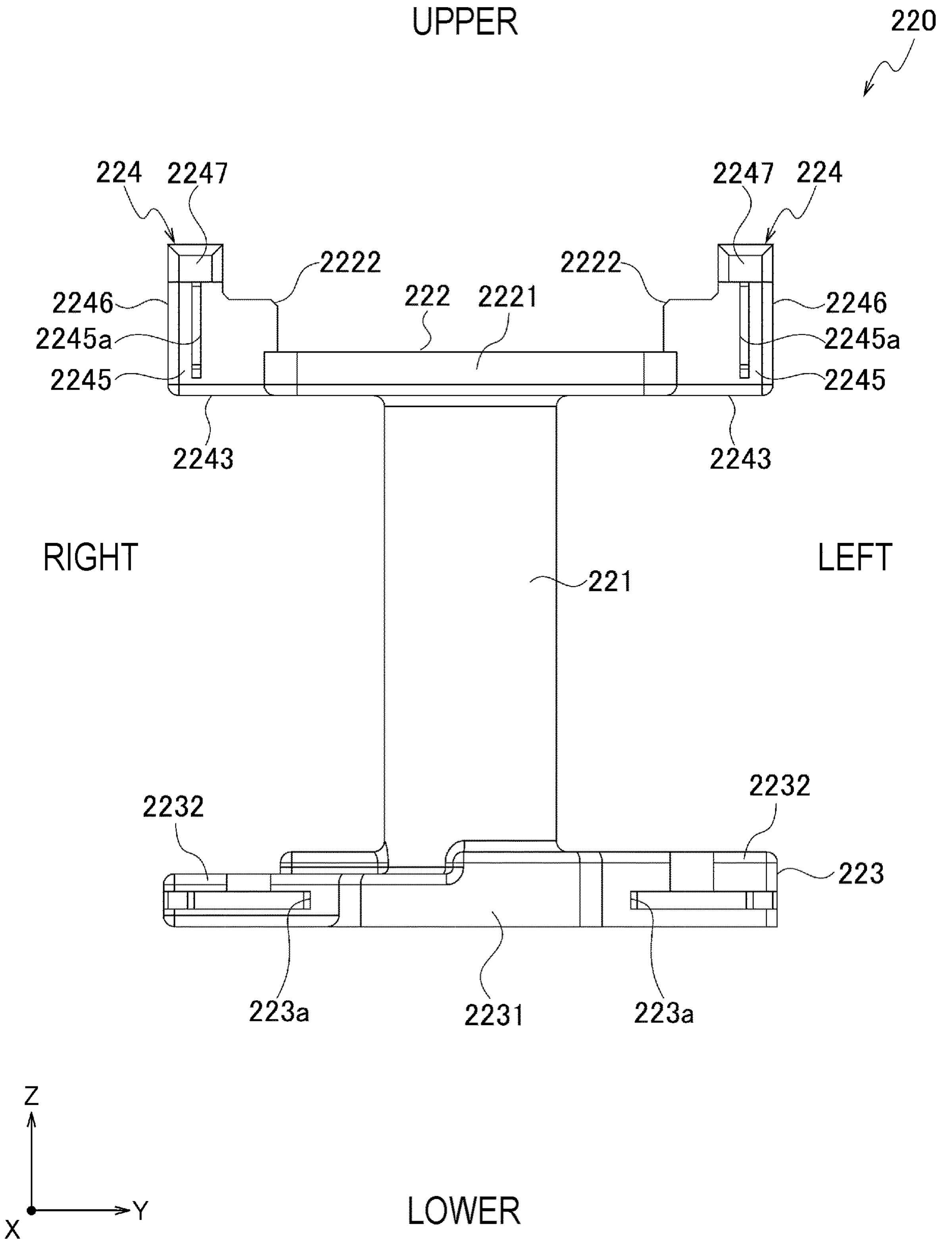
FIG. 44 is a cross-sectional view illustrating the coil bobbin according to the second exemplary embodiment.
Figure 45:
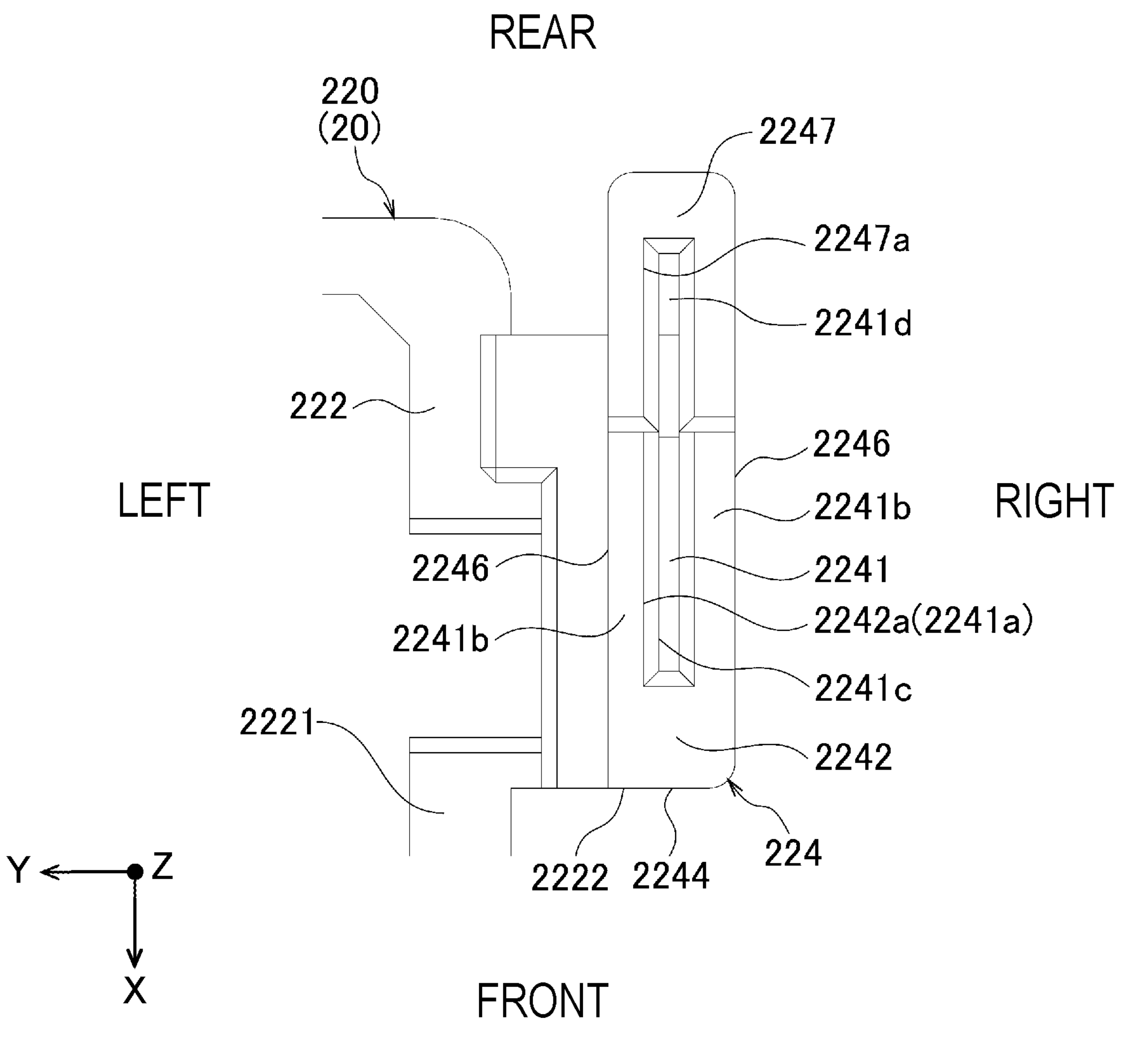
FIG. 45 is a plan view illustrating a press-fitting portion according to the second exemplary embodiment.
Figure 46:
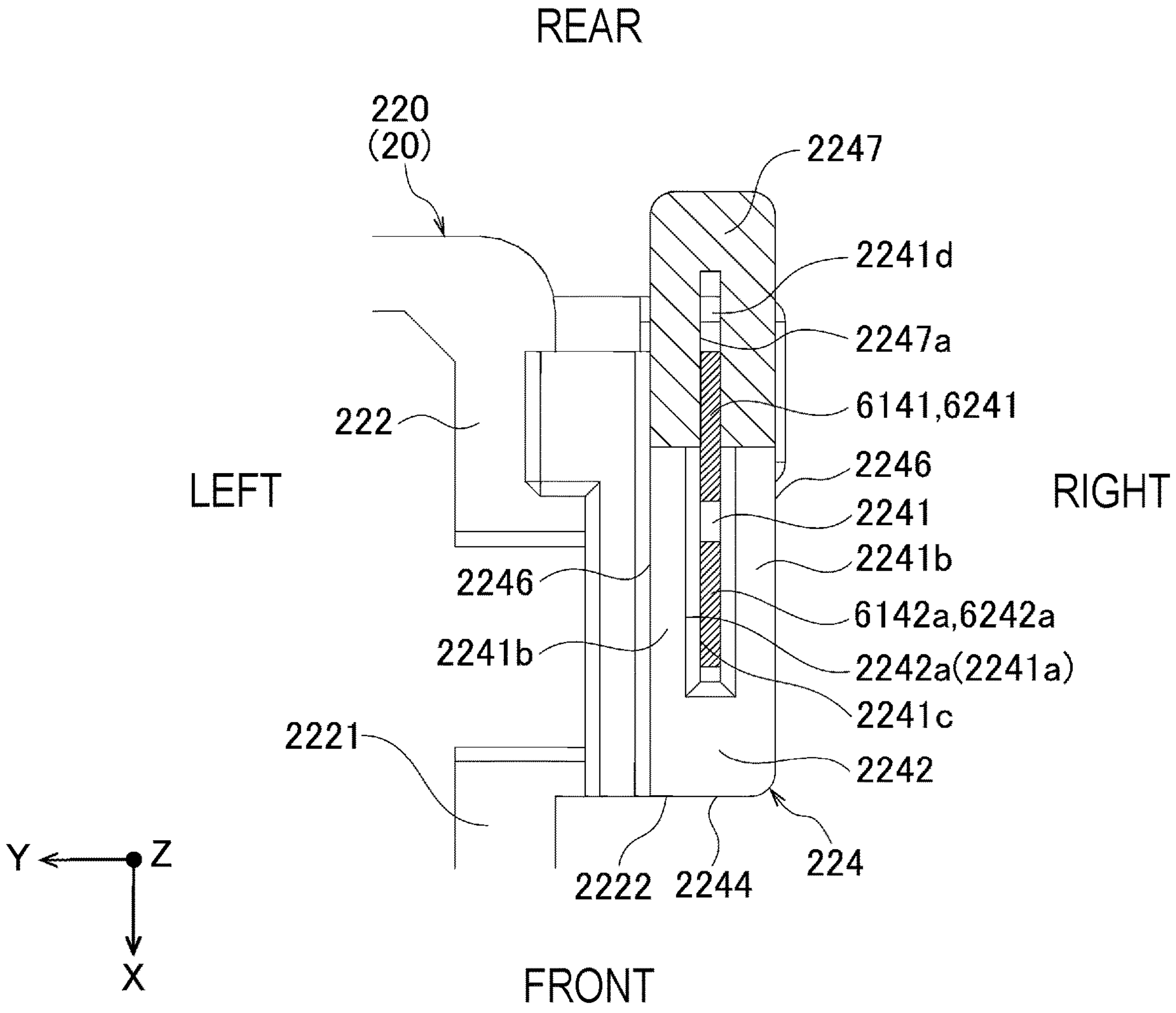
FIG. 46 is a horizontal cross-sectional view illustrating a state in which the terminal portion of the auxiliary contact portion is press-fitted into the press-fitting portion according to the second exemplary embodiment.

Further, in the present exemplary embodiment, press-fitting portion 224 includes protruding wall 2247 provided at a rear end in the X direction (front-rear direction: first direction) and protruding backward in the X direction (front-rear direction: first direction) and upward in the Z direction (vertical direction: axial direction of the coil) (see FIGS. 42 to 44).

A space is formed inside protruding wall 2247, and the space is formed to be opened to three sides by upper opening 2247*a*, side opening 2245*a*, and lower opening 2247*c*. Further, side opening 2245*a* is formed such that an upper end thereof is continuously connected to upper opening 2247*a* and a lower end thereof is continuously connected to upper opening 2242*a* formed in top wall 2242.

Further, in the present exemplary embodiment, groove 2241 is formed so as to also open to the rear side (rear wall 2245 side) in the X direction (front-rear direction: first direction). That is, side opening 2245*a* is formed in rear wall 2245 (see FIGS. 43 and 44). The front end of lower opening 2247*c* of protruding wall 2247 in the X direction (front-rear direction: first direction) is formed to be continuously connected to side opening 2245*a* formed in rear wall 2245.

As described above, in the present exemplary embodiment, a space opened in three directions is formed inside protruding wall 2247 so as to communicate with groove 2241.

Then, a space existing behind groove 2241 in the X direction (front-rear direction: first direction) is set as insertion assisting space 2241*d* that assists the insertion of side piece 614 and side piece 624 (see FIG. 47). That is, in the present exemplary embodiment, press-fitting portion 224 includes groove 2241 into which side piece 614 and side piece 624 are inserted and press-fitted and held, and insertion assisting space 2241*d* that communicates with groove 2241 and assists the insertion of side piece 614 and side piece 624 into groove 2241.

Further, in the present exemplary embodiment, press-fitting portion 224 includes housing recess 2241*e* communicated so as to protrude forward in the X direction (front-rear direction: first direction) from groove 2241, and when side piece 614 and side piece 624 are press-fitted and held by press-fitting portion 224, distal end 6142*b* of coupling part 6142 and distal end 6242*b* of coupling part 6242 are housed in housing recess 2241*e* (see FIGS. 47 and 48). In the present exemplary embodiment, housing recess 2241*e* is formed to open only backward in the X direction (front-rear direction: first direction). That is, housing recess 2241*e* is closed on both sides in the Z direction (vertical direction: axial direction of coil), on the front side in the X direction (front-rear direction: first direction), and on both sides in the Y direction (width direction: second direction) by top wall 2242, bottom wall 2243, front wall 2244, and the pair of side walls 2246.

Side piece 614 of first auxiliary contact terminal 612 and side piece 624 of second auxiliary contact terminal 622 are press-fitted and held by press-fitting portion 224 having such a shape.

Figure 40:
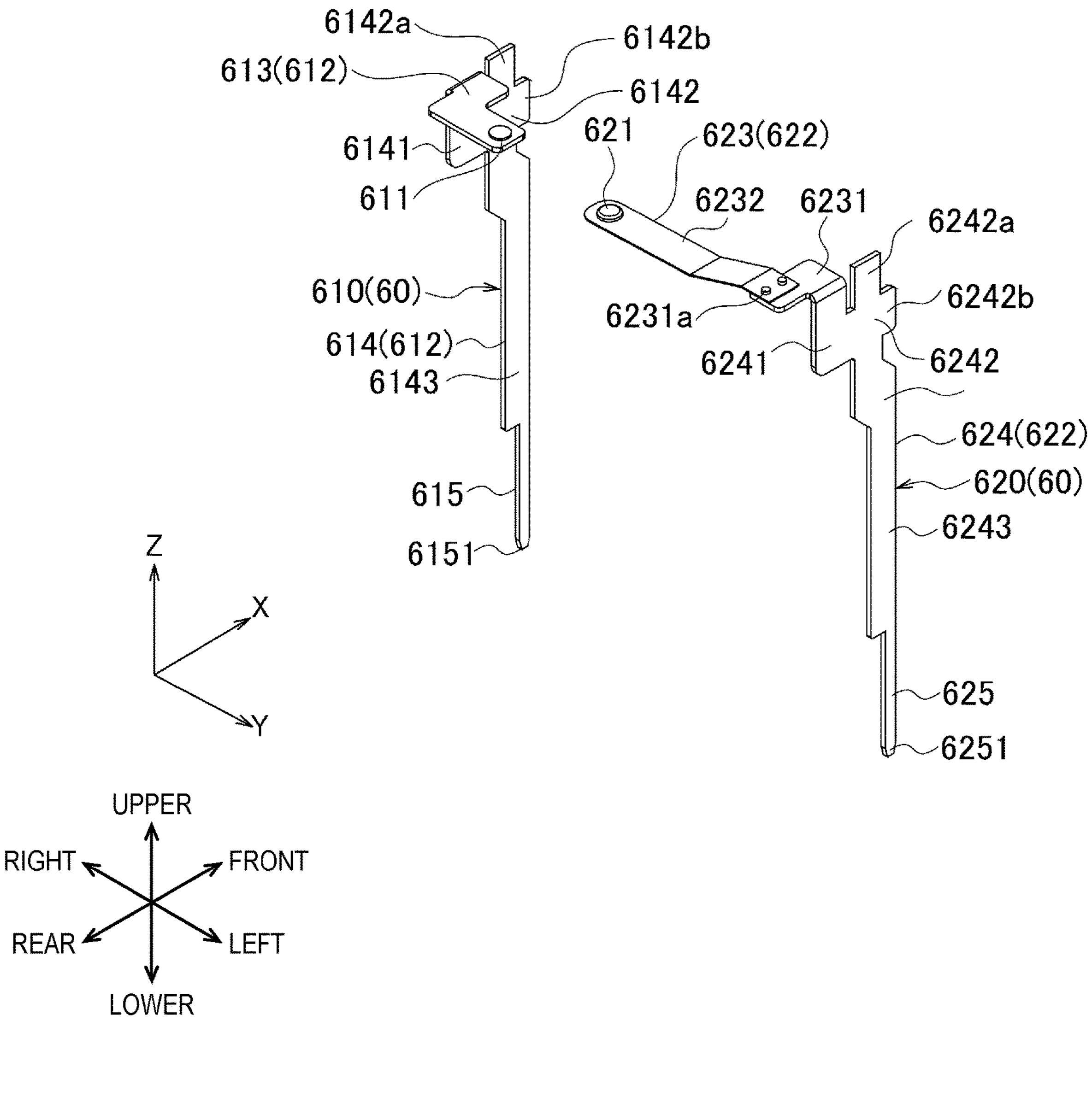
FIG. 40 is a perspective view of the auxiliary contact portion according to the second exemplary embodiment as viewed from one direction.
Figure 41:
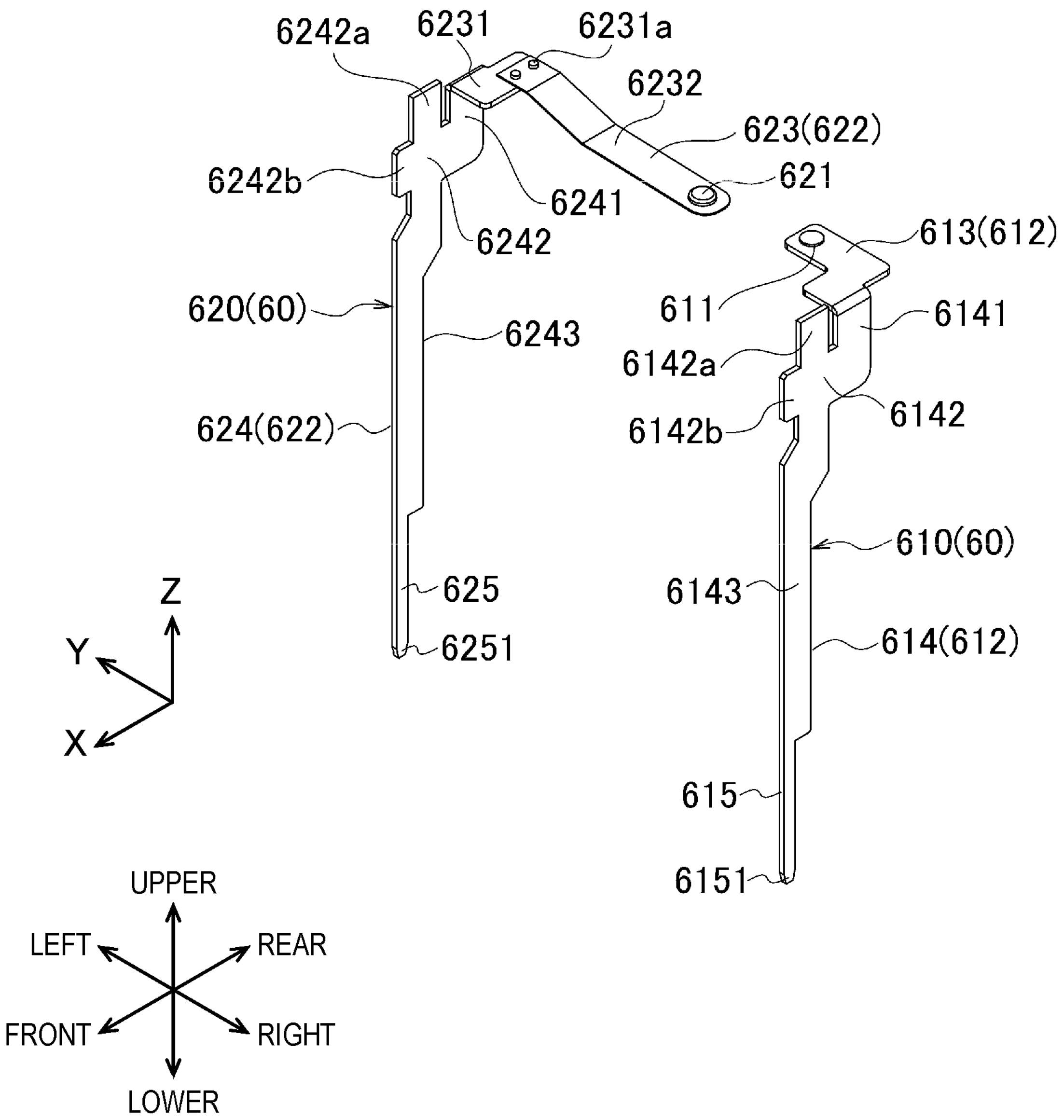
FIG. 41 is a perspective view of the auxiliary contact portion according to the second exemplary embodiment as viewed from another direction.

In the present exemplary embodiment, side piece 614 has protruding portion 6142*a* that is arranged to be separated from upper piece 613 on the front side in the X direction (front-rear direction: first direction) and protrudes upward in the Z direction (vertical direction: axial direction of the coil) from press-fitting portion 224 (see FIGS. 40 and 41).

Protruding portion 6142*a* is continuously provided at a portion located on the front side of first side piece 6141 of coupling part 6142 extending in the X direction (front-rear direction: first direction). The upper end of protruding portion 6142*a* is positioned above upper piece 613 (the upper end of first side piece 6141) (see FIG. 48).

In this manner, by positioning the upper end of protruding portion 6142*a* above upper piece 613 (the upper end of first side piece 6141), protruding portion 6142*a* can be moved more easily while being held, or the upper end of protruding portion 6142*a* can be pushed. That is, side piece 614 inserted into press-fitting portion 224 can be relatively moved forward in the X direction (front-rear direction: first direction) by moving the side piece while holding protruding portion 6142*a* or by pushing the upper end of protruding portion 6142*a*. Thus, side piece 614 can be press-fitted and held by press-fitting portion 224 simply by moving protruding portion 6142*a* or pushing the upper end of protruding portion 6142*a*.

Coupling part 6142 of side piece 614 is formed such that distal end 6142*b* protrudes forward in the X direction (front-rear direction: first direction), and distal end 6142*b* is accommodated in housing recess 2241*e* when side piece 614 is press-fitted and held in press-fitting portion 224 (See FIGS. 40, 41, and 48).

Similarly, side piece 624 also has protruding portion 6242*a* that is disposed to be separated from upper piece 623 on the front side in the X direction (front-rear direction: the first direction) and protrudes upward in the Z direction (vertical direction: the axial direction of the coil) from press-fitting portion 224 (see FIGS. 40 and 41).

Protruding portion 6242*a* is also continuously provided at a portion located in front of first side piece 6241 of coupling part 6242 extending in the X direction (front-rear direction: first direction). The upper end of protruding portion 6242*a* is positioned above upper piece 623 (the upper end of first side piece 6241) (see FIG. 48).

In this manner, by positioning the upper end of protruding portion 6242*a* above upper piece 623 (the upper end of first side piece 6241), protruding portion 6242*a* can be moved more easily while being held, or the upper end of protruding portion 6242*a* can be pushed. That is, side piece 624 inserted into press-fitting portion 224 can be relatively moved forward in the X direction (front-rear direction: first direction) by moving the side piece while holding protruding portion 6242*a* or by pushing the upper end of protruding portion 6242*a*. Thus, side piece 624 can be more easily press-fitted and held in press-fitting portion 224 simply by moving protruding portion 6242*a* or pushing the upper end of protruding portion 6242*a*.

Coupling part 6242 of side piece 624 is formed such that distal end 6242*b* protrudes forward in the X direction (front-rear direction: first direction), and distal end 6242*b* is accommodated in the housing recess 2241*e* when side piece 624 is press-fitted and held in press-fitting portion 224 (See FIGS. 40, 41, and 48).

As a method of press-fitting and holding side piece 614 of first auxiliary contact terminal 612 and side piece 624 of second auxiliary contact terminal 622 to press-fitting portion 224 having such a shape, for example, there is a following method.

First, side piece 614, 624 is inserted into groove 2241 of press-fitting portion 224 from above in a state where connecting piece 615, 625 is positioned on the lower side. At this time, the rear side of side piece 614, 624 in the X direction (front-rear direction: first direction) is inserted into insertion assisting space 2241*d*. Thus, side piece 614, 624 can be inserted into groove 2241 without interfering distal end 6142*b*, 6242*b* of coupling part 6142, 6242 with top wall 2242.

When side piece 614, 624 inserted into groove 2241 of press-fitting portion 224 from the upper side is further moved downward, a portion (lower end of the coupling part 6142, 6242) facing lower restriction wall 2243*b* of side piece 614, 624 in the Z direction (vertical direction: axial direction of the coil) abuts on the upper surface of lower restriction wall 2243*b*. Accordingly, further downward movement of side piece 614, 624 is restricted by lower restriction wall 2243*b*.

Next, side piece 614, 624 is moved forward in the X direction (front-rear direction: first direction) with protruding portion 6242*a* held, or the upper end of protruding portion 6242*a* is pressed to move side piece 614, 624 forward in the X direction (front-rear direction: first direction).

As a result, distal end 6142*b*, 6242*b* of coupling part 6142, 6242 is accommodated in housing recess 2241*e*, and side piece 614, 624 is press-fitted and held in press-fitting portion 224.

At this time, the front portions of coupling parts 6142, 6242 in the X direction (front-rear direction: first direction) are sandwiched and brought into pressure contact with each other by pressure contact part 2241*c* formed on the inner surface of groove 2241. Thus, the relative movement of side piece 614, 624 held by press-fitting portion 224 with respect to coil bobbin 220 in the Z direction (vertical direction: axial direction of the coil) is restricted.

Further, in the present exemplary embodiment, restriction wall 2241*b* is formed to face side piece 614, 624 in the X direction (front-rear direction: first direction) and the Y direction (width direction: second direction). Therefore, the rotation of side piece 614, 624 with respect to coil bobbin 220 and the movement in the direction orthogonal to the Z direction (vertical direction: axial direction of the coil) are restricted by restriction wall 2241*b*.

Further, in the present exemplary embodiment, housing 10 has projecting portion 120*a* that protrudes in the X direction (front-rear direction: first direction) and faces press-fitting portion 224.

Projecting portion 120*a* are formed inside case 120 (see FIGS. 34 and 35). Specifically, projecting portion 120*a* is formed so as to protrude forward in the X direction (front-rear direction: first direction) from the rear end of top wall 121 to the upper end of rear wall 1222, and the pair of projecting portions 120*a* are arranged side by side in a state of being separated in the Y direction (width direction: second direction).

Figure 36:
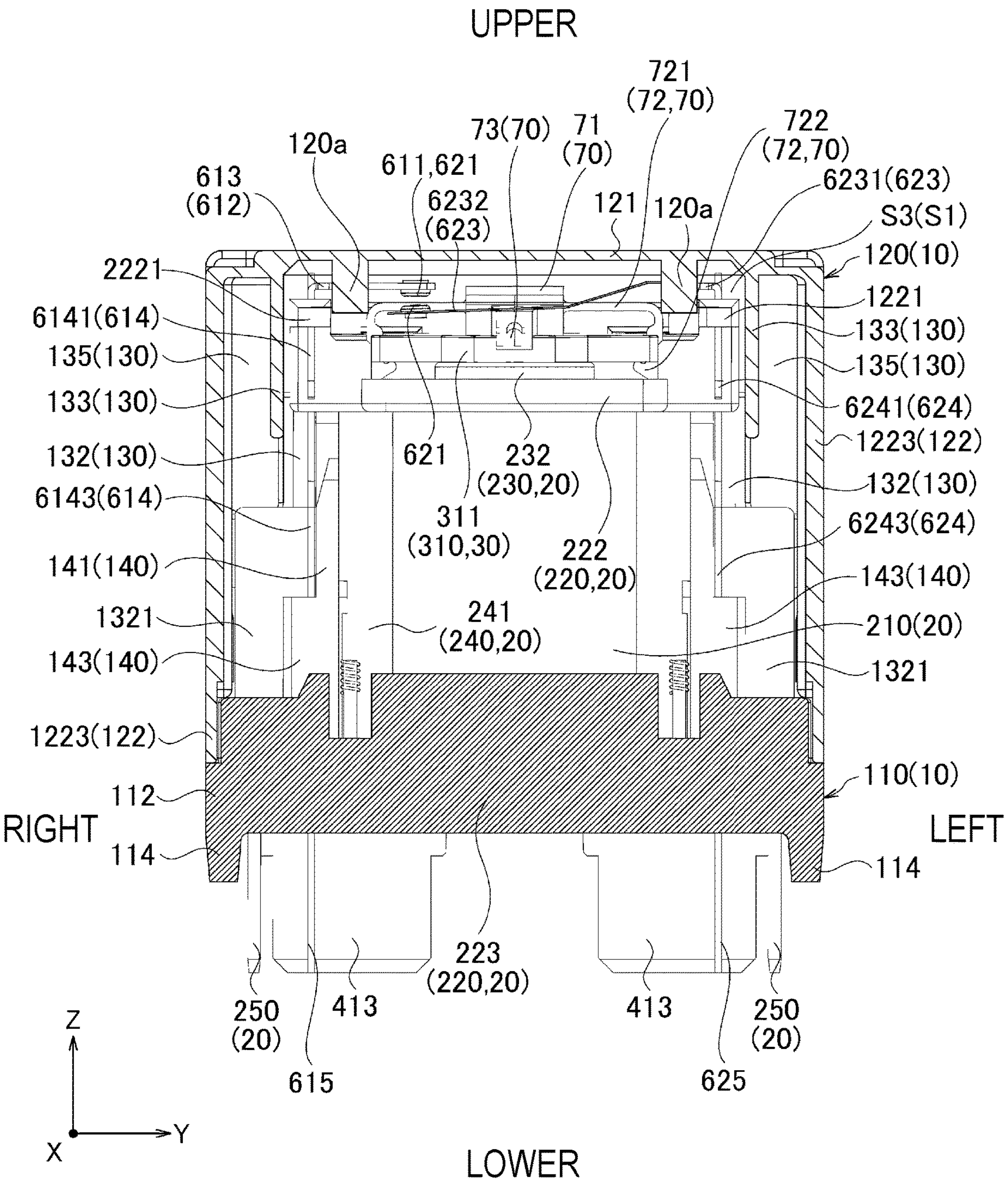
FIG. 36 is a view illustrating an electromagnetic relay according to a second exemplary embodiment, and is a cross-sectional view illustrating a state in which a position where a projecting portion of the cover exists in the electromagnetic relay is cut by a vertical plane extending in a right-left direction.

The pair of projecting portions 120*a* is formed inside case 120 so as to face upper piece 613, 623 in the X direction (front-rear direction: first direction) between the pair of press-fitting portions 224 in a state where case 120 is attached to base 110 (see FIG. 36). By providing such projecting portion 120*a*, in the present exemplary embodiment, position deviation of first auxiliary contact terminal 612 and second auxiliary contact terminal 622 with respect to coil bobbin 220 in the X direction (front-rear direction: first direction) can be suppressed.

Such electromagnetic relay 1 can also achieve substantially the same operations and effects as those of electromagnetic relay 1 described in the first exemplary embodiment.

CONCLUSION

Hereinafter, the characteristic configuration of the electromagnetic relay described in the above-described exemplary embodiment and the modifications thereof and the effects obtained thereby will be described.

The following aspects are disclosed from the above-described exemplary embodiments and the like.

An electromagnetic relay 1 according to a first aspect includes: housing 10; main fixed contact 411 provided in housing 10; main moving contact 421 configured to come into contact with and separate from main fixed contact 411 and is provided in housing 10; first auxiliary contact terminal 612 provided with auxiliary fixed contact 611; second auxiliary contact terminal 622 configured to come into contact with and separate from auxiliary fixed contact 611 and is provided with auxiliary moving contact 621; coil 210 provided in housing 10 such that a central axis of coil 210 extends in a vertical direction; coil bobbin 220 around which coil 210 is wound; and coil terminal 250 to which coil 210 is connected. Main fixed contact 411 and main moving contact 421 are disposed in front of coil 210. Auxiliary fixed contact 611 and auxiliary moving contact 621 are disposed above coil 210 in housing 10. First auxiliary contact terminal 612 or second auxiliary contact terminal 622 includes: upper piece 613 (623) extending above coil 210 and provided with auxiliary fixed contact 611 or auxiliary moving contact 621; side piece 614 (624) connected to upper piece 613 (623), extending downward from upper piece 613 (623), and disposed on a side of coil 210; and connecting piece 615 (625) connected to side piece 614 (624) and provided so as to protrude outward from housing 10. Side piece 614 (624) is press-fitted into upper press-fitting portion 225 (lower press-fitting portion 226) formed in coil bobbin 220. Upper press-fitting portion 225 (lower press-fitting portion 226) includes upper-side opening 2251*a* into which side piece 614 (624) is press-fitted, and upper restriction wall 2251*b* formed around upper-side opening 2251*a* so as to face side piece 614 (624).

That is, first auxiliary contact terminal 612 includes, on the upper end side of coil 210, upper piece 613 extending in a second direction (width direction: Y direction) intersecting with the axial direction and the first direction and having auxiliary fixed contact 611 of any one of auxiliary fixed contact 611 and auxiliary moving contact 621, side piece 614 connected to upper piece 613 so as to extend downward in the axial direction (vertical direction: Z direction) from upper piece 613 and disposed on a side of coil 210 in the second direction (width direction: Y direction), and connecting piece 615 connected to side piece 614 and protruding downward (outward) from housing 10.

On the other hand, second auxiliary contact terminal 622 includes, on the upper end side of coil 210, upper piece 623 extending in a second direction (width direction: Y direction) intersecting with the axial direction and the first direction and having auxiliary moving contact 621 of any one of auxiliary fixed contact 611 and auxiliary moving contact 621, side piece 624 connected to upper piece 623 so as to extend downward in the axial direction (vertical direction: Z direction) from upper piece 623 and disposed on a side of coil 210 in the second direction (width direction: Y direction), and connecting piece 625 connected to side piece 624 and protruding downward (outward) from housing 10.

Side piece 614, 624 is press-fitted into press-fitting portion 224 formed in coil bobbin 220, and press-fitting portion 224 includes opening 2241*a* into which side piece 614, 624 is press-fitted and restriction wall 2241*b* formed around opening 2241*a* so as to face side piece 614, 624.

According to the above configuration, by press-fitting side piece 614, 624 into press-fitting portion 224, it is possible to suppress first auxiliary contact terminal 612 and second auxiliary contact terminal 622 from coming off from coil bobbin 220. That is, it is possible to suppress the position deviation of first auxiliary contact terminal 612 and second auxiliary contact terminal 622 in the press-fitting direction with respect to coil bobbin 220.

Further, by providing the restriction wall 2241*b* on press-fitting portion 224, restriction wall 2241*b* can prevent first auxiliary contact terminal 612 and second auxiliary contact terminal 622 from rotating. That is, it is possible to suppress the positional deviation of first auxiliary contact terminal 612 and second auxiliary contact terminal 622 in the direction orthogonal to the press-fitting direction with respect to coil bobbin 220.

As a result, it is possible to maintain the contact between the auxiliary contacts (auxiliary fixed contact 611 and auxiliary moving contact 621) in a more favorable state, and it is possible to suppress a decrease in the contact reliability of the auxiliary contacts (auxiliary fixed contact 611 and auxiliary moving contact 621).

According to the above configuration, it is possible to obtain electromagnetic relay 1 capable of suppressing a decrease in contact reliability of the auxiliary contacts (auxiliary fixed contact 611 and auxiliary moving contact 621).

In electromagnetic relay 1 according to the second aspect, opening 2241*a* is provided in press-fitting portion 224 so as to face the side wall of housing 10, and restriction wall 2241*b* faces side piece 614 (624) in the vertical direction and the right-left direction.

According to the above configuration, first auxiliary contact terminal 612 and second auxiliary contact terminal 622 are relatively moved in the second direction (width direction: Y direction) with respect to coil bobbin 220 to be press-fitted and fixed to press-fitting portion 224. Therefore, first auxiliary contact terminal 612 and second auxiliary contact terminal 622 can be more easily press-fitted into press-fitting portion 224.

In electromagnetic relay 1 according to the third aspect, press-fitting portion 224 further includes pressure contact part 2241*c* that sandwiches and presses side piece 614 (624).

According to the above configuration, it is possible to suppress first auxiliary contact terminal 612 and second auxiliary contact terminal 622 from coming off coil bobbin 220 while simplifying the configuration.

In electromagnetic relay 1 according to the fourth aspect, side piece 614 (624) includes first side piece 6141 (6241) connected to upper piece 613 (623), second side piece 6143 (6243) connected to connecting piece 615 (625), and coupling part 6142 (6242) connecting first side piece 6141 (6241) and second side piece 6143 (6243), and is provided such that first side piece 6141 (6241) and second side piece 6143 (6243) do not overlap when viewed from above.

According to the above configuration, since the length of the linear portion of side piece 614 (624) can be made shorter than that of the straight side piece, it is possible to suppress the deformation of side piece 614 (624) when first auxiliary contact terminal 612 and second auxiliary contact terminal 622 are press-fitted into press-fitting portion 224.

In electromagnetic relay 1 according to the fifth aspect, press-fitting portion 224 includes upper press-fitting portion 225 and lower press-fitting portion 226, upper press-fitting portion 225 is provided in upper flange portion 222 of coil bobbin 220, and lower press-fitting portion 226 is provided in lower flange portion 223 of coil bobbin 220.

According to the above configuration, first auxiliary contact terminal 612 and second auxiliary contact terminal 622 can be more firmly attached to coil bobbin 220, and first auxiliary contact terminal 612 and second auxiliary contact terminal 622 can be prevented from coming off from coil bobbin 220. Further, by press-fitting and fixing first auxiliary contact terminal 612 and second auxiliary contact terminal 622 between upper press-fitting portion 225 and lower press-fitting portion 226, it is possible to suppress the rotation of first auxiliary contact terminal 612 and second auxiliary contact terminal 622.

In electromagnetic relay 1 according to the sixth aspect, opening 2241*a* is opened upward, and restriction wall 2241*b* faces side piece 614 (615) in the front-rear direction and the right-left direction.

According to the above configuration, since first auxiliary contact terminal 612 and second auxiliary contact terminal 622 can be relatively moved in the axial direction (vertical direction: Z direction) with respect to coil bobbin 220 to be press-fitted and fixed to press-fitting portion 224, first auxiliary contact terminal 612 and second auxiliary contact terminal 622 can be more easily press-fitted into press-fitting portion 224.

In electromagnetic relay 1 according to the seventh aspect, press-fitting portion 224 includes pressure contact part 2241*c* that sandwiches and presses side piece 614 (624).

According to the above configuration, the configuration can be simplified, and first auxiliary contact terminal 612 and second auxiliary contact terminal 622 can be prevented from coming off from coil bobbin 220.

In electromagnetic relay 1 according to the eighth aspect, press-fitting portion 224 has lower restriction wall 2243*b* vertically opposed to side piece 614 (624).

According to the above configuration, it is possible to suppress the downward (one side in the press-fitting direction) position deviation of first auxiliary contact terminal 612 and second auxiliary contact terminal 622 with respect to coil bobbin 220. Therefore, even when first auxiliary contact terminal 612 and second auxiliary contact terminal 622 are press-fitted into press-fitting portion 224 penetrating in the vertical direction, it is possible to prevent first auxiliary contact terminal 612 and second auxiliary contact terminal 622 from moving downward and coming off from coil bobbin 220.

In electromagnetic relay 1 according to the ninth aspect, press-fitting portion 224 has side opening 2245*a* that opens upward and faces side piece 614 (624).

According to the above configuration, it is possible to form the gap on the first direction (front-rear direction: X direction) side of side piece 614, 624 in press-fitting portion 224. By forming such a gap, first auxiliary contact terminal 612 and second auxiliary contact terminal 622 inserted into press-fitting portion 224 can be relatively moved in the first direction (front-rear direction: X direction) with respect to coil bobbin 220 to be press-fitted and fixed to press-fitting portion 224. As a result, when first auxiliary contact terminal 612 and second auxiliary contact terminal 622 are press-fitted into press-fitting portion 224, first auxiliary contact terminal 612 and second auxiliary contact terminal 622 can be more accurately positioned in the axial direction (vertical direction: Z direction).

In electromagnetic relay 1 according to the tenth aspect, projecting portion 120*a* that protrudes downward from the lower surface of the upper portion of housing 10 and faces upper piece 613 (623) is provided.

According to the above configuration, misalignment of first auxiliary contact terminal 612 and second auxiliary contact terminal 622 with respect to coil bobbin 220 can be suppressed.

In electromagnetic relay 1 according to the eleventh aspect, side piece 614 (624) includes first side piece 6141 (6241) connected to upper piece 613 (623), second side piece 6143 (6243) connected to connecting piece 615 (625), and coupling part 6142 (6242) connected first side piece 6141 (6241) and second side piece 6143 (6243), and when viewed from above, first side piece 6141 (6241) and second side piece 6143 (6243) are connected by coupling part 6142 (6242) so that first side piece 6141 (6241) and second side piece 6143 (6243) do not overlap each other.

According to the above configuration, since the length of the linear portion of side piece 614, 624 can be made shorter than that of the straight side piece, it is possible to suppress the deformation of side piece 614, 624 when first auxiliary contact terminal 612 and second auxiliary contact terminal 622 are press-fitted into press-fitting portion 224.

In electromagnetic relay 1 according to the twelfth aspect, side piece 614 (624) is disposed away from upper piece 613 (623), and has protruding portion 6142*a* (6242*a*) protruding upward from press-fitting portion 224.

According to the above configuration, first auxiliary contact terminal 612 and second auxiliary contact terminal 622 can be press-fitted into press-fitting portion 224 by pressing protruding portion 6142*a*, 6242*a*. Therefore, when first auxiliary contact terminal 612 and second auxiliary contact terminal 622 are press-fitted into press-fitting portion 224, upper piece 613, 623 side can be prevented from being deformed. That is, first auxiliary contact terminal 612 and second auxiliary contact terminal 622 can be press-fitted into press-fitting portion 224 while deformation on upper piece 613, 623 side is suppressed.

Electromagnetic relay 1 according to the thirteenth aspect includes first side wall 131 provided in housing 10 and protruding upward from a bottom portion of housing 10, and second side wall 132 provided in housing 10, protruding upward from the bottom portion of the housing, and connected to first side wall 131. First side wall 131 is located between coil 210 and main fixed contact 411, at least a part of the side surface of coil 210 is surrounded by first side wall 131 and second side wall 132, and side piece 614 (624) is disposed so as to overlap second side wall 132 when viewed from the side.

According to the above configuration, the position deviation of first auxiliary contact terminal 612 and second auxiliary contact terminal 622 can be restricted (reduce position deviation amount of first auxiliary contact terminal 612 and second auxiliary contact terminal 622 in the second direction) by second side wall 132. As a result, it is possible to suppress first auxiliary contact terminal 612 and second auxiliary contact terminal 622 from coming off from coil bobbin 220.

(Others)

Although the contents of the electromagnetic relay according to the present disclosure have been described above, the present disclosure is not limited to these descriptions, and it is obvious to those skilled in the art that various modifications and improvements can be made.

For example, configurations may be designed by suitably combining components shown in the exemplary embodiment and the modifications described above.

In the exemplary embodiment and the modifications of the exemplary embodiment, auxiliary contact portion 60 is turned off when main contact portion 40 is in the on state. Alternatively, auxiliary contact portion 60 may be turned on when main contact portion 40 is in the on state. At this time, main contact portion 40 and auxiliary contact portion 60 can be so-called normally closed contact portions in which the contacts are turned on in the initial state, and main contact portion 40 and auxiliary contact portion 60 can be so-called normally open contact portions in which the contacts are turned off in the initial state.

In the above exemplary embodiment and the modifications thereof, both first auxiliary contact terminal 612 and second auxiliary contact terminal 622 include upper piece 613, 623, side piece 614, 624, and connecting piece 615, 625. However, only one of the terminals may include the upper piece, the side piece, and the connecting piece.

In addition, specifications (shape, size, layout, and the like) of the coil bobbin, the auxiliary contact terminal, and other details can be appropriately changed.

REFERENCE MARKS IN THE DRAWINGS

- 1: electromagnetic relay
- 10: housing
- 120*a*: projecting portion
- 131: first side wall
- 132: second side wall
- 210: coil
- 210*a*: side surface
- 220: coil bobbin
- 222: upper flange portion
- 223: lower flange portion
- 224: press-fitting portion
- 2241*a*: opening
- 2241*b*: restriction wall
- 2241*c*: pressure contact part
- 2242*a*: upper opening (opening)
- 2243*a*: lower opening (opening)
- 2243*b*: lower restriction wall (rear side of lower opening)
- 2245*a*: side opening
- 2247*a*: upper opening
- 2247*c*: lower opening
- 225: upper press-fitting portion (first press-fitting portion)
- 2251*a*: upper-side opening
- 2251*b*: upper restriction wall
- 2251*c*: upper pressure contact part (pressure contact part)
- 226: lower press-fitting portion (second press-fitting portion)
- 2261*a*: lower-side opening
- 2261*b*: lower restriction wall
- 2261*c*: lower pressure contact part (pressure contact part)

250: coil terminal
40: main contact portion
411: main fixed contact
413: connecting piece
421: main moving contact
60: auxiliary contact portion
611: auxiliary fixed contact
612: first auxiliary contact terminal
613: upper piece
614: side piece
6141: first side piece
6142: coupling part
6142*a*: protruding portion
6143: second side piece
615: connecting piece
620: auxiliary moving contact portion
621: auxiliary moving contact
622: second auxiliary contact terminal
623: upper piece
624: side piece
6241: first side piece
6242: coupling part
6242*a*: protruding portion
6243: second side piece
625: connecting piece
S1: internal space (space in case 10)
X: front-rear direction (direction intersecting axial direction: first direction)
Y: width direction (direction intersecting axial direction and first direction: second direction)
Z: vertical direction (axial direction of coil)

The invention claimed is:

1. An electromagnetic relay comprising:
a housing;
a main fixed contact provided in the housing;
a main moving contact configured to come into contact with and separate from the main fixed contact and is provided in the housing;
a first auxiliary contact terminal provided with an auxiliary fixed contact;
a second auxiliary contact terminal configured to come into contact with and separate from the auxiliary fixed contact, the second auxiliary contact terminal provided with an auxiliary moving contact;
a coil provided in the housing with a central axis of the coil extending in a vertical direction;
a coil bobbin around which the coil is wound; and
a coil terminal to which the coil is connected,
wherein
the main fixed contact and the main moving contact are disposed in front of the coil,
the auxiliary fixed contact and the auxiliary moving contact are disposed above the coil in the housing,
the first auxiliary contact terminal or the second auxiliary contact terminal includes
an upper piece extending above the coil and provided with the auxiliary fixed contact or the auxiliary moving contact,
a side piece connected to the upper piece, extending downward from the upper piece, and disposed on a side of the coil, and
a connecting piece connected to the side piece and provided to protrude outward from the housing,
the side piece is press-fitted into a press-fitting portion formed in the coil bobbin, and
the press-fitting portion includes an opening into which the side piece is press-fitted, and a restriction wall formed around the opening to face the side piece.

2. The electromagnetic relay according to claim 1, wherein
the opening is provided in the press-fitting portion to face a side wall of the housing, and
the restriction wall faces the side piece in the vertical direction and a right-left direction.

3. The electromagnetic relay according to claim 1, wherein the press-fitting portion further includes a pressure contact part that sandwiches and presses the side piece.

4. The electromagnetic relay according to claim 1, wherein
the side piece includes
a first side piece connected to the upper piece,
a second side piece connected to the connecting piece, and
a coupling part that connects the first side piece and the second side piece, and
the first side piece and the second side piece are provided not to overlap each other when viewed from above.

5. The electromagnetic relay according to claim 1, wherein
the press-fitting portion includes a first press-fitting portion and a second press-fitting portion, and
the first press-fitting portion is provided in an upper flange portion of the coil bobbin, and the second press-fitting portion is provided in a lower flange portion of the coil bobbin.

6. The electromagnetic relay according to claim 1, wherein
the opening opens upward, and
the restriction wall faces the side piece in a front-rear direction and the right-left direction.

7. The electromagnetic relay according to claim 6, wherein the press-fitting portion further includes a pressure contact part that sandwiches and presses the side piece.

8. The electromagnetic relay according to claim 6, wherein the press-fitting portion further includes a lower restriction wall facing the side piece in the vertical direction.

9. The electromagnetic relay according to claim 6, wherein the press-fitting portion further includes a side opening that opens upward and faces the side piece.

10. The electromagnetic relay according to claim 6, comprising a projecting portion that protrudes downward from a lower surface of an upper portion of the housing and facing the upper piece.

11. The electromagnetic relay according to claim 6, wherein
the side piece includes
a first side piece connected to the upper piece,
a second side piece connected to the connecting piece, and
a coupling part that connects the first side piece and the second side piece, and
the first side piece and the second side piece are connected by the coupling part to cause the first side piece and the second side piece not to overlap when viewed from above.

12. The electromagnetic relay according to claim 6, wherein the side piece has a protruding portion that is disposed away from the upper piece and protrudes upward from the press-fitting portion.

13. The electromagnetic relay according to claim 1, further comprising:

a first side wall provided in the housing and provided to protrude upward from a bottom portion of the housing; and a second side wall provided in the housing, protruding upward from the bottom portion of the housing, and provided to be connected to the first side wall, wherein the first side wall is located between the coil and the main fixed contact, at least a part of a side surface of the coil is surrounded by the first side wall and the second side wall, and the side piece is disposed to overlap the second side wall when viewed from a side.

* * * * *